United States Patent
Puri et al.

(10) Patent No.: US 11,736,378 B1
(45) Date of Patent: Aug. 22, 2023

(54) COLLABORATIVE INCIDENT MANAGEMENT FOR NETWORKED COMPUTING SYSTEMS

(71) Applicant: SPLUNK INC., San Francisco, CA (US)

(72) Inventors: Asmita Puri, San Francisco, CA (US); Alan Hardin, San Francisco, CA (US); Kan Wu, Cupertino, CA (US); Fang I. Hsiao, Berkeley, CA (US)

(73) Assignee: SPLUNK INC., San Francisco, CA (US)

(*) Notice: Subject to any disclaimer, the term of this patent is extended or adjusted under 35 U.S.C. 154(b) by 0 days.

(21) Appl. No.: 17/566,421

(22) Filed: Dec. 30, 2021

Related U.S. Application Data

(63) Continuation of application No. 16/863,533, filed on Apr. 30, 2020, now Pat. No. 11,258,693, which is a
(Continued)

(51) Int. Cl.
| | |
|---|---|
| *H04L 43/16* | (2022.01) |
| *H04L 43/08* | (2022.01) |
| *H04L 43/091* | (2022.01) |
| *H04L 41/22* | (2022.01) |
| *G06F 16/951* | (2019.01) |
| *H04L 41/0604* | (2022.01) |
| *H04L 41/042* | (2022.01) |
| *G06F 3/0486* | (2013.01) |

(Continued)

(52) U.S. Cl.
CPC .......... *H04L 43/16* (2013.01); *G06F 16/951* (2019.01); *H04L 41/042* (2013.01); *H04L 41/0604* (2013.01); *H04L 41/22* (2013.01); *H04L 43/08* (2013.01); *H04L 43/091* (2022.05); *G06F 3/0482* (2013.01); *G06F 3/0486* (2013.01); *H04L 43/0852* (2013.01); *H04L 63/20* (2013.01)

(58) Field of Classification Search
CPC ... H04L 43/16; H04L 41/042; H04L 41/0604; H04L 41/22; H04L 43/08; H04L 43/091; H04L 43/0852; H04L 63/20; G06F 16/951; G06F 3/0482; G06F 3/0486
See application file for complete search history.

(56) References Cited

U.S. PATENT DOCUMENTS

| | | | |
|---|---|---|---|
| 7,472,352 B2 * | 12/2008 | Liversidge ............ | H04M 3/567 715/753 |
| 7,937,344 B2 | 5/2011 | Baum et al. | |

(Continued)

OTHER PUBLICATIONS

Non Final Office Action received for U.S. Appl. No. 15/732,158 dated Jun. 27, 2019, 12 pages.
(Continued)

*Primary Examiner* — Sm A Rahman
(74) *Attorney, Agent, or Firm* — Artegis Law Group, LLP

(57) ABSTRACT

Information technology environment monitoring systems, for example, perform analytics over machine data received from networked entities. Outputs of such a system may be useful to help a user identify a problem and resolve an incident. Inventive aspects enable user interactions to trigger automatic connection with network servers to establish communication channels for conveying analytics and other information related to the problem between and among network nodes participating in the resolution of the problem or incident.

20 Claims, 58 Drawing Sheets

Related U.S. Application Data continuation of application No. 15/732,158, filed on Sep. 25, 2017, now Pat. No. 10,693,758.

(51) Int. Cl.
  *G06F 3/0482* (2013.01)
  *H04L 43/0852* (2022.01)
  *H04L 9/40* (2022.01)

(56) References Cited

U.S. PATENT DOCUMENTS

| | | | |
|---|---|---|---|
| 8,112,425 B2 | 2/2012 | Baum et al. | |
| 8,751,529 B2 | 6/2014 | Zhang et al. | |
| 8,788,525 B2 | 7/2014 | Neels et al. | |
| 8,929,851 B2 | 1/2015 | Mills et al. | |
| 9,158,811 B1 | 10/2015 | Choudhary et al. | |
| 9,215,240 B2 | 12/2015 | Merza et al. | |
| 9,286,413 B1 | 3/2016 | Coates et al. | |
| 10,127,258 B2 | 11/2018 | Lamas et al. | |
| 2009/0006467 A1* | 1/2009 | Visscher | G06Q 10/06 |
| 2013/0311904 A1* | 11/2013 | Tien | H04L 65/00 |
| | | | 715/753 |
| 2014/0101571 A1* | 4/2014 | Lewis | H04L 67/1044 |
| | | | 715/753 |
| 2017/0041435 A1 | 2/2017 | Simpson et al. | |
| 2017/0331670 A1 | 11/2017 | Parkvall et al. | |
| 2018/0173372 A1* | 6/2018 | Greenspan | G06T 11/206 |
| 2019/0098106 A1 | 3/2019 | Mungel et al. | |

OTHER PUBLICATIONS

Final Office Action received for U.S. Appl. No. 15/732,158 dated Oct. 16, 2019, 12 pages.
Advisory Action received for U.S. Appl. No. 15/732,158 dated Jan. 3, 2020, 3 pages.
Notice of Allowance received for U.S. Appl. No. 15/732,158 dated Jan. 24, 2020, 8 pages.
Non Final Office Action received for U.S. Appl. No. 16/863,533 dated Jul. 7, 2021, 11 pages.
Notice of Allowance received for U.S. Appl. No. 16/863,533 dated Sep. 29, 2021, 8 pages.
Splunk Enterprise 8.0.0 Overview, available online, retrieved on May 20, 2020 from docs.splunk.com, 17 pages.
Splunk Cloud 8.0.2004 User Manual, available online, retrieved on May 20, 2020 from docs.splunk.com, 66 pages.
Splunk Quick Reference Guide, updated 2019, available online at https://www.splunk.com/pdfs/solution-guides/splunk-quick-reference-guide.pdf, retrieved on May 20, 2020, 6 pages.
Carraso, David, "Exploring Splunk," published by CITO Research, New York, NY, Apr. 2012, 156 pages.
Bitincka et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010, 9 pages.

* cited by examiner

| Time 535 | Host 536 | Source 537 | Source Type 538 | Event 539 |
|---|---|---|---|---|
| 10/10/2000 1:55 p.m. | www1 | access.log | access_combined | 127.0.0.1 - frank [10/Oct/2000:13:55:36 -0700] "GET /apache.gif HTTP/1.0" 200 2326 0.0947 |
| 10/10/2000 1:56 p.m. | www2 | access.log | access_combined | 127.0.0.1 - bob [10/Oct/2010:13:56:36 -0700] "GET /mickey_mouse.gif HTTP/1.0" 200 2980 0.0899 |
| 10/10/2000 1:57 p.m. | www2 | access.log | access_combined | 127.0.0.1 - carlos [10/Oct/2010:13:57:36 -0700] "GET /donald_duck.gif HTTP/1.0" 200 2900 0.0857 |
| 10/10/2000 1:58 p.m. | www2 | error.log | apache_error | [Sunday Oct 10 1:59:33 2010] [error] [client 127.10.1.1.015] File does not exist: /home/reba/public_html/images/daffy_duck.gif |

Data Summary

Hosts (5) | Sources (8) | Sourcetypes (3)

( filter )

| Host ◇ | | Count ◇ | Last Update ◇ |
|---|---|---|---|
| mailsv | ⊞ ∨ | 9,829 | 4/29/14 1:32:47.000 PM |
| vendor_sales | ⊞ ∨ | 30,244 | 4/29/14 1:32:46.000 PM |
| www1 | ⊞ ∨ | 24,221 | 4/29/14 1:32:44.000 PM |
| www2 | ⊞ ∨ | 22,595 | 4/29/14 1:32:47.000 PM |
| www3 | ⊞ ∨ | 22,975 | 4/29/14 1:32:45.000 PM |

Create New Incident ✕
Step 3 of 3: Invite people to this war room

2462 — Type in Email    Add — 2464

| | | |
|---|---|---|
| Kate Hsiao<br>khsiao@splunk.com | Incident Manager | |
| Rob Lester<br>rlester@splunk.com | DB admin | ⊗ |
| Nathan Forte<br>nforte@splunk.com | Network admin | ⊗ |
| David Morrison<br>dmorrison@splunk.com | Server L2 Analyst | ⊗ |

2466　　2468　　2470

Cancel　　　　　　　　　　Back　Done
2472　　　　　　　　　　2474　2476

COLLABORATIVE INCIDENT MANAGEMENT FOR NETWORKED COMPUTING SYSTEMS

CROSS-REFERENCE TO RELATED APPLICATIONS

This application is a continuation of the co-pending U.S. patent application titled, "COLLABORATIVE INCIDENT MANAGEMENT FOR NETWORKED COMPUTING SYSTEMS," filed on Apr. 30, 2020 and having Ser. No. 16/863,533, which is a continuation of U.S. patent application titled, "COLLABORATIVE INCIDENT MANAGEMENT FOR NETWORKED COMPUTING SYSTEMS," filed on Sep. 25, 2017 and having Ser. No. 15/732,158, issued as U.S. Pat. No. 10,693,758. The subject matter of these related applications is hereby incorporated herein by reference.

BACKGROUND

Field of the Embodiments

The present invention relates generally to computer networks and, more specifically, to collaborative incident management for networked computing systems.

Description of the Related Art

Modern data centers and other computing environments can vary from a few computing systems to thousands of computing systems. Each computing system in such computing environments is generally configured to process data, service requests from remote clients, and to perform other computational tasks. During operation, a particular computing environment may experience degraded performance, failure, or other issues in regard to one or more aspects of the computing environment, referred to herein as "incidents." Incidents may result from problems internal to the computing environment, such as failure of one or more components, corruption in one or more database entries, or increased traffic on a communications network that connects one or more computing systems within the computing environment. Alternatively, or in addition, incidents may result from attacks by malicious users operating outside the computing environment. In one example, one or more application programs executing within the computing environment could exhibit increased response time. In another example, particular services, such as email communications, could fail entirely, thereby disabling the ability of users of the computing environment to transmit or receive email messages.

When an incident occurs, a system administrator or other responsible person, referred to herein as the "incident manager," is alerted that an incident has occurred and that resolution of the incident is needed. The incident manager forms a response team by contacting the individuals needed to resolve the incident. The incident manager contacts these individuals via various means of communication, such as telephone calls, email communications, text messages, and pager messages. The incident manager opens various communications channels, data sources, and application programs that are relevant to resolving the incident, such as a chat message application program, an online meeting application program, and a software bug tracking application program. The incident manager may set up an email alias to enable the individuals working to resolve the incident to communicate with each other. Further, the incident manager sends one or more communications to key stakeholders, such as the company president and key managers, to advise the key stakeholders about the incident and what is being done to resolve the incident. As the incident evolves, the incident manager may add individuals to the response team as more issues are identified and may remove individuals from the response team as issues are resolved. The incident manager remains in contact with the individuals working on the incident to assign tasks, receive status updates, and coordinate response team efforts until the incident is resolved. The incident manager also remains in contact with the key stakeholders to provide summary status updates until the incident is resolved.

One potential drawback with the approach described above is that the incident manager and response team members need to continually monitor and update multiple communications channels, data sources, software application programs, and email messages in order to determine the current state of each task related to resolving the incident. If the incident manager cannot determine the status of a particular task, the incident manager may need to text or call the task owner to receive the latest status. Monitoring and updating multiple disparate communications channels leads to inefficient team communications, resulting in a reduced amount of time devoted to actually resolving the incident.

An additional potential drawback with the approach described above is that the incident manager generally needs to manually send status updates to key stakeholders on a regular basis until the incident is resolved. If the incident manager fails to provide regular status updates, then one or more key stakeholders may need to contact the incident manager to determine the current status of the incident. As a result, the incident manager generally needs to devote some amount of time to generate and transmit status updates on a regular basis, thereby leading to additional inefficiencies and delay in resolving the incident.

As the foregoing illustrates, what is needed in the art are more effective ways for response teams to collaborate to resolve incidents in networked computing environments.

SUMMARY

Collaborative Incident Management, described herein, provides a user, such as an incident manager, a facility to establish a virtual war room within the data operational intelligence application environment. One such data operational intelligence application environment is the SPLUNK® ENTERPRISE system developed by Splunk Inc. of San Francisco, Calif. With the data operational intelligence application at the center of identifying a critical system problem, establishing a virtual war room enables the user to engage the appropriate team with appropriate communications to resolve the critical problem. Collaborative Incident Management enables the user within the data operational intelligence application to quickly set the parameters for a desired war room to automatically establish any external communication channels, engage the desired participants, and integrate the application analysis and reporting into the war room resources. The war room provides a central clearinghouse for information, activity, and communication during critical problem resolution increasing the effectiveness of each problem resolution team member by streamlining incident management.

Various embodiments of the present application set forth a method for collaborative incident management in a computing environment. The method includes receiving one or more parameters associated with an incident occurring within a networked computing environment. The method further includes identifying a communications channel specified by the one or more parameters. The method further includes identifying at least one service affected by the incident. The method further includes causing communications over a network via the communications channel specified by a parameter included in the one or more parameters. The method further includes causing display of a first interactive element associated with the communications channel and a visualization indicating the status of the at least one service. According to the method, the at least one service is represented by a stored service definition, the stored service definition referencing a KPI defined by a search query that produces a value indicating a measure of the service from machine data.

Other embodiments of the present invention include, without limitation, a computer-readable medium including instructions for performing one or more aspects of the disclosed techniques, as well as a computing device for performing one or more aspects of the disclosed techniques.

At least one advantage of the disclosed techniques is that members of an incident response team are able to access information and updates related to multiple communications channels, data sources, and application programs from a centralized user interface. Members of the incident response team can view the status of each team member and provide updates to assigned check items without having to access graphical user interfaces for different application programs. As a result, communication among response team members is less cumbersome and more efficient relative to prior approaches. Another advantage of the disclosed techniques is that status update reports are automatically generated and transmitted to key stakeholders. As a result, key stakeholders are able to stay informed about the incident without levying an undue burden on the incident manager to manually produce such status update reports.

BRIEF DESCRIPTION OF THE DRAWINGS

So that the manner in which the above recited features of the invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

The present disclosure is illustrated by way of example, and not limitation, in the figures of the accompanying drawings, in which like reference numerals indicate similar elements and in which:

FIG. 5C provides a visual representation of the manner in which a pipelined search language or query operates, in accordance with example embodiments;

FIG. 7C illustrates an example of creating and using an inverted index, in accordance with example embodiments;

FIG. 8A is an interface diagram of an example user interface for a search screen, in accordance with example embodiments;

FIG. 8B is an interface diagram of an example user interface for a data summary dialog that enables a user to select various data sources, in accordance with example embodiments;

FIGS. 9-15 are interface diagrams of example report generation user interfaces, in accordance with example embodiments;

FIG. 17B is an interface diagram of an example user interface of an incident review dashboard, in accordance with example embodiments;

FIGS. 24A-24D illustrate an example of a user interface that may be generated by the collaborative incident management program of FIG. 23 for initializing a virtual incident management room in accordance with the disclosed embodiments;

FIGS. 25A-25K illustrate an example of a user interface that may be generated by the collaborative incident management program of FIG. 23 for investigating a virtual incident management room in accordance with the disclosed embodiments;

FIGS. 27A-27B illustrate an example of a user interface that may be generated by the collaborative incident management program of FIG. 23 for generating status updates associated with a virtual incident management room in accordance with the disclosed embodiments.

DETAILED DESCRIPTION

Figure 1:
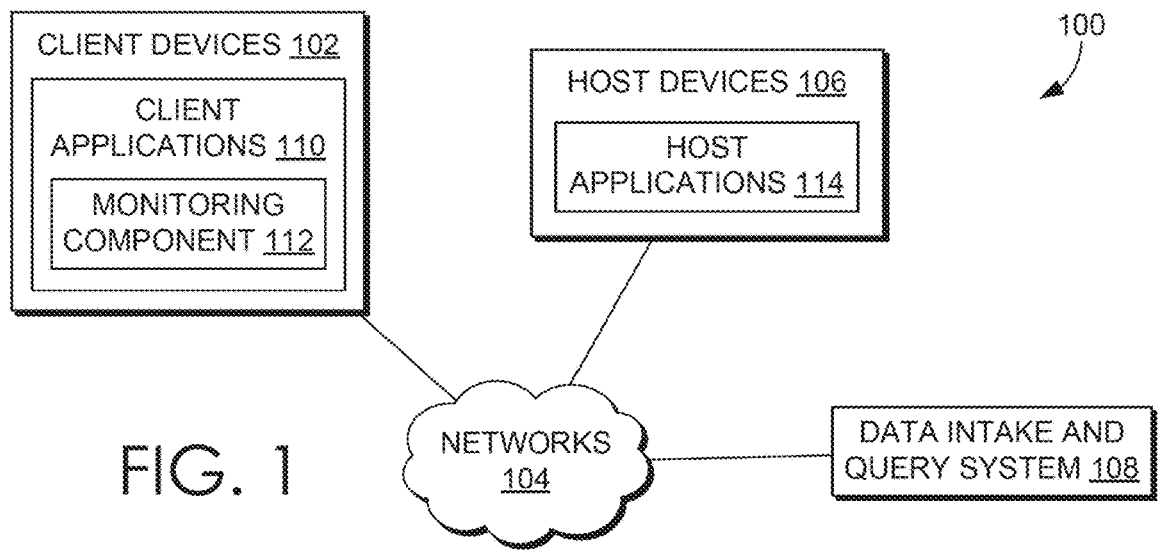
FIG. 1 is a block diagram of an example networked computer environment, in accordance with example embodiments.

Embodiments are described herein according to the following outline:
1.0. General Overview
2.0. Operating Environment
  2.1. Host Devices
  2.2. Client Devices
  2.3. Client Device Applications
  2.4. Data Server System
  2.5 Cloud-Based System Overview
  2.6 Searching Externally-Archived Data
    2.6.1. ERP Process Features
  2.7. Data Ingestion
    2.7.1. Input
    2.7.2. Parsing
    2.7.3. Indexing
  2.8. Query Processing
  2.9. Pipelined Search Language
  2.10. Field Extraction
  2.11. Example Search Screen
  2.12. Data Modeling
  2.13. Acceleration Techniques
    2.13.1. Aggregation Technique
    2.13.2. Keyword Index
    2.13.3. High Performance Analytics Store
      2.13.3.1 Extracting Event Data Using Posting Values
    2.13.4. Accelerating Report Generation
  2.14. Security Features
  2.15. Data Center Monitoring
  2.16. IT Service Monitoring
    2.16.1 Example Service Monitoring System
    2.16.2 Key Performance Indicators
3.0. Collaborative Incident Management
1.0. General Overview Modern data centers and other computing environments can comprise anywhere from a few host computer systems to thousands of systems configured to process data, service requests from remote clients, and perform numerous other computational tasks. During operation, various components within these computing environments often generate significant volumes of machine data. Machine data is any data produced by a machine or component in an information technology (IT) environment and that reflects activity in the IT environment. For example, machine data can be raw machine data that is generated by various components in IT environments, such as servers, sensors, routers, mobile devices, Internet of Things (IoT) devices, etc. Machine data can include system logs, network packet data, sensor data, application program data, error logs, stack traces, system performance data, etc. In general, machine data can also include performance data, diagnostic information, and many other types of data that can be analyzed to diagnose performance problems, monitor user interactions, and to derive other insights.

A number of tools are available to analyze machine data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and is discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, Calif. The SPLUNK® ENTERPRISE system is the leading platform for providing real-time operational intelligence that enables organizations to collect, index, and search machine data from various websites, applications, servers, networks, and mobile devices that power their businesses. The data intake and query system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the data intake and query system, machine data are collected and stored as "events". An event comprises a portion of machine data and is associated with a specific point in time. The portion of machine data may reflect activity in an IT environment and may be produced by a component of that IT environment, where the events may be searched to provide insight into the IT environment, thereby improving the performance of components in the IT environment. Events may be derived from "time series data," where the time series data comprises a sequence of data points (e.g., performance measurements from a computer system, etc.) that are associated with successive points in time. In general, each event has a portion of machine data that is associated with a timestamp that is derived from the portion of machine data in the event. A timestamp of an event may be determined through interpolation between temporally proximate events having known timestamps or may be determined based on other configurable rules for associating timestamps with events.

In some instances, machine data can have a predefined format, where data items with specific data formats are stored at predefined locations in the data. For example, the machine data may include data associated with fields in a database table. In other instances, machine data may not have a predefined format (e.g., may not be at fixed, predefined locations), but may have repeatable (e.g., non-random) patterns. This means that some machine data can comprise various data items of different data types that may be stored at different locations within the data. For example, when the data source is an operating system log, an event can include one or more lines from the operating system log containing machine data that includes different types of performance and diagnostic information associated with a specific point in time (e.g., a timestamp).

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The machine data generated by such data sources can include, for example and without limitation, server log files, activity log files, configuration files, messages, network packet data, performance measurements, sensor measurements, etc.

The data intake and query system uses a flexible schema to specify how to extract information from events. A flexible schema may be developed and redefined as needed. Note that a flexible schema may be applied to events "on the fly," when it is needed (e.g., at search time, index time, ingestion time, etc.). When the schema is not applied to events until search time, the schema may be referred to as a "late-binding schema."

During operation, the data intake and query system receives machine data from any type and number of sources (e.g., one or more system logs, streams of network packet data, sensor data, application program data, error logs, stack traces, system performance data, etc.). The system parses the machine data to produce events each having a portion of machine data associated with a timestamp. The system stores the events in a data store. The system enables users to run queries against the stored events to, for example, retrieve events that meet criteria specified in a query, such as criteria indicating certain keywords or having specific values in defined fields. As used herein, the term "field" refers to a location in the machine data of an event containing one or more values for a specific data item. A field may be referenced by a field name associated with the field. As will be described in more detail herein, a field is defined by an extraction rule (e.g., a regular expression) that derives one or more values or a sub-portion of text from the portion of machine data in each event to produce a value for the field for that event. The set of values produced are semantically-related (such as IP address), even though the machine data in each event may be in different formats (e.g., semantically-related values may be in different positions in the events derived from different sources).

As described above, the system stores the events in a data store. The events stored in the data store are field-searchable, where field-searchable herein refers to the ability to search the machine data (e.g., the raw machine data) of an event based on a field specified in search criteria. For example, a search having criteria that specifies a field name "UserID" may cause the system to field-search the machine data of events to identify events that have the field name "UserID." In another example, a search having criteria that specifies a field name "UserID" with a corresponding field value "12345" may cause the system to field-search the machine data of events to identify events having that field-value pair (e.g., field name "UserID" with a corresponding field value of "12345"). Events are field-searchable using one or more configuration files associated with the events. Each configuration file includes one or more field names, where each field name is associated with a corresponding extraction rule and a set of events to which that extraction rule applies. The set of events to which an extraction rule applies may be identified by metadata associated with the set of events. For example, an extraction rule may apply to a set of events that are each associated with a particular host, source, or source type. When events are to be searched based on a particular field name specified in a search, the system uses one or more configuration files to determine whether there is an extraction rule for that particular field name that applies to each event that falls within the criteria of the search. If so, the event is considered as part of the search results (and additional processing may be performed on that event based on criteria specified in the search). If not, the next event is similarly analyzed, and so on.

As noted above, the data intake and query system utilizes a late-binding schema while performing queries on events. One aspect of a late-binding schema is applying extraction rules to events to extract values for specific fields during search time. More specifically, the extraction rule for a field can include one or more instructions that specify how to extract a value for the field from an event. An extraction rule can generally include any type of instruction for extracting values from events. In some cases, an extraction rule comprises a regular expression, where a sequence of characters form a search pattern. An extraction rule comprising a regular expression is referred to herein as a regex rule. The system applies a regex rule to an event to extract values for a field associated with the regex rule, where the values are extracted by searching the event for the sequence of characters defined in the regex rule.

In the data intake and query system, a field extractor may be configured to automatically generate extraction rules for certain fields in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields specified in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the data intake and query system maintains the underlying machine data and uses a late-binding schema for searching the machine data, it enables a user to continue investigating and learn valuable insights about the machine data.

In some embodiments, a common field name may be used to reference two or more fields containing equivalent and/or similar data items, even though the fields may be associated with different types of events that possibly have different data formats and different extraction rules. By enabling a common field name to be used to identify equivalent and/or similar fields from different types of events generated by disparate data sources, the system facilitates use of a "common information model" (CIM) across the disparate data sources (further discussed with respect to FIG. 7A).

2.0. Operating Environment

FIG. 1 is a block diagram of an example networked computer environment 100, in accordance with example embodiments. Those skilled in the art would understand that FIG. 1 represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In some embodiments, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

2.1. Host Devices

In the illustrated embodiment, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2. Client Devices

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2.3. Client Device Applications

In some embodiments, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In some embodiments, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In some embodiments, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some embodiments, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In some embodiments, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In some embodiments, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In some embodiments, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In some embodiments, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In some embodiments, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in FIG. 1) in which a value is stored. This field indicates a network latency measurement associated with one or more network requests. The data record may include a "state" field to store a value indicating a state of a network connection, and so forth for any number of aspects of collected performance data.

2.4. Data Server System

Figure 2:
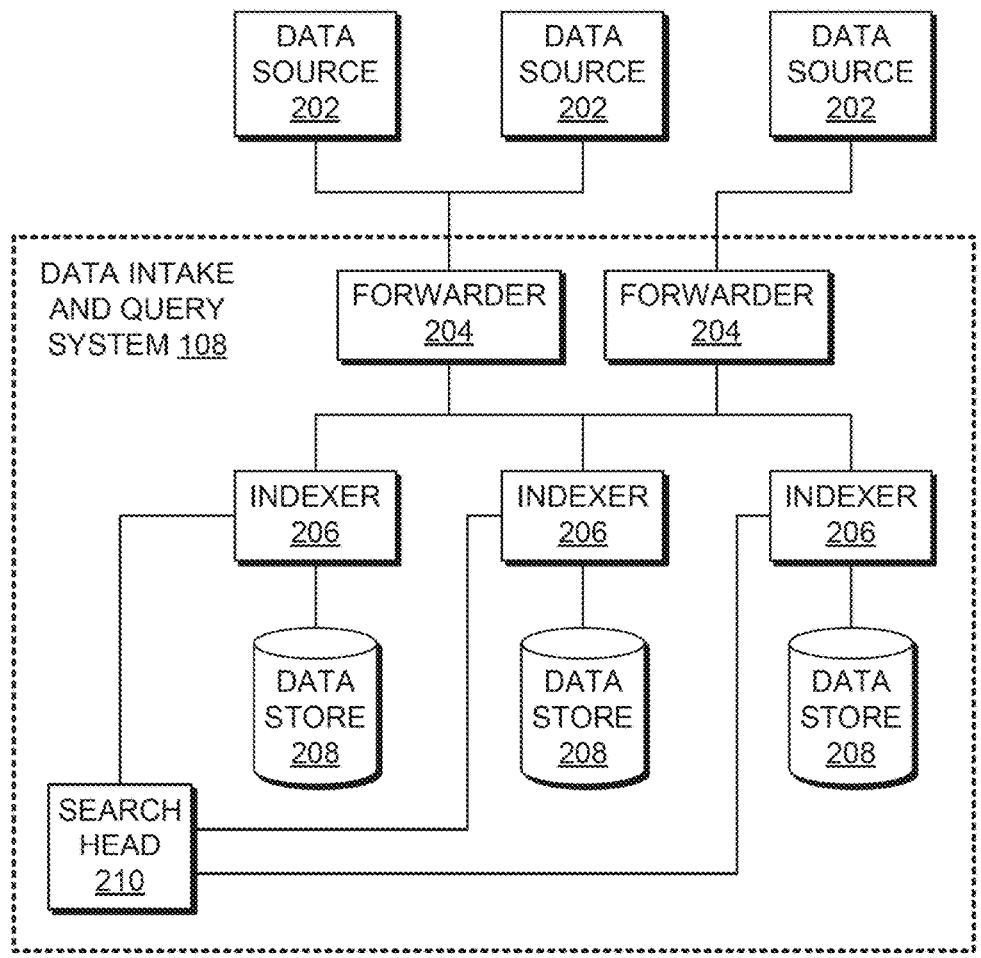
FIG. 2 is a block diagram of an example data intake and query system, in accordance with example embodiments.

FIG. 2 is a block diagram of an example data intake and query system 108, in accordance with example embodiments. System 108 includes one or more forwarders 204 that receive data from a variety of input data sources 202, and one or more indexers 206 that process and store the data in one or more data stores 208. These forwarders 204 and indexers 208 can comprise separate computer systems, or may alternatively comprise separate processes executing on one or more computer systems.

Each data source 202 broadly represents a distinct source of data that can be consumed by system 108. Examples of a data sources 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, and/or performing other data transformations.

In some embodiments, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are performed by an indexer. For example, a forwarder 204 may perform keyword extractions on raw data or parse raw data to create events. A forwarder 204 may generate time stamps for events. Additionally or alternatively, a forwarder 204 may perform routing of events to indexers 206. Data store 208 may contain events derived from machine data from a variety of sources all pertaining to the same component in an IT environment, and this data may be produced by the machine in question or by other components in the IT environment.

2.5. Cloud-Based System Overview

The example data intake and query system 108 described in reference to FIG. 2 comprises several system components, including one or more forwarders, indexers, and search heads. In some environments, a user of a data intake and query system 108 may install and configure, on computing devices owned and operated by the user, one or more software applications that implement some or all of these system components. For example, a user may install a software application on server computers owned by the user and configure each server to operate as one or more of a forwarder, an indexer, a search head, etc. This arrangement generally may be referred to as an "on-premises" solution. That is, the system 108 is installed and operates on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 108 operate.

In one embodiment, to provide an alternative to an entirely on-premises environment for system 108, one or more of the components of a data intake and query system instead may be provided as a cloud-based service. In this context, a cloud-based service refers to a service hosted by one more computing resources that are accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

Figure 3:
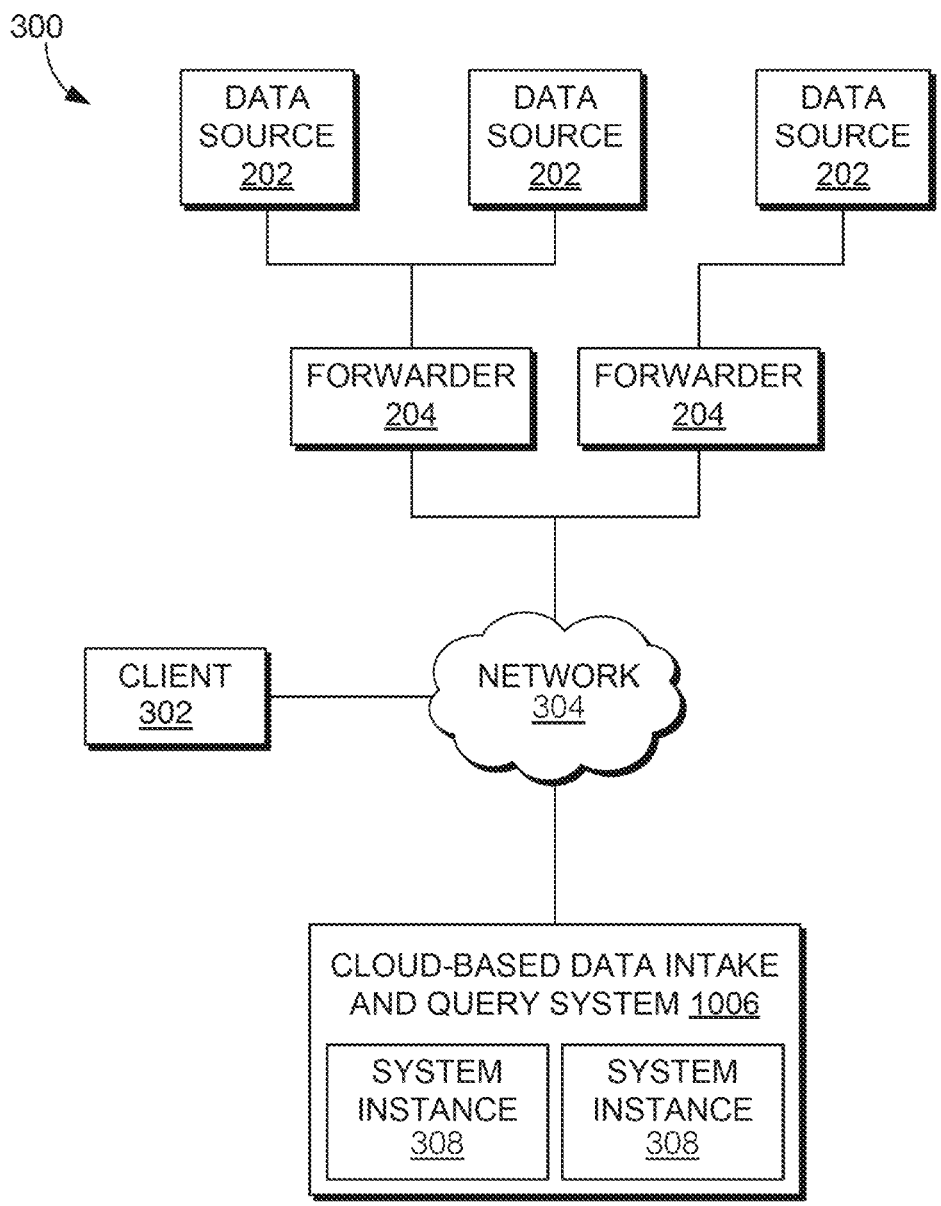
FIG. 3 is a block diagram of an example cloud-based data intake and query system, in accordance with example embodiments.

FIG. 3 illustrates a block diagram of an example cloud-based data intake and query system. Similar to the system of FIG. 2, the networked computer system 300 includes input data sources 202 and forwarders 204. These input data sources and forwarders may be in a subscriber's private computing environment. Alternatively, they might be directly managed by the service provider as part of the cloud service. In the example system 300, one or more forwarders 204 and client devices 302 are coupled to a cloud-based data intake and query system 306 via one or more networks 304. Network 304 broadly represents one or more LANs, WANs, cellular networks, intranetworks, internetworks, etc., using any of wired, wireless, terrestrial microwave, satellite links, etc., and may include the public Internet, and is used by client devices 302 and forwarders 204 to access the system 306. Similar to the system of 38, each of the forwarders 204 may be configured to receive data from an input source and to forward the data to other components of the system 306 for further processing.

In some embodiments, a cloud-based data intake and query system 306 may comprise a plurality of system instances 308. In general, each system instance 308 may include one or more computing resources managed by a provider of the cloud-based system 306 made available to a particular subscriber. The computing resources comprising a system instance 308 may, for example, include one or more servers or other devices configured to implement one or more forwarders, indexers, search heads, and other components of a data intake and query system, similar to system 108. As indicated above, a subscriber may use a web browser or other application of a client device 302 to access a web portal or other interface that enables the subscriber to configure an instance 308.

Providing a data intake and query system as described in reference to system 108 as a cloud-based service presents a number of challenges. Each of the components of a system 108 (e.g., forwarders, indexers, and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 308) and may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof (e.g., a hybrid system where both an on-premises environment, such as SPLUNK® ENTERPRISE, and a cloud-based environment, such as SPLUNK CLOUD™, are centrally visible).

2.6. Searching Externally-Archived Data

Figure 4:
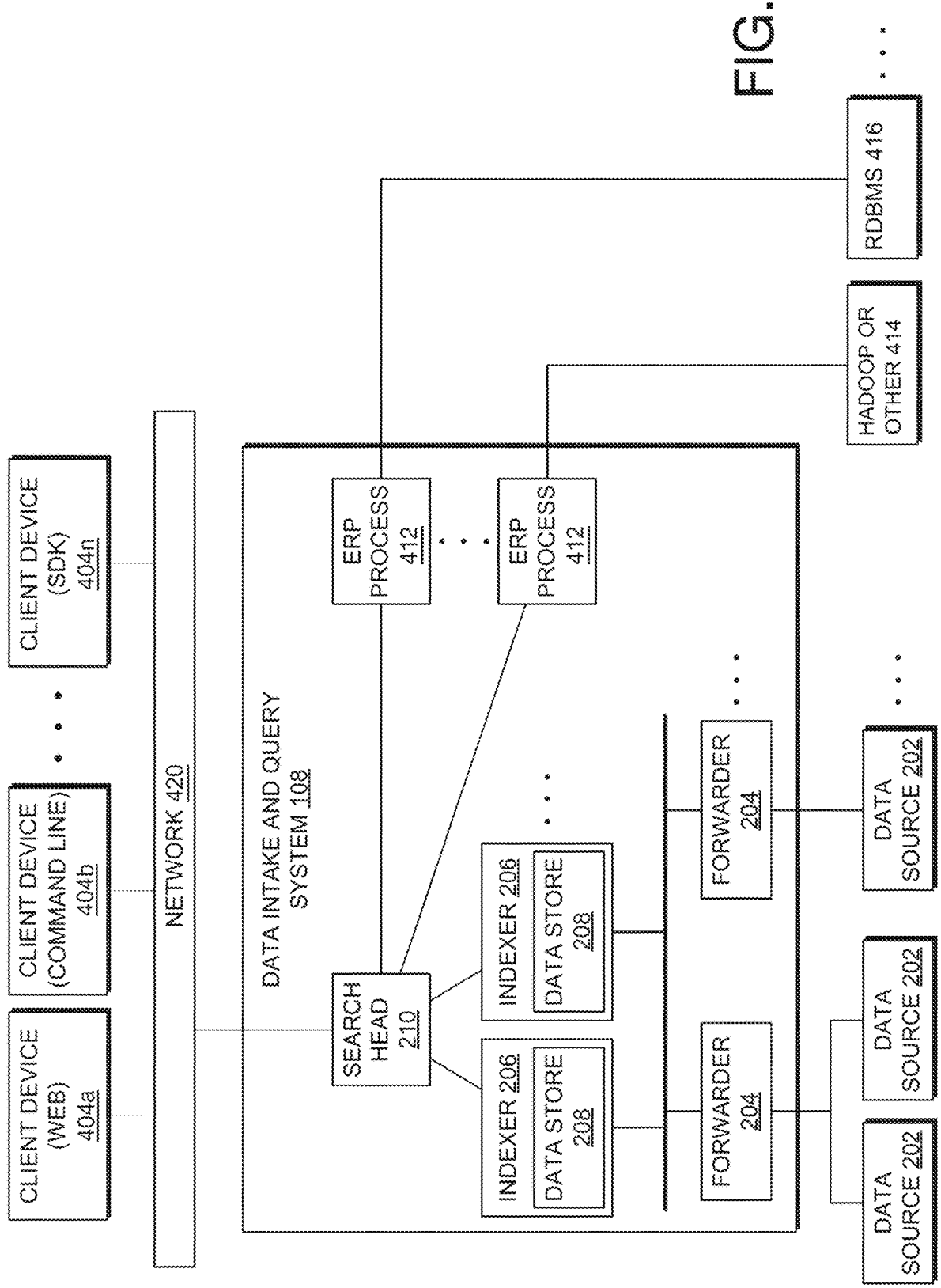
FIG. 4 is a block diagram of an example data intake and query system that performs searches across external data systems, in accordance with example embodiments.

FIG. 4 shows a block diagram of an example of a data intake and query system 108 that provides transparent search facilities for data systems that are external to the data intake and query system. Such facilities are available in the Splunk® Analytics for Hadoop® system provided by Splunk Inc. of San Francisco, Calif. Splunk® Analytics for Hadoop® represents an analytics platform that enables business and IT teams to rapidly explore, analyze, and visualize data in Hadoop® and NoSQL data stores.

The search head 210 of the data intake and query system receives search requests from one or more client devices 404 over network connections 420. As discussed above, the data intake and query system 108 may reside in an enterprise location, in the cloud, etc. FIG. 4 illustrates that multiple client devices 404a, 404b, . . . , 404n may communicate with the data intake and query system 108. The client devices 404 may communicate with the data intake and query system using a variety of connections. For example, one client device in FIG. 4 is illustrated as communicating over an Internet (Web) protocol, another client device is illustrated as communicating via a command line interface, and another client device is illustrated as communicating via a software developer kit (SDK).

The search head 210 analyzes the received search request to identify request parameters. If a search request received from one of the client devices 404 references an index maintained by the data intake and query system, then the search head 210 connects to one or more indexers 206 of the data intake and query system for the index referenced in the request parameters. That is, if the request parameters of the search request reference an index, then the search head accesses the data in the index via the indexer. The data intake and query system 108 may include one or more indexers 206, depending on system access resources and requirements. As described further below, the indexers 206 retrieve data from their respective local data stores 208 as specified in the search request. The indexers and their respective data stores can comprise one or more storage devices and typically reside on the same system, though they may be connected via a local network connection.

If the request parameters of the received search request reference an external data collection, which is not accessible to the indexers 206 or under the management of the data intake and query system, then the search head 210 can access the external data collection through an External Result Provider (ERP) process 410. An external data collection may be referred to as a "virtual index" (plural, "virtual indices"). An ERP process provides an interface through which the search head 210 may access virtual indices.

Thus, a search reference to an index of the system relates to a locally stored and managed data collection. In contrast, a search reference to a virtual index relates to an externally stored and managed data collection, which the search head may access through one or more ERP processes 410, 412. FIG. 4 shows two ERP processes 410, 412 that connect to respective remote (external) virtual indices, which are indicated as a Hadoop or another system 414 (e.g., Amazon S3, Amazon EMR, other Hadoop® Compatible File Systems (HCFS), etc.) and a relational database management system (RDBMS) 416. Other virtual indices may include other file organizations and protocols, such as Structured Query Language (SQL) and the like. The ellipses between the ERP processes 410, 412 indicate optional additional ERP processes of the data intake and query system 108. An ERP process may be a computer process that is initiated or spawned by the search head 210 and is executed by the search data intake and query system 108. Alternatively or additionally, an ERP process may be a process spawned by the search head 210 on the same or different host system as the search head 210 resides.

The search head 210 may spawn a single ERP process in response to multiple virtual indices referenced in a search request, or the search head may spawn different ERP processes for different virtual indices. Generally, virtual indices that share common data configurations or protocols may share ERP processes. For example, all search query references to a Hadoop file system may be processed by the same ERP process, if the ERP process is suitably configured. Likewise, all search query references to a SQL database may be processed by the same ERP process. In addition, the search head may provide a common ERP process for common external data source types (e.g., a common vendor may utilize a common ERP process, even if the vendor includes different data storage system types, such as Hadoop and SQL). Common indexing schemes also may be handled by common ERP processes, such as flat text files or Weblog files.

The search head 210 determines the number of ERP processes to be initiated via the use of configuration parameters that are included in a search request message. Generally, there is a one-to-many relationship between an external results provider "family" and ERP processes. There is also a one-to-many relationship between an ERP process and corresponding virtual indices that are referred to in a search request. For example, using RDBMS, assume two independent instances of such a system by one vendor, such as one RDBMS for production and another RDBMS used for development. In such a situation, it is likely preferable (but optional) to use two ERP processes to maintain the independent operation as between production and development data. Both of the ERPs, however, will belong to the same family, because the two RDBMS system types are from the same vendor.

The ERP processes 410, 412 receive a search request from the search head 210. The search head may optimize the received search request for execution at the respective external virtual index. Alternatively, the ERP process may receive a search request as a result of analysis performed by the search head or by a different system process. The ERP processes 410, 412 can communicate with the search head 210 via conventional input/output routines (e.g., standard in/standard out, etc.). In this way, the ERP process receives the search request from a client device such that the search request may be efficiently executed at the corresponding external virtual index.

The ERP processes 410, 412 may be implemented as a process of the data intake and query system. Each ERP process may be provided by the data intake and query system, or may be provided by process or application providers who are independent of the data intake and query system. Each respective ERP process may include an interface application installed at a computer of the external result provider that ensures proper communication between the search support system and the external result provider. The ERP processes 410, 412 generate appropriate search requests in the protocol and syntax of the respective virtual indices 414, 416, each of which corresponds to the search request received by the search head 210. Upon receiving search results from their corresponding virtual indices, the respective ERP process passes the result to the search head 210, which may return or display the results or a processed set of results based on the returned results to the respective client device.

Client devices 404 may communicate with the data intake and query system 108 through a network interface 420, e.g., one or more LANs, WANs, cellular networks, intranetworks, and/or internetworks using any of wired, wireless, terrestrial microwave, satellite links, etc., and may include the public Internet.

The analytics platform utilizing the External Result Provider process described in more detail in U.S. Pat. No. 8,738,629, entitled "External Result Provided Process For RetriEving Data Stored Using A Different Configuration Or Protocol", issued on 27 May 2014, U.S. Pat. No. 8,738,587, entitled "PROCESSING A SYSTEM SEARCH REQUEST BY RETRIEVING RESULTS FROM BOTH A NATIVE INDEX AND A VIRTUAL INDEX", issued on 25 Jul. 2013, U.S. patent application Ser. No. 14/266,832, entitled "PROCESSING A SYSTEM SEARCH REQUEST ACROSS DISPARATE DATA COLLECTION SYSTEMS", filed on 1 May 2014, and U.S. Pat. No. 9,514,189, entitled "PROCESSING A SYSTEM SEARCH REQUEST INCLUDING EXTERNAL DATA SOURCES", issued on 6 Dec. 2016, each of which is hereby incorporated by reference in its entirety for all purposes.

2.6.1. ERP Process Features

The ERP processes described above may include two operation modes: a streaming mode and a reporting mode. The ERP processes can operate in streaming mode only, in reporting mode only, or in both modes simultaneously. Operating in both modes simultaneously is referred to as mixed mode operation. In a mixed mode operation, the ERP at some point can stop providing the search head with streaming results and only provide reporting results thereafter, or the search head at some point may start ignoring streaming results it has been using and only use reporting results thereafter.

The streaming mode returns search results in real time, with minimal processing, in response to the search request. The reporting mode provides results of a search request with processing of the search results prior to providing them to the requesting search head, which in turn provides results to the requesting client device. ERP operation with such multiple modes provides greater performance flexibility with regard to report time, search latency, and resource utilization.

In a mixed mode operation, both streaming mode and reporting mode are operating simultaneously. The streaming mode results (e.g., the machine data obtained from the external data source) are provided to the search head, which can then process the results data (e.g., break the machine data into events, timestamp it, filter it, etc.) and integrate the results data with the results data from other external data sources, and/or from data stores of the search head. The search head performs such processing and can immediately start returning interim (streaming mode) results to the user at the requesting client device; simultaneously, the search head is waiting for the ERP process to process the data it is retrieving from the external data source as a result of the concurrently executing reporting mode.

In some instances, the ERP process initially operates in a mixed mode, such that the streaming mode operates to enable the ERP quickly to return interim results (e.g., some of the machined data or unprocessed data necessary to respond to a search request) to the search head, enabling the search head to process the interim results and begin providing to the client or search requester interim results that are responsive to the query. Meanwhile, in this mixed mode, the ERP also operates concurrently in reporting mode, processing portions of machine data in a manner responsive to the search query. Upon determining that it has results from the reporting mode available to return to the search head, the ERP may halt processing in the mixed mode at that time (or some later time) by stopping the return of data in streaming mode to the search head and switching to reporting mode only. The ERP at this point starts sending interim results in reporting mode to the search head, which in turn may then present this processed data responsive to the search request to the client or search requester. Typically the search head switches from using results from the ERP's streaming mode of operation to results from the ERP's reporting mode of operation when the higher bandwidth results from the reporting mode outstrip the amount of data processed by the search head in the streaming mode of ERP operation.

A reporting mode may have a higher bandwidth because the ERP does not have to spend time transferring data to the search head for processing all the machine data. In addition, the ERP may optionally direct another processor to do the processing.

The streaming mode of operation does not need to be stopped to gain the higher bandwidth benefits of a reporting mode; the search head could simply stop using the streaming mode results—and start using the reporting mode results—when the bandwidth of the reporting mode has caught up with or exceeded the amount of bandwidth provided by the streaming mode. Thus, a variety of triggers and ways to accomplish a search head's switch from using streaming mode results to using reporting mode results may be appreciated by one skilled in the art.

The reporting mode can involve the ERP process (or an external system) performing event breaking, time stamping, filtering of events to match the search query request, and calculating statistics on the results. The user can request particular types of data, such as if the search query itself involves types of events, or the search request may ask for statistics on data, such as on events that meet the search request. In either case, the search head understands the query language used in the received query request, which may be a proprietary language. One exemplary query language is Splunk Processing Language (SPL) developed by the assignee of the application, Splunk Inc. The search head typically understands how to use that language to obtain data from the indexers, which store data in a format used by the SPLUNK® Enterprise system.

The ERP processes support the search head, as the search head is not ordinarily configured to understand the format in which data is stored in external data sources such as Hadoop or SQL data systems. Rather, the ERP process performs that translation from the query submitted in the search support system's native format (e.g., SPL if SPLUNK® ENTERPRISE is used as the search support system) to a search query request format that will be accepted by the corresponding external data system. The external data system typically stores data in a different format from that of the search support system's native index format, and it utilizes a different query language (e.g., SQL or MapReduce, rather than SPL or the like).

As noted, the ERP process can operate in the streaming mode alone. After the ERP process has performed the translation of the query request and received raw results from the streaming mode, the search head can integrate the returned data with any data obtained from local data sources (e.g., native to the search support system), other external data sources, and other ERP processes (if such operations were required to satisfy the terms of the search query). An advantage of mixed mode operation is that, in addition to streaming mode, the ERP process is also executing concurrently in reporting mode. Thus, the ERP process (rather than the search head) is processing query results (e.g., performing event breaking, timestamping, filtering, possibly calculating statistics if required to be responsive to the search query request, etc.). It should be apparent to those skilled in the art that additional time is needed for the ERP process to perform the processing in such a configuration. Therefore, the streaming mode will allow the search head to start returning interim results to the user at the client device before the ERP process can complete sufficient processing to start returning any search results. The switchover between streaming and reporting mode happens when the ERP process determines that the switchover is appropriate, such as when the ERP process determines it can begin returning meaningful results from its reporting mode.

The operation described above illustrates the source of operational latency: streaming mode has low latency (immediate results) and usually has relatively low bandwidth (fewer results can be returned per unit of time). In contrast, the concurrently running reporting mode has relatively high latency (it has to perform a lot more processing before returning any results) and usually has relatively high bandwidth (more results can be processed per unit of time). For example, when the ERP process does begin returning report results, it returns more processed results than in the streaming mode, because, e.g., statistics only need to be calculated to be responsive to the search request. That is, the ERP process doesn't have to take time to first return machine data to the search head. As noted, the ERP process could be configured to operate in streaming mode alone and return just the machine data for the search head to process in a way that is responsive to the search request. Alternatively, the ERP process can be configured to operate in the reporting mode only. Also, the ERP process can be configured to operate in streaming mode and reporting mode concurrently, as described, with the ERP process stopping the transmission of streaming results to the search head when the concurrently running reporting mode has caught up and started providing results. The reporting mode does not require the processing of all machine data that is responsive to the search query request before the ERP process starts returning results; rather, the reporting mode usually performs processing of chunks of events and returns the processing results to the search head for each chunk.

For example, an ERP process can be configured to merely return the contents of a search result file verbatim, with little or no processing of results. That way, the search head performs all processing (such as parsing byte streams into events, filtering, etc.). The ERP process can be configured to perform additional intelligence, such as analyzing the search request and handling all the computation that a native search indexer process would otherwise perform. In this way, the configured ERP process provides greater flexibility in features while operating according to desired preferences, such as response latency and resource requirements.

2.7. Data Ingestion

Figure 5A:
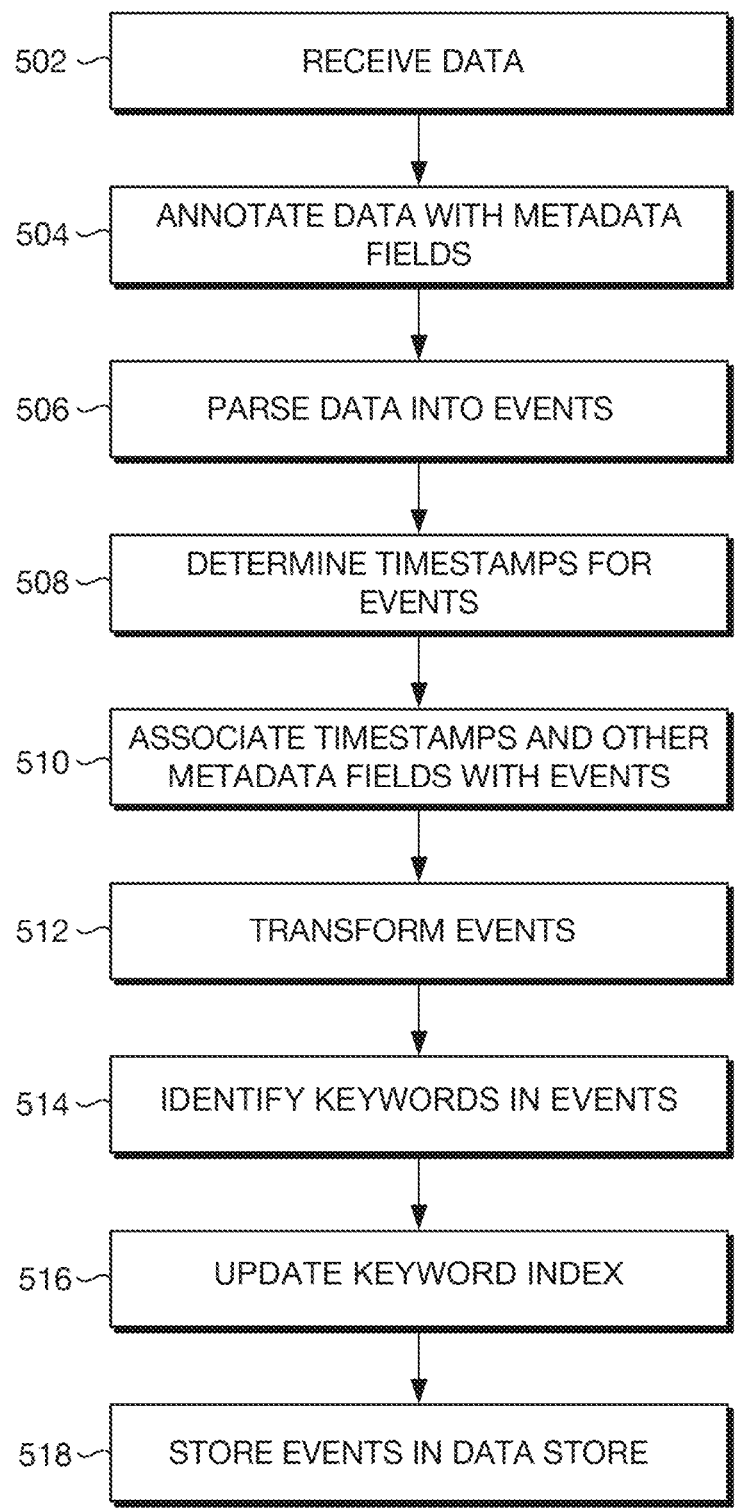
FIG. 5A is a flowchart of an example method that illustrates how indexers process, index, and store data received from forwarders, in accordance with example embodiments.

FIG. 5A is a flow chart of an example method that illustrates how indexers process, index, and store data received from forwarders, in accordance with example embodiments. The data flow illustrated in FIG. 5A is provided for illustrative purposes only; those skilled in the art would understand that one or more of the steps of the processes illustrated in FIG. 5A may be removed or that the ordering of the steps may be changed. Furthermore, for the purposes of illustrating a clear example, one or more particular system components are described in the context of performing various operations during each of the data flow stages. For example, a forwarder is described as receiving and processing machine data during an input phase; an indexer is described as parsing and indexing machine data during parsing and indexing phases; and a search head is described as performing a search query during a search phase. However, other system arrangements and distributions of the processing steps across system components may be used.

2.7.1. Input

At block 502, a forwarder receives data from an input source, such as a data source 202 shown in FIG. 2. A forwarder initially may receive the data as a raw data stream generated by the input source. For example, a forwarder may receive a data stream from a log file generated by an application server, from a stream of network data from a network device, or from any other source of data. In some embodiments, a forwarder receives the raw data and may segment the data stream into "blocks", possibly of a uniform data size, to facilitate subsequent processing steps.

At block 504, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In some embodiments, a forwarder forwards the annotated data blocks to another system component (typically an indexer) for further processing.

The data intake and query system allows forwarding of data from one data intake and query instance to another, or even to a third-party system. The data intake and query system can employ different types of forwarders in a configuration.

In some embodiments, a forwarder may contain the essential components needed to forward data. A forwarder can gather data from a variety of inputs and forward the data to an indexer for indexing and searching. A forwarder can also tag metadata (e.g., source, source type, host, etc.).

In some embodiments, a forwarder has the capabilities of the aforementioned forwarder as well as additional capabilities. The forwarder can parse data before forwarding the data (e.g., can associate a time stamp with a portion of data and create an event, etc.) and can route data based on criteria such as source or type of event. The forwarder can also index data locally while forwarding the data to another indexer.

2.7.2. Parsing

At block 506, an indexer receives data blocks from a forwarder and parses the data to organize the data into events. In some embodiments, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries within the received data that indicate the portions of machine data for events. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, the indexer can apply an inferred source type definition to the data to create the events.

At block 508, the indexer determines a timestamp for each event. Similar to the process for parsing machine data, an indexer may again refer to a source type definition associated with the data to locate one or more properties that indicate instructions for determining a timestamp for each event. The properties may, for example, instruct an indexer to extract a time value from a portion of data for the event, to interpolate time values based on timestamps associated with temporally proximate events, to create a timestamp based on a time the portion of machine data was received or generated, to use the timestamp of a previous event, or use any other rules for determining timestamps.

At block 510, the indexer associates with each event one or more metadata fields including a field containing the timestamp determined for the event. In some embodiments, a timestamp may be included in the metadata fields. These metadata fields may include any number of "default fields" that are associated with all events, and may also include one more custom fields as defined by a user. Similar to the metadata fields associated with the data blocks at block 504, the default metadata fields associated with each event may include a host, source, and source type field including or in addition to a field storing the timestamp.

At block 512, an indexer may optionally apply one or more transformations to data included in the events created at block 506. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to events may, for example, be specified in one or more configuration files and referenced by one or more source type definitions.

FIG. 5C illustrates an illustrative example of machine data can be stored in a data store in accordance with various disclosed embodiments. In other embodiments, machine data can be stored in a flat file in a corresponding bucket with an associated index file, such as a time series index or "TSIDX." As such, the depiction of machine data and associated metadata as rows and columns in the table of FIG. 5C is merely illustrative and is not intended to limit the data format in which the machine data and metadata is stored in various embodiments described herein. In one particular embodiment, machine data can be stored in a compressed or encrypted formatted. In such embodiments, the machine data can be stored with or be associated with data that describes the compression or encryption scheme with which the machine data is stored. The information about the compression or encryption scheme can be used to decompress or decrypt the machine data, and any metadata with which it is stored, at search time.

As mentioned above, certain metadata, e.g., host 536, source 537, source type 538 and timestamps 535 can be generated for each event, and associated with a corresponding portion of machine data 539 when storing the event data in a data store, e.g., data store 208. Any of the metadata can be extracted from the corresponding machine data, or supplied or defined by an entity, such as a user or computer system. The metadata fields can become part of or stored with the event. Note that while the time-stamp metadata field can be extracted from the raw data of each event, the values for the other metadata fields may be determined by the indexer based on information it receives pertaining to the source of the data separate from the machine data.

While certain default or user-defined metadata fields can be extracted from the machine data for indexing purposes, all the machine data within an event can be maintained in its original condition. As such, in embodiments in which the portion of machine data included in an event is unprocessed or otherwise unaltered, it is referred to herein as a portion of raw machine data. In other embodiments, the port of machine data in an event can be processed or otherwise altered. As such, unless certain information needs to be removed for some reasons (e.g. extraneous information, confidential information), all the raw machine data contained in an event can be preserved and saved in its original form. Accordingly, the data store in which the event records are stored is sometimes referred to as a "raw record data store." The raw record data store contains a record of the raw event data tagged with the various default fields.

In FIG. 5C, the first three rows of the table represent events 531, 532, and 533 and are related to a server access log that records requests from multiple clients processed by a server, as indicated by entry of "access.log" in the source column 536.

In the example shown in FIG. 5C, each of the events 531-534 is associated with a discrete request made from a client device. The raw machine data generated by the server and extracted from a server access log can include the IP address of the client 540, the user id of the person requesting the document 541, the time the server finished processing the request 542, the request line from the client 543, the status code returned by the server to the client 545, the size of the object returned to the client (in this case, the gif file requested by the client) 546 and the time spent to serve the request in microseconds 544. As seen in FIG. 5C, all the raw machine data retrieved from the server access log is retained and stored as part of the corresponding events, 1221, 1222, and 1223 in the data store.

Event 534 is associated with an entry in a server error log, as indicated by "error.log" in the source column 537, that records errors that the server encountered when processing a client request. Similar to the events related to the server access log, all the raw machine data in the error log file pertaining to event 534 can be preserved and stored as part of the event 534.

Saving minimally processed or unprocessed machine data in a data store associated with metadata fields in the manner similar to that shown in FIG. 5C is advantageous because it allows search of all the machine data at search time instead of searching only previously specified and identified fields or field-value pairs. As mentioned above, because data structures used by various embodiments of the present disclosure maintain the underlying raw machine data and use a late-binding schema for searching the raw machines data, it enables a user to continue investigating and learn valuable insights about the raw data. In other words, the user is not compelled to know about all the fields of information that will be needed at data ingestion time. As a user learns more about the data in the events, the user can continue to refine the late-binding schema by defining new extraction rules, or modifying or deleting existing extraction rules used by the system.

2.7.3. Indexing

At blocks 514 and 516, an indexer can optionally generate a keyword index to facilitate fast keyword searching for events. To build a keyword index, at block 514, the indexer identifies a set of keywords in each event. At block 516, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for field name-value pairs found in events, where a field name-value pair can include a pair of keywords connected by a symbol, such as an equals sign or colon. This way, events containing these field name-value pairs can be quickly located. In some embodiments, fields can automatically be generated for some or all of the field names of the field name-value pairs at the time of indexing. For example, if the string "dest=10.0.1.2" is found in an event, a field named "dest" may be created for the event, and assigned a value of "10.0.1.2".

At block 518, the indexer stores the events with an associated timestamp in a data store 208. Timestamps enable a user to search for events based on a time range. In some embodiments, the stored events are organized into "buckets," where each bucket stores events associated with a specific time range based on the timestamps associated with each event. This improves time-based searching, as well as allows for events with recent timestamps, which may have a higher likelihood of being accessed, to be stored in a faster memory to facilitate faster retrieval. For example, buckets containing the most recent events can be stored in flash memory rather than on a hard disk. In some embodiments, each bucket may be associated with an identifier, a time range, and a size constraint.

Each indexer 206 may be responsible for storing and searching a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize the data retrieval process by searching buckets corresponding to time ranges that are relevant to a query.

In some embodiments, each indexer has a home directory and a cold directory. The home directory of an indexer stores hot buckets and warm buckets, and the cold directory of an indexer stores cold buckets. A hot bucket is a bucket that is capable of receiving and storing events. A warm bucket is a bucket that can no longer receive events for storage but has not yet been moved to the cold directory. A cold bucket is a bucket that can no longer receive events and may be a bucket that was previously stored in the home directory. The home directory may be stored in faster memory, such as flash memory, as events may be actively written to the home directory, and the home directory may typically store events that are more frequently searched and thus are accessed more frequently. The cold directory may be stored in slower and/or larger memory, such as a hard disk, as events are no longer being written to the cold directory, and the cold directory may typically store events that are not as frequently searched and thus are accessed less frequently. In some embodiments, an indexer may also have a quarantine bucket that contains events having potentially inaccurate information, such as an incorrect time stamp associated with the event or a time stamp that appears to be an unreasonable time stamp for the corresponding event. The quarantine bucket may have events from any time range; as such, the quarantine bucket may always be searched at search time. Additionally, an indexer may store old, archived data in a frozen bucket that is not capable of being searched at search time. In some embodiments, a frozen bucket may be stored in slower and/or larger memory, such as a hard disk, and may be stored in offline and/or remote storage.

Moreover, events and buckets can also be replicated across different indexers and data stores to facilitate high availability and disaster recovery as described in U.S. Pat. No. 9,130,971, entitled "Site-Based Search Affinity", issued on 8 Sep. 2015, and in U.S. patent Ser. No. 14/266,817, entitled "Multi-Site Clustering", issued on 1 Sep. 2015, each of which is hereby incorporated by reference in its entirety for all purposes.

Figure 5B:
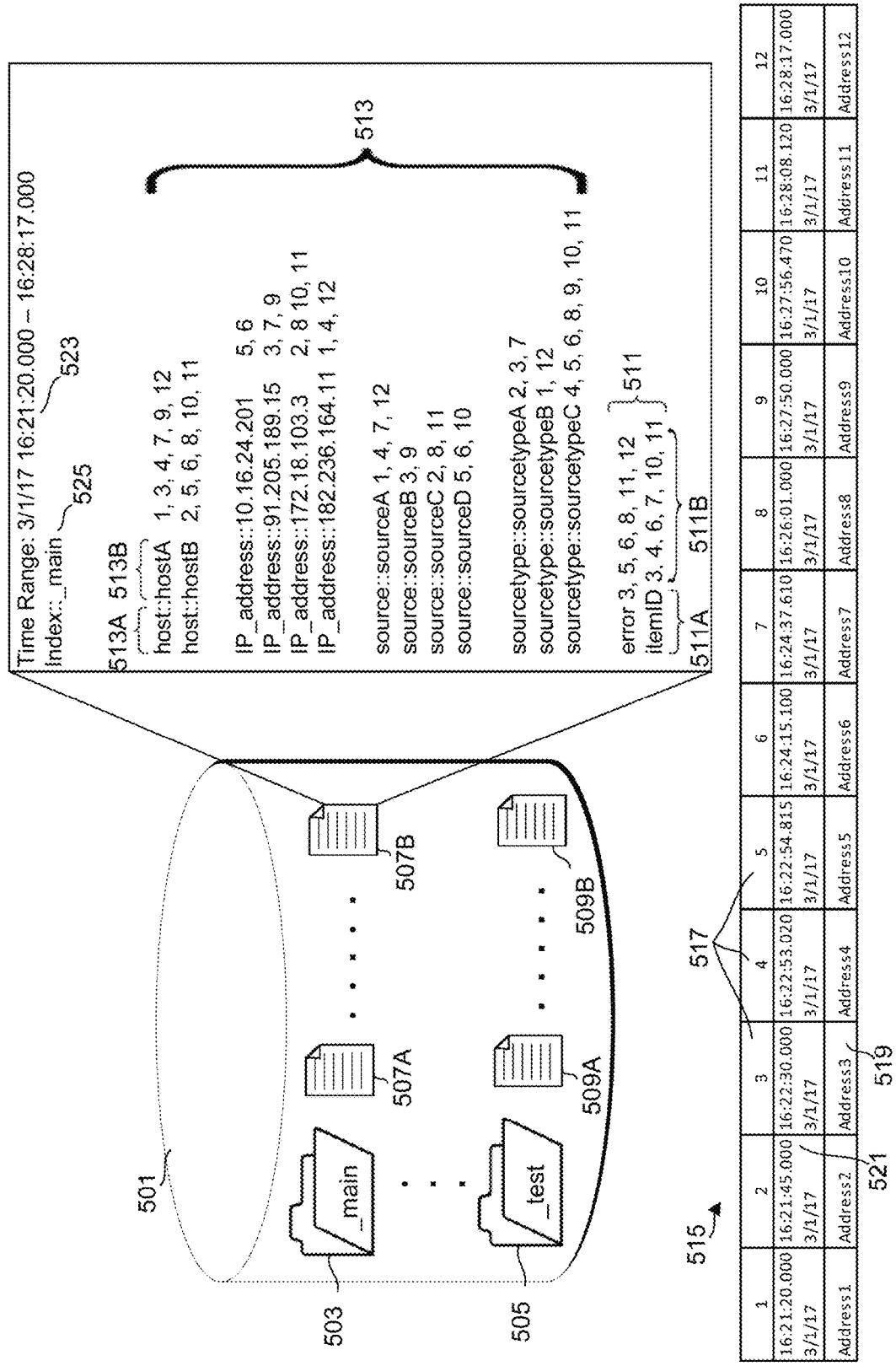
FIG. 5B is a block diagram of a data structure in which time-stamped event data can be stored in a data store, in accordance with example embodiments.

FIG. 5B is a block diagram of an example data store 501 that includes a directory for each index (or partition) that contains a portion of data managed by an indexer. FIG. 5B further illustrates details of an embodiment of an inverted index 507B and an event reference array 515 associated with inverted index 507B.

The data store 501 can correspond to a data store 208 that stores events managed by an indexer 206 or can correspond to a different data store associated with an indexer 206. In the illustrated embodiment, the data store 501 includes a _main directory 503 associated with a _main index and a _test directory 505 associated with a _test index. However, the data store 501 can include fewer or more directories. In some embodiments, multiple indexes can share a single directory or all indexes can share a common directory. Additionally, although illustrated as a single data store 501, it will be understood that the data store 501 can be implemented as multiple data stores storing different portions of the information shown in FIG. 5B. For example, a single index or partition can span multiple directories or multiple data stores, and can be indexed or searched by multiple corresponding indexers.

In the illustrated embodiment of FIG. 5B, the index-specific directories 503 and 505 include inverted indexes 507A, 507B and 509A, 509B, respectively. The inverted indexes 507A . . . 507B, and 509A . . . 509B can be keyword indexes or field-value pair indexes described herein and can include less or more information that depicted in FIG. 5B.

In some embodiments, the inverted index 507A . . . 507B, and 509A . . . 509B can correspond to a distinct time-series bucket that is managed by the indexer 206 and that contains events corresponding to the relevant index (e.g., _main index, _test index). As such, each inverted index can correspond to a particular range of time for an index. Additional files, such as high performance indexes for each time-series bucket of an index, can also be stored in the same directory as the inverted indexes 507A . . . 507B, and 509A . . . 509B. In some embodiments inverted index 507A . . . 507B, and 509A . . . 509B can correspond to multiple time-series buckets or inverted indexes 507A . . . 507B, and 509A . . . 509B can correspond to a single time-series bucket.

Each inverted index 507A . . . 507B, and 509A . . . 509B can include one or more entries, such as keyword (or token) entries or field-value pair entries. Furthermore, in certain embodiments, the inverted indexes 507A . . . 507B, and 509A . . . 509B can include additional information, such as a time range 523 associated with the inverted index or an index identifier 525 identifying the index associated with the inverted index 507A . . . 507B, and 509A . . . 509B. However, each inverted index 507A . . . 507B, and 509A . . . 509B can include less or more information than depicted.

Token entries, such as token entries 511 illustrated in inverted index 507B, can include a token 511A (e.g., "error," "itemID," etc.) and event references 511B indicative of events that include the token. For example, for the token "error," the corresponding token entry includes the token "error" and an event reference, or unique identifier, for each event stored in the corresponding time-series bucket that includes the token "error." In the illustrated embodiment of FIG. 5B, the error token entry includes the identifiers 3, 5, 6, 8, 11, and 12 corresponding to events managed by the indexer 206 and associated with the index _main 503 that are located in the time-series bucket associated with the inverted index 507B.

In some cases, some token entries can be default entries, automatically determined entries, or user specified entries. In some embodiments, the indexer 206 can identify each word or string in an event as a distinct token and generate a token entry for it. In some cases, the indexer 206 can identify the beginning and ending of tokens based on punctuation, spaces, as described in greater detail herein. In certain cases, the indexer 206 can rely on user input or a configuration file to identify tokens for token entries 511, etc. It will be understood that any combination of token entries can be included as a default, automatically determined, a or included based on user-specified criteria.

Similarly, field-value pair entries, such as field-value pair entries 513 shown in inverted index 507B, can include a field-value pair 513A and event references 513B indicative of events that include a field value that corresponds to the field-value pair. For example, for a field-value pair source-type::sendmail, a field-value pair entry would include the field-value pair sourcetype::sendmail and a unique identifier, or event reference, for each event stored in the corresponding time-series bucket that includes a sendmail sourcetype.

In some cases, the field-value pair entries 513 can be default entries, automatically determined entries, or user specified entries. As a non-limiting example, the field-value pair entries for the fields host, source, sourcetype can be included in the inverted indexes 507A . . . 507B, and 509A . . . 509B as a default. As such, all of the inverted indexes 507A . . . 507B, and 509A . . . 509B can include field-value pair entries for the fields host, source, source-type. As yet another non-limiting example, the field-value pair entries for the IP_address field can be user specified and may only appear in the inverted index 507B based on user-specified criteria. As another non-limiting example, as the indexer indexes the events, it can automatically identify field-value pairs and create field-value pair entries. For example, based on the indexers review of events, it can identify IP_address as a field in each event and add the IP_address field-value pair entries to the inverted index 507B. It will be understood that any combination of field-value pair entries can be included as a default, automatically determined, or included based on user-specified criteria.

Each unique identifier 517, or event reference, can correspond to a unique event located in the time series bucket. However, the same event reference can be located in multiple entries. For example if an event has a sourcetype splunkd, host www1 and token "warning," then the unique identifier for the event will appear in the field-value pair entries sourcetype::splunkd and host::www1, as well as the token entry "warning." With reference to the illustrated embodiment of FIG. 5B and the event that corresponds to the event reference 3, the event reference 3 is found in the field-value pair entries 513 host::hostA, source::sourceB, sourcetype::sourcetypeA, and IP_address::91.205.189.15 indicating that the event corresponding to the event references is from hostA, sourceB, of sourcetypeA, and includes 91.205.189.15 in the event data.

For some fields, the unique identifier is located in only one field-value pair entry for a particular field. For example, the inverted index may include four sourcetype field-value pair entries corresponding to four different sourcetypes of the events stored in a bucket (e.g., sourcetypes: sendmail, splunkd, web_access, and web_service). Within those four sourcetype field-value pair entries, an identifier for a particular event may appear in only one of the field-value pair entries. With continued reference to the example illustrated embodiment of FIG. 5B, since the event reference 7 appears in the field-value pair entry sourcetype::sourcetypeA, then it does not appear in the other field-value pair entries for the sourcetype field, including sourcetype::sourcetypeB, sourcetype::sourcetypeC, and sourcetype::sourcetypeD.

The event references 517 can be used to locate the events in the corresponding bucket. For example, the inverted index can include, or be associated with, an event reference array 515. The event reference array 515 can include an array entry 517 for each event reference in the inverted index 507B. Each array entry 517 can include location information 519 of the event corresponding to the unique identifier (non-limiting example: seek address of the event), a timestamp 521 associated with the event, or additional information regarding the event associated with the event reference, etc.

For each token entry 511 or field-value pair entry 513, the event reference 501B or unique identifiers can be listed in chronological order or the value of the event reference can be assigned based on chronological data, such as a timestamp associated with the event referenced by the event reference. For example, the event reference 1 in the illustrated embodiment of FIG. 5B can correspond to the first-in-time event for the bucket, and the event reference 12 can correspond to the last-in-time event for the bucket. However, the event references can be listed in any order, such as reverse chronological order, ascending order, descending order, or some other order, etc. Further, the entries can be sorted. For example, the entries can be sorted alphabetically (collectively or within a particular group), by entry origin (e.g., default, automatically generated, user-specified, etc.), by entry type (e.g., field-value pair entry, token entry, etc.), or chronologically by when added to the inverted index, etc. In the illustrated embodiment of FIG. 5B, the entries are sorted first by entry type and then alphabetically.

As a non-limiting example of how the inverted indexes 507A . . . 507B, and 509A . . . 509B can be used during a data categorization request command, the indexers can receive filter criteria indicating data that is to be categorized and categorization criteria indicating how the data is to be categorized. Example filter criteria can include, but is not limited to, indexes (or partitions), hosts, sources, sourcetypes, time ranges, field identifier, keywords, etc.

Using the filter criteria, the indexer identifies relevant inverted indexes to be searched. For example, if the filter criteria includes a set of partitions, the indexer can identify the inverted indexes stored in the directory corresponding to the particular partition as relevant inverted indexes. Other means can be used to identify inverted indexes associated with a partition of interest. For example, in some embodiments, the indexer can review an entry in the inverted indexes, such as an index-value pair entry 513 to determine if a particular inverted index is relevant. If the filter criteria does not identify any partition, then the indexer can identify all inverted indexes managed by the indexer as relevant inverted indexes.

Similarly, if the filter criteria includes a time range, the indexer can identify inverted indexes corresponding to buckets that satisfy at least a portion of the time range as relevant inverted indexes. For example, if the time range is last hour then the indexer can identify all inverted indexes that correspond to buckets storing events associated with timestamps within the last hour as relevant inverted indexes.

When used in combination, an index filter criterion specifying one or more partitions and a time range filter criterion specifying a particular time range can be used to identify a subset of inverted indexes within a particular directory (or otherwise associated with a particular partition) as relevant inverted indexes. As such, the indexer can focus the processing to only a subset of the total number of inverted indexes that the indexer manages.

Once the relevant inverted indexes are identified, the indexer can review them using any additional filter criteria to identify events that satisfy the filter criteria. In some cases, using the known location of the directory in which the relevant inverted indexes are located, the indexer can determine that any events identified using the relevant inverted indexes satisfy an index filter criterion. For example, if the filter criteria includes a partition main, then the indexer can determine that any events identified using inverted indexes within the partition main directory (or otherwise associated with the partition main) satisfy the index filter criterion.

Furthermore, based on the time range associated with each inverted index, the indexer can determine that that any events identified using a particular inverted index satisfies a time range filter criterion. For example, if a time range filter criterion is for the last hour and a particular inverted index corresponds to events within a time range of 50 minutes ago to 35 minutes ago, the indexer can determine that any events identified using the particular inverted index satisfy the time range filter criterion. Conversely, if the particular inverted index corresponds to events within a time range of 59 minutes ago to 62 minutes ago, the indexer can determine that some events identified using the particular inverted index may not satisfy the time range filter criterion.

Using the inverted indexes, the indexer can identify event references (and therefore events) that satisfy the filter criteria. For example, if the token "error" is a filter criterion, the indexer can track all event references within the token entry "error." Similarly, the indexer can identify other event references located in other token entries or field-value pair entries that match the filter criteria. The system can identify event references located in all of the entries identified by the filter criteria. For example, if the filter criteria include the token "error" and field-value pair sourcetype::web_ui, the indexer can track the event references found in both the token entry "error" and the field-value pair entry sourcetype::web_ui. As mentioned previously, in some cases, such as when multiple values are identified for a particular filter criterion (e.g., multiple sources for a source filter criterion), the system can identify event references located in at least one of the entries corresponding to the multiple values and in all other entries identified by the filter criteria. The indexer can determine that the events associated with the identified event references satisfy the filter criteria.

In some cases, the indexer can further consult a timestamp associated with the event reference to determine whether an event satisfies the filter criteria. For example, if an inverted index corresponds to a time range that is partially outside of a time range filter criterion, then the indexer can consult a timestamp associated with the event reference to determine whether the corresponding event satisfies the time range criterion. In some embodiments, to identify events that satisfy a time range, the indexer can review an array, such as the event reference array 1614 that identifies the time associated with the events. Furthermore, as mentioned above using the known location of the directory in which the relevant inverted indexes are located (or other index identifier), the indexer can determine that any events identified using the relevant inverted indexes satisfy the index filter criterion.

In some cases, based on the filter criteria, the indexer reviews an extraction rule. In certain embodiments, if the filter criteria includes a field name that does not correspond to a field-value pair entry in an inverted index, the indexer can review an extraction rule, which may be located in a configuration file, to identify a field that corresponds to a field-value pair entry in the inverted index.

For example, the filter criteria includes a field name "sessionID" and the indexer determines that at least one relevant inverted index does not include a field-value pair entry corresponding to the field name sessionID, the indexer can review an extraction rule that identifies how the sessionID field is to be extracted from a particular host, source, or sourcetype (implicitly identifying the particular host, source, or sourcetype that includes a sessionID field). The indexer can replace the field name "sessionID" in the filter criteria with the identified host, source, or sourcetype. In some cases, the field name "sessionID" may be associated with multiples hosts, sources, or sourcetypes, in which case, all identified hosts, sources, and sourcetypes can be added as filter criteria. In some cases, the identified host, source, or sourcetype can replace or be appended to a filter criterion, or be excluded. For example, if the filter criteria includes a criterion for source S1 and the "sessionID" field is found in source S2, the source S2 can replace S1 in the filter criteria, be appended such that the filter criteria includes source S1 and source S2, or be excluded based on the presence of the filter criterion source S1. If the identified host, source, or sourcetype is included in the filter criteria, the indexer can then identify a field-value pair entry in the inverted index that includes a field value corresponding to the identity of the particular host, source, or sourcetype identified using the extraction rule.

Once the events that satisfy the filter criteria are identified, the system, such as the indexer 206 can categorize the results based on the categorization criteria. The categorization criteria can include categories for grouping the results, such as any combination of partition, source, sourcetype, or host, or other categories or fields as desired.

The indexer can use the categorization criteria to identify categorization criteria-value pairs or categorization criteria values by which to categorize or group the results. The categorization criteria-value pairs can correspond to one or more field-value pair entries stored in a relevant inverted index, one or more index-value pairs based on a directory in which the inverted index is located or an entry in the inverted index (or other means by which an inverted index can be associated with a partition), or other criteria-value pair that identifies a general category and a particular value for that category. The categorization criteria values can correspond to the value portion of the categorization criteria-value pair.

As mentioned, in some cases, the categorization criteria-value pairs can correspond to one or more field-value pair entries stored in the relevant inverted indexes. For example, the categorization criteria-value pairs can correspond to field-value pair entries of host, source, and sourcetype (or other field-value pair entry as desired). For instance, if there are ten different hosts, four different sources, and five different sourcetypes for an inverted index, then the inverted index can include ten host field-value pair entries, four source field-value pair entries, and five sourcetype field-value pair entries. The indexer can use the nineteen distinct field-value pair entries as categorization criteria-value pairs to group the results.

Specifically, the indexer can identify the location of the event references associated with the events that satisfy the filter criteria within the field-value pairs, and group the event references based on their location. As such, the indexer can identify the particular field value associated with the event corresponding to the event reference. For example, if the categorization criteria include host and sourcetype, the host field-value pair entries and sourcetype field-value pair entries can be used as categorization criteria-value pairs to identify the specific host and sourcetype associated with the events that satisfy the filter criteria.

In addition, as mentioned, categorization criteria-value pairs can correspond to data other than the field-value pair entries in the relevant inverted indexes. For example, if partition or index is used as a categorization criterion, the inverted indexes may not include partition field-value pair entries. Rather, the indexer can identify the categorization criteria-value pair associated with the partition based on the directory in which an inverted index is located, information in the inverted index, or other information that associates the inverted index with the partition, etc. As such a variety of methods can be used to identify the categorization criteria-value pairs from the categorization criteria.

Accordingly based on the categorization criteria (and categorization criteria-value pairs), the indexer can generate groupings based on the events that satisfy the filter criteria. As a non-limiting example, if the categorization criteria includes a partition and sourcetype, then the groupings can correspond to events that are associated with each unique combination of partition and sourcetype. For instance, if there are three different partitions and two different sourcetypes associated with the identified events, then the six different groups can be formed, each with a unique partition value-sourcetype value combination. Similarly, if the categorization criteria includes partition, sourcetype, and host and there are two different partitions, three sourcetypes, and five hosts associated with the identified events, then the indexer can generate up to thirty groups for the results that satisfy the filter criteria. Each group can be associated with a unique combination of categorization criteria-value pairs (e.g., unique combinations of partition value sourcetype value, and host value).

In addition, the indexer can count the number of events associated with each group based on the number of events that meet the unique combination of categorization criteria for a particular group (or match the categorization criteria-value pairs for the particular group). With continued reference to the example above, the indexer can count the number of events that meet the unique combination of partition, sourcetype, and host for a particular group.

Each indexer communicates the groupings to the search head. The search head can aggregate the groupings from the indexers and provide the groupings for display. In some cases, the groups are displayed based on at least one of the host, source, sourcetype, or partition associated with the groupings. In some embodiments, the search head can further display the groups based on display criteria, such as a display order or a sort order as described in greater detail above.

As a non-limiting example and with reference to FIG. 5B, consider a request received by an indexer 206 that includes the following filter criteria: keyword=error, partition=main, time range=3/1/17 16:22.00.000-16:28.00.000, sourcetype=sourcetypeC, host=hostB, and the following categorization criteria: source.

Based on the above criteria, the indexer 206 identifies _main directory 503 and can ignore _test directory 505 and any other partition-specific directories. The indexer determines that inverted partition 507B is a relevant partition based on its location within the _main directory 503 and the time range associated with it. For sake of simplicity in this example, the indexer 206 determines that no other inverted indexes in the _main directory 503, such as inverted index 507A satisfy the time range criterion.

Having identified the relevant inverted index 507B, the indexer reviews the token entries 511 and the field-value pair entries 513 to identify event references, or events, that satisfy all of the filter criteria.

With respect to the token entries 511, the indexer can review the error token entry and identify event references 3, 5, 6, 8, 11, 12, indicating that the term "error" is found in the corresponding events. Similarly, the indexer can identify event references 4, 5, 6, 8, 9, 10, 11 in the field-value pair entry sourcetype::sourcetypeC and event references 2, 5, 6, 8, 10, 11 in the field-value pair entry host::hostB. As the filter criteria did not include a source or an IP_address field-value pair, the indexer can ignore those field-value pair entries.

In addition to identifying event references found in at least one token entry or field-value pair entry (e.g., event references 3, 4, 5, 6, 8, 9, 10, 11, 12), the indexer can identify events (and corresponding event references) that satisfy the time range criterion using the event reference array 1614 (e.g., event references 2, 3, 4, 5, 6, 7, 8, 9, 10). Using the information obtained from the inverted index 507B (including the event reference array 515), the indexer 206 can identify the event references that satisfy all of the filter criteria (e.g., event references 5, 6, 8).

Having identified the events (and event references) that satisfy all of the filter criteria, the indexer 206 can group the event references using the received categorization criteria (source). In doing so, the indexer can determine that event references 5 and 6 are located in the field-value pair entry source::sourceD (or have matching categorization criteria-value pairs) and event reference 8 is located in the field-value pair entry source::sourceC. Accordingly, the indexer can generate a sourceC group having a count of one corresponding to reference 8 and a sourceD group having a count of two corresponding to references 5 and 6. This information can be communicated to the search head. In turn the search head can aggregate the results from the various indexers and display the groupings. As mentioned above, in some embodiments, the groupings can be displayed based at least in part on the categorization criteria, including at least one of host, source, sourcetype, or partition.

It will be understood that a change to any of the filter criteria or categorization criteria can result in different groupings. As a one non-limiting example, a request received by an indexer 206 that includes the following filter criteria: partition=_main, time range=3/1/17 3/1/17 16:21:20.000-16:28:17.000, and the following categorization criteria: host, source, sourcetype would result in the indexer identifying event references 1-12 as satisfying the filter criteria. The indexer would then generate up to 24 groupings corresponding to the 24 different combinations of the categorization criteria-value pairs, including host (hostA, hostB), source (sourceA, sourceB, sourceC, sourceD), and sourcetype (sourcetypeA, sourcetypeB, sourcetypeC). However, as there are only twelve events identifiers in the illustrated embodiment and some fall into the same grouping, the indexer generates eight groups and counts as follows:

Group 1 (hostA, sourceA, sourcetypeA): 1 (event reference 7)

Group 2 (hostA, sourceA, sourcetypeB): 2 (event references 1, 12)

Group 3 (hostA, sourceA, sourcetypeC): 1 (event reference 4)

Group 4 (hostA, sourceB, sourcetypeA): 1 (event reference 3)

Group 5 (hostA, sourceB, sourcetypeC): 1 (event reference 9)

Group 6 (hostB, sourceC, sourcetypeA): 1 (event reference 2)

Group 7 (hostB, sourceC, sourcetypeC): 2 (event references 8, 11)

Group 8 (hostB, sourceD, sourcetypeC): 3 (event references 5, 6, 10)

As noted, each group has a unique combination of categorization criteria-value pairs or categorization criteria values. The indexer communicates the groups to the search head for aggregation with results received from other indexers. In communicating the groups to the search head, the indexer can include the categorization criteria-value pairs for each group and the count. In some embodiments, the indexer can include more or less information. For example, the indexer can include the event references associated with each group and other identifying information, such as the indexer or inverted index used to identify the groups.

As another non-limiting examples, a request received by an indexer 206 that includes the following filter criteria: partition=main, time range=3/1/17 3/1/17 16:21:20.000-16:28:17.000, source=sourceA, sourceD, and keyword=itemID and the following categorization criteria: host, source, sourcetype would result in the indexer identifying event references 4, 7, and 10 as satisfying the filter criteria, and generate the following groups:

Group 1 (hostA, sourceA, sourcetypeC): 1 (event reference 4)

Group 2 (hostA, sourceA, sourcetypeA): 1 (event reference 7)

Group 3 (hostB, sourceD, sourcetypeC): 1 (event references 10)

The indexer communicates the groups to the search head for aggregation with results received from other indexers. As will be understand there are myriad ways for filtering and categorizing the events and event references. For example, the indexer can review multiple inverted indexes associated with an partition or review the inverted indexes of multiple partitions, and categorize the data using any one or any combination of partition, host, source, sourcetype, or other category, as desired.

Further, if a user interacts with a particular group, the indexer can provide additional information regarding the group. For example, the indexer can perform a targeted search or sampling of the events that satisfy the filter criteria and the categorization criteria for the selected group, also referred to as the filter criteria corresponding to the group or filter criteria associated with the group.

In some cases, to provide the additional information, the indexer relies on the inverted index. For example, the indexer can identify the event references associated with the events that satisfy the filter criteria and the categorization criteria for the selected group and then use the event reference array 515 to access some or all of the identified events. In some cases, the categorization criteria values or categorization criteria-value pairs associated with the group become part of the filter criteria for the review.

With reference to FIG. 5B for instance, suppose a group is displayed with a count of six corresponding to event references 4, 5, 6, 8, 10, 11 (i.e., event references 4, 5, 6, 8, 10, 11 satisfy the filter criteria and are associated with matching categorization criteria values or categorization criteria-value pairs) and a user interacts with the group (e.g., selecting the group, clicking on the group, etc.). In response, the search head communicates with the indexer to provide additional information regarding the group.

In some embodiments, the indexer identifies the event references associated with the group using the filter criteria and the categorization criteria for the group (e.g., categorization criteria values or categorization criteria-value pairs unique to the group). Together, the filter criteria and the categorization criteria for the group can be referred to as the filter criteria associated with the group. Using the filter criteria associated with the group, the indexer identifies event references 4, 5, 6, 8, 10, 11.

Based on a sampling criteria, discussed in greater detail above, the indexer can determine that it will analyze a sample of the events associated with the event references 4, 5, 6, 8, 10, 11. For example, the sample can include analyzing event data associated with the event references 5, 8, 10. In some embodiments, the indexer can use the event reference array 1616 to access the event data associated with the event references 5, 8, 10. Once accessed, the indexer can compile the relevant information and provide it to the search head for aggregation with results from other indexers. By identifying events and sampling event data using the inverted indexes, the indexer can reduce the amount of actual data this is analyzed and the number of events that are accessed in order to generate the summary of the group and provide a response in less time.

2.8. Query Processing

Figure 6A:
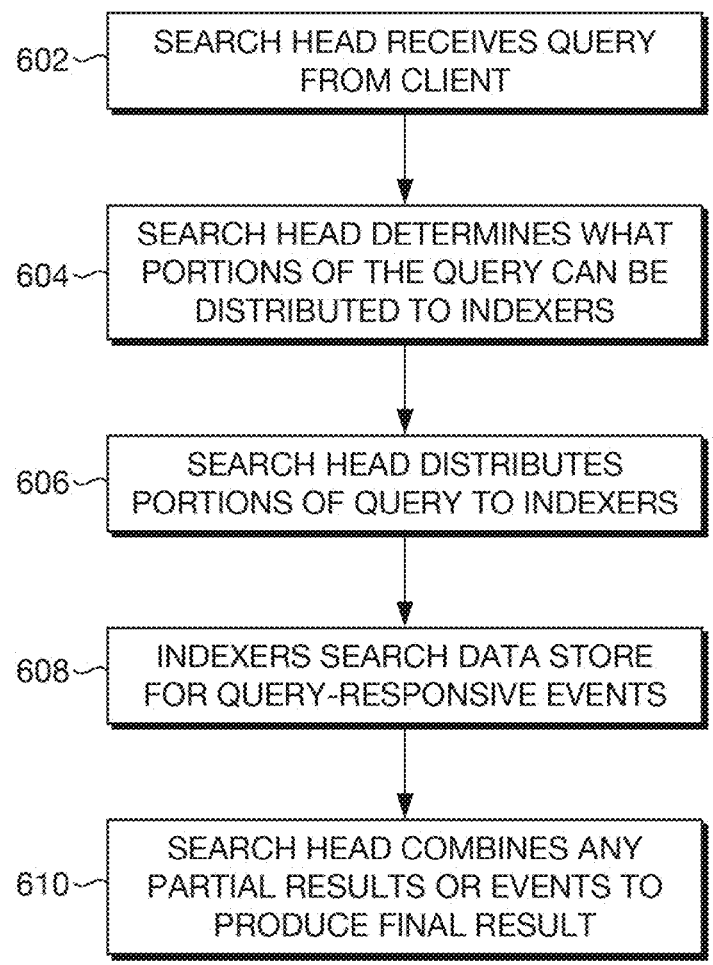
FIG. 6A is a flow diagram of an example method that illustrates how a search head and indexers perform a search query, in accordance with example embodiments.

FIG. 6A is a flow diagram of an example method that illustrates how a search head and indexers perform a search query, in accordance with example embodiments. At block 602, a search head receives a search query from a client. At block 604, the search head analyzes the search query to determine what portion(s) of the query can be delegated to indexers and what portions of the query can be executed locally by the search head. At block 606, the search head distributes the determined portions of the query to the appropriate indexers. In some embodiments, a search head cluster may take the place of an independent search head where each search head in the search head cluster coordinates with peer search heads in the search head cluster to schedule jobs, replicate search results, update configurations, fulfill search requests, etc. In some embodiments, the search head (or each search head) communicates with a master node (also known as a cluster master, not shown in FIG. 2) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block 608, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block 608 may use the late-binding schema to extract values for specified fields from events at the time the query is processed. In some embodiments, one or more rules for extracting field values may be specified as part of a source type definition in a configuration file. The indexers may then either send the relevant events back to the search head, or use the events to determine a partial result, and send the partial result back to the search head.

At block 610, the search head combines the partial results and/or events received from the indexers to produce a final result for the query. In some examples, the results of the query are indicative of performance or security of the IT environment and may help improve the performance of components in the IT environment. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries, which may be particularly helpful for queries that are performed on a periodic basis.

2.9. Pipelined Search Language

Various embodiments of the present disclosure can be implemented using, or in conjunction with, a pipelined command language. A pipelined command language is a language in which a set of inputs or data is operated on by a first command in a sequence of commands, and then subsequent commands in the order they are arranged in the sequence. Such commands can include any type of functionality for operating on data, such as retrieving, searching, filtering, aggregating, processing, transmitting, and the like. As described herein, a query can thus be formulated in a pipelined command language and include any number of ordered or unordered commands for operating on data.

Splunk Processing Language (SPL) is an example of a pipelined command language in which a set of inputs or data is operated on by any number of commands in a particular sequence. A sequence of commands, or command sequence, can be formulated such that the order in which the commands are arranged defines the order in which the commands are applied to a set of data or the results of an earlier executed command. For example, a first command in a command sequence can operate to search or filter for specific data in particular set of data. The results of the first command can then be passed to another command listed later in the command sequence for further processing.

In various embodiments, a query can be formulated as a command sequence defined in a command line of a search UI. In some embodiments, a query can be formulated as a sequence of SPL commands. Some or all of the SPL commands in the sequence of SPL commands can be separated from one another by a pipe symbol "|". In such embodiments, a set of data, such as a set of events, can be operated on by a first SPL command in the sequence, and then a subsequent SPL command following a pipe symbol "|" after the first SPL command operates on the results produced by the first SPL command or other set of data, and so on for any additional SPL commands in the sequence. As such, a query formulated using SPL comprises a series of consecutive commands that are delimited by pipe "|" characters. The pipe character indicates to the system that the output or result of one command (to the left of the pipe) should be used as the input for one of the subsequent commands (to the right of the pipe). This enables formulation of queries defined by a pipeline of sequenced commands that refines or enhances the data at each step along the pipeline until the desired results are attained. Accordingly, various embodiments described herein can be implemented with Splunk Processing Language (SPL) used in conjunction with the SPLUNK® ENTERPRISE system.

While a query can be formulated in many ways, a query can start with a search command and one or more corresponding search terms at the beginning of the pipeline. Such search terms can include any combination of keywords, phrases, times, dates, Boolean expressions, fieldname-field value pairs, etc. that specify which results should be obtained from an index. The results can then be passed as inputs into subsequent commands in a sequence of commands by using, for example, a pipe character. The subsequent commands in a sequence can include directives for additional processing of the results once it has been obtained from one or more indexes. For example, commands may be used to filter unwanted information out of the results, extract more information, evaluate field values, calculate statistics, reorder the results, create an alert, create summary of the results, or perform some type of aggregation function. In some embodiments, the summary can include a graph, chart, metric, or other visualization of the data. An aggregation function can include analysis or calculations to return an aggregate value, such as an average value, a sum, a maximum value, a root mean square, statistical values, and the like.

Due to its flexible nature, use of a pipelined command language in various embodiments is advantageous because it can perform "filtering" as well as "processing" functions. In other words, a single query can include a search command and search term expressions, as well as data-analysis expressions. For example, a command at the beginning of a query can perform a "filtering" step by retrieving a set of data based on a condition (e.g., records associated with server response times of less than 1 microsecond). The results of the filtering step can then be passed to a subsequent command in the pipeline that performs a "processing" step (e.g. calculation of an aggregate value related to the filtered events such as the average response time of servers with response times of less than 1 microsecond). Furthermore, the search command can allow events to be filtered by keyword as well as field value criteria. For example, a search command can filter out all events containing the word "warning" or filter out all events where a field value associated with a field "clientip" is "10.0.1.2."

The results obtained or generated in response to a command in a query can be considered a set of results data. The set of results data can be passed from one command to another in any data format. In one embodiment, the set of result data can be in the form of a dynamically created table. Each command in a particular query can redefine the shape of the table. In some implementations, an event retrieved from an index in response to a query can be considered a row with a column for each field value. Columns contain basic information about the data and also may contain data that has been dynamically extracted at search time.

Figure 6B:
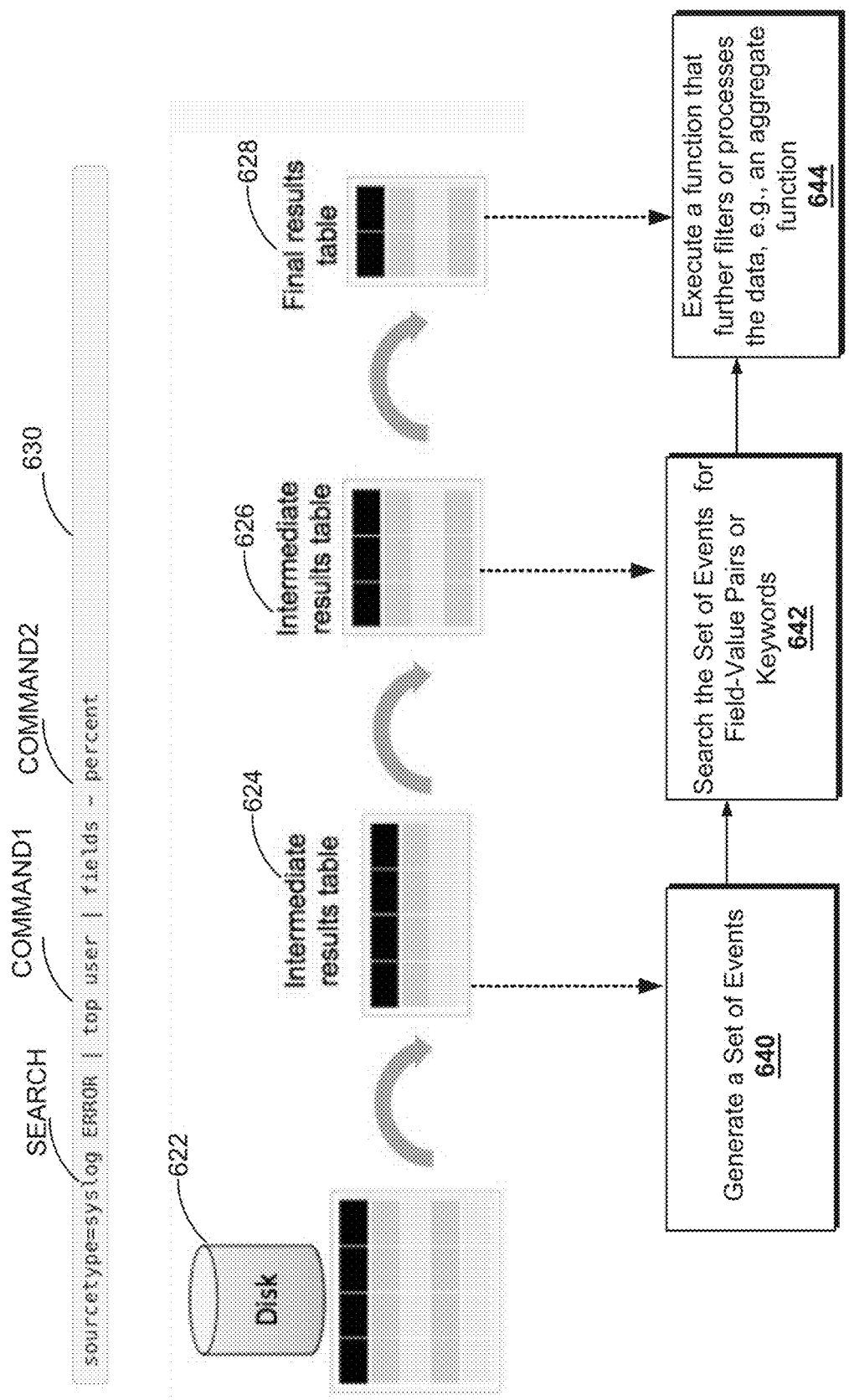
FIG. 6B provides a visual representation of an example manner in which a pipelined command language or query operates, in accordance with example embodiments.

FIG. 6B provides a visual representation of the manner in which a pipelined command language or query operates in accordance with the disclosed embodiments. The query 630 can be inputted by the user into a search. The query comprises a search, the results of which are piped to two commands (namely, command 1 and command 2) that follow the search step.

Disk 622 represents the event data in the raw record data store.

When a user query is processed, a search step will precede other queries in the pipeline in order to generate a set of events at block 640. For example, the query can comprise search terms "sourcetype=syslog ERROR" at the front of the pipeline as shown in FIG. 6B. Intermediate results table 624 shows fewer rows because it represents the subset of events retrieved from the index that matched the search terms "sourcetype=syslog ERROR" from search command 630. By way of further example, instead of a search step, the set of events at the head of the pipeline may be generating by a call to a pre-existing inverted index (as will be explained later).

At block 642, the set of events generated in the first part of the query may be piped to a query that searches the set of events for field-value pairs or for keywords. For example, the second intermediate results table 626 shows fewer columns, representing the result of the top command, "top user" which may summarize the events into a list of the top 10 users and may display the user, count, and percentage.

Finally, at block 644, the results of the prior stage can be pipelined to another stage where further filtering or processing of the data can be performed, e.g., preparing the data for display purposes, filtering the data based on a condition, performing a mathematical calculation with the data, etc. As shown in FIG. 6B, the "fields—percent" part of command 630 removes the column that shows the percentage, thereby, leaving a final results table 628 without a percentage column. In different embodiments, other query languages, such as the Structured Query Language ("SQL"), can be used to create a query.

2.10. Field Extraction

The search head 210 allows users to search and visualize events generated from machine data received from homogenous data sources. The search head 210 also allows users to search and visualize events generated from machine data received from heterogeneous data sources. The search head 210 includes various mechanisms, which may additionally reside in an indexer 206, for processing a query. A query language may be used to create a query, such as any suitable pipelined query language. For example, Splunk Processing Language (SPL) can be utilized to make a query. SPL is a pipelined search language in which a set of inputs is operated on by a first command in a command line, and then a subsequent command following the pipe symbol "|" operates on the results produced by the first command, and so on for additional commands. Other query languages, such as the Structured Query Language ("SQL"), can be used to create a query.

In response to receiving the search query, search head 210 uses extraction rules to extract values for fields in the events being searched. The search head 210 obtains extraction rules that specify how to extract a value for fields from an event. Extraction rules can comprise regex rules that specify how to extract values for the fields corresponding to the extraction rules. In addition to specifying how to extract field values, the extraction rules may also include instructions for deriving a field value by performing a function on a character string or value retrieved by the extraction rule. For example, an extraction rule may truncate a character string or convert the character string into a different data format. In some cases, the query itself can specify one or more extraction rules.

The search head 210 can apply the extraction rules to events that it receives from indexers 206. Indexers 206 may apply the extraction rules to events in an associated data store 208. Extraction rules can be applied to all the events in a data store or to a subset of the events that have been filtered based on some criteria (e.g., event time stamp values, etc.). Extraction rules can be used to extract one or more values for a field from events by parsing the portions of machine data in the events and examining the data for one or more patterns of characters, numbers, delimiters, etc., that indicate where the field begins and, optionally, ends.

Figure 7A:
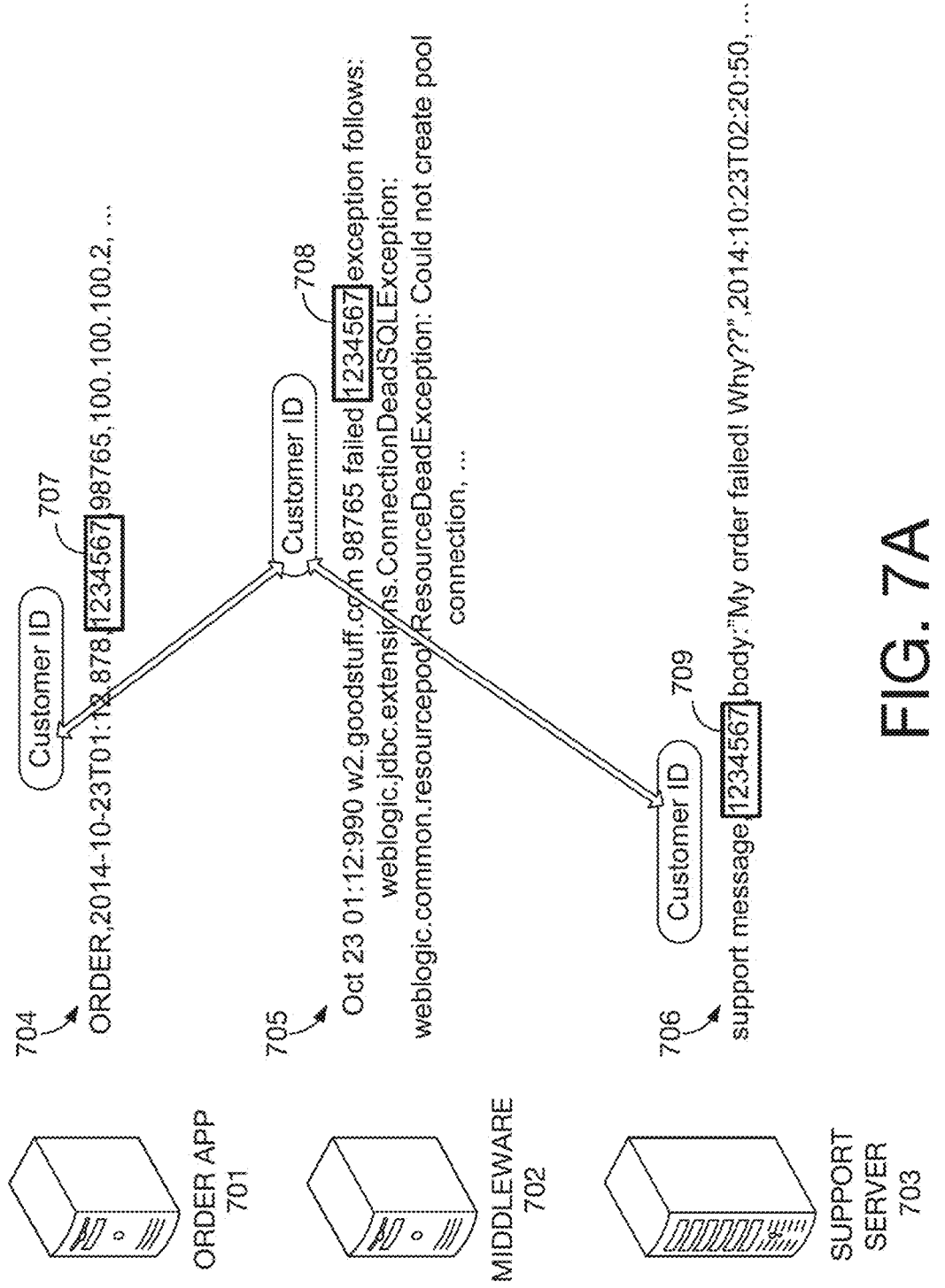
FIG. 7A is a diagram of an example scenario where a common customer identifier is found among log data received from three disparate data sources, in accordance with example embodiments.

FIG. 7A is a diagram of an example scenario where a common customer identifier is found among log data received from three disparate data sources, in accordance with example embodiments. In this example, a user submits an order for merchandise using a vendor's shopping application program 701 running on the user's system. In this example, the order was not delivered to the vendor's server due to a resource exception at the destination server that is detected by the middleware code 702. The user then sends a message to the customer support server 703 to complain about the order failing to complete. The three systems 701, 702, and 703 are disparate systems that do not have a common logging format. The order application 701 sends log data 704 to the data intake and query system in one format, the middleware code 702 sends error log data 705 in a second format, and the support server 703 sends log data 706 in a third format.

Using the log data received at one or more indexers 206 from the three systems, the vendor can uniquely obtain an insight into user activity, user experience, and system behavior. The search head 210 allows the vendor's administrator to search the log data from the three systems that one or more indexers 206 are responsible for searching, thereby obtaining correlated information, such as the order number and corresponding customer ID number of the person placing the order. The system also allows the administrator to see a visualization of related events via a user interface. The administrator can query the search head 210 for customer ID field value matches across the log data from the three systems that are stored at the one or more indexers 206. The customer ID field value exists in the data gathered from the three systems, but the customer ID field value may be located in different areas of the data given differences in the architecture of the systems. There is a semantic relationship between the customer ID field values generated by the three systems. The search head 210 requests events from the one or more indexers 206 to gather relevant events from the three systems. The search head 210 then applies extraction rules to the events in order to extract field values that it can correlate. The search head may apply a different extraction rule to each set of events from each system when the event format differs among systems. In this example, the user interface can display to the administrator the events corresponding to the common customer ID field values 707, 708, and 709, thereby providing the administrator with insight into a customer's experience.

Note that query results can be returned to a client, a search head, or any other system component for further processing. In general, query results may include a set of one or more events, a set of one or more values obtained from the events, a subset of the values, statistics calculated based on the values, a report containing the values, a visualization (e.g., a graph or chart) generated from the values, and the like.

Figure 7B:
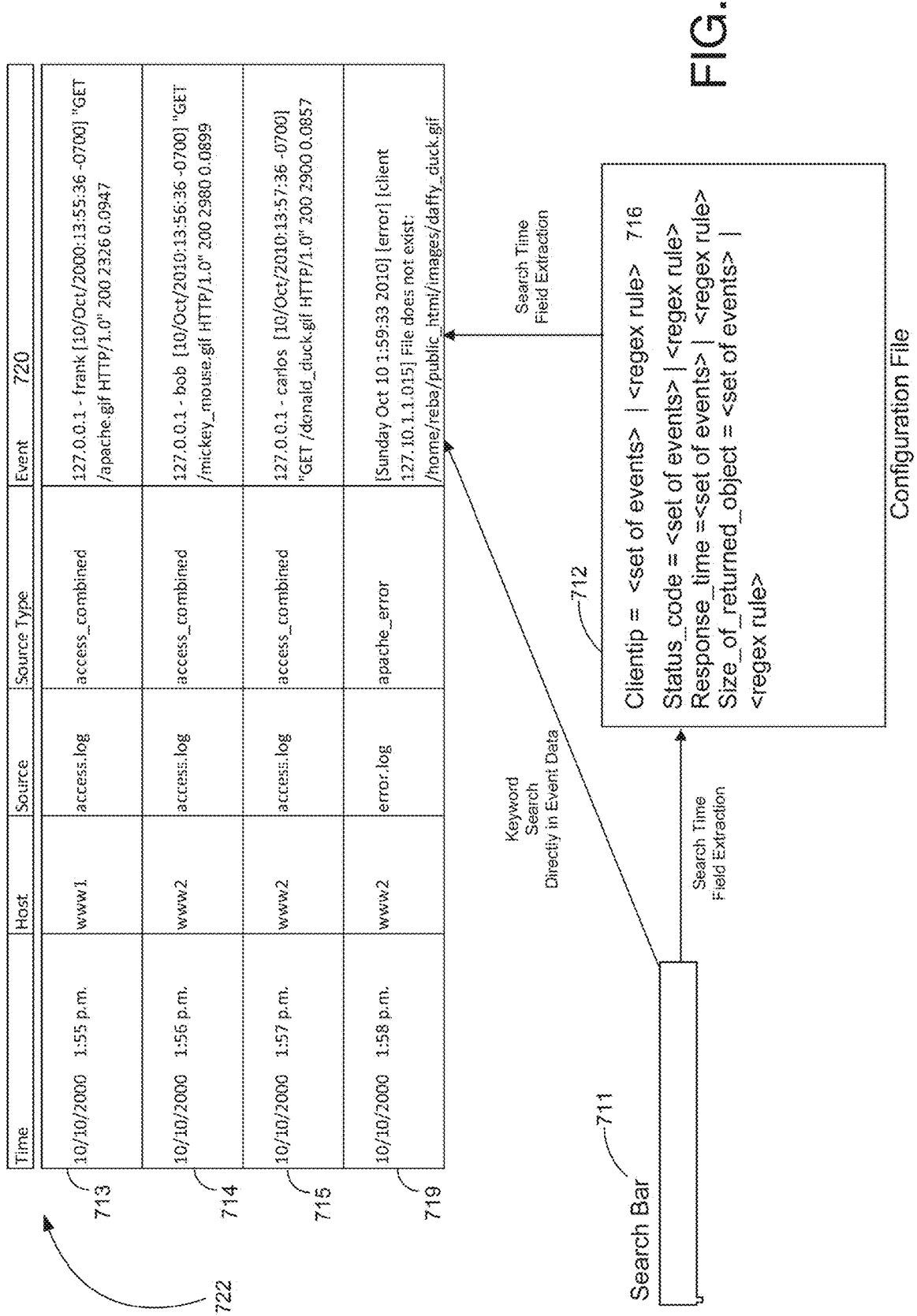
FIG. 7B illustrates an example of processing keyword searches and field searches, in accordance with disclosed embodiments.

The search system enables users to run queries against the stored data to retrieve events that meet criteria specified in a query, such as containing certain keywords or having specific values in defined fields. FIG. 7B illustrates the manner in which keyword searches and field searches are processed in accordance with disclosed embodiments.

If a user inputs a search query into search bar 1401 that includes only keywords (also known as "tokens"), e.g., the keyword "error" or "warning", the query search engine of the data intake and query system searches for those keywords directly in the event data 722 stored in the raw record data store. Note that while FIG. 7B only illustrates four events, the raw record data store (corresponding to data store 208 in FIG. 2) may contain records for millions of events.

As disclosed above, an indexer can optionally generate a keyword index to facilitate fast keyword searching for event data. The indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword. For example, if the keyword "HTTP" was indexed by the indexer at index time, and the user searches for the keyword "HTTP", events 713 to 715 will be identified based on the results returned from the keyword index. As noted above, the index contains reference pointers to the events containing the keyword, which allows for efficient retrieval of the relevant events from the raw record data store.

If a user searches for a keyword that has not been indexed by the indexer, the data intake and query system would nevertheless be able to retrieve the events by searching the event data for the keyword in the raw record data store directly as shown in FIG. 7B. For example, if a user searches for the keyword "frank", and the name "frank" has not been indexed at index time, the DATA INTAKE AND QUERY system will search the event data directly and return the first event 713. Note that whether the keyword has been indexed at index time or not, in both cases the raw data with the events 712 is accessed from the raw data record store to service the keyword search. In the case where the keyword has been indexed, the index will contain a reference pointer that will allow for a more efficient retrieval of the event data from the data store. If the keyword has not been indexed, the search engine will need to search through all the records in the data store to service the search.

In most cases, however, in addition to keywords, a user's search will also include fields. The term "field" refers to a location in the event data containing one or more values for a specific data item. Often, a field is a value with a fixed, delimited position on a line, or a name and value pair, where there is a single value to each field name. A field can also be multivalued, that is, it can appear more than once in an event and have a different value for each appearance, e.g., email address fields. Fields are searchable by the field name or field name-value pairs. Some examples of fields are "clientip" for IP addresses accessing a web server, or the "From" and "To" fields in email addresses.

By way of further example, consider the search, "status=404". This search query finds events with "status" fields that have a value of "404." When the search is run, the search engine does not look for events with any other "status" value. It also does not look for events containing other fields that share "404" as a value. As a result, the search returns a set of results that are more focused than if "404" had been used in the search string as part of a keyword search. Note also that fields can appear in events as "key=value" pairs such as "user_name=Bob." But in most cases, field values appear in fixed, delimited positions without identifying keys. For example, the data store may contain events where the "user_name" value always appears by itself after the timestamp as illustrated by the following string: "Nov 15 09:33:22 johnmedlock."

The data intake and query system advantageously allows for search time field extraction. In other words, fields can be extracted from the event data at search time using late-binding schema as opposed to at data ingestion time, which was a major limitation of the prior art systems.

In response to receiving the search query, search head 210 uses extraction rules to extract values for the fields associated with a field or fields in the event data being searched. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

FIG. 7B illustrates the manner in which configuration files may be used to configure custom fields at search time in accordance with the disclosed embodiments. In response to receiving a search query, the data intake and query system determines if the query references a "field." For example, a query may request a list of events where the "clientip" field equals "127.0.0.1." If the query itself does not specify an extraction rule and if the field is not a metadata field, e.g., time, host, source, source type, etc., then in order to determine an extraction rule, the search engine may, in one or more embodiments, need to locate configuration file 712 during the execution of the search as shown in FIG. 7B.

Configuration file 712 may contain extraction rules for all the various fields that are not metadata fields, e.g., the "clientip" field. The extraction rules may be inserted into the configuration file in a variety of ways. In some embodiments, the extraction rules can comprise regular expression rules that are manually entered in by the user. Regular expressions match patterns of characters in text and are used for extracting custom fields in text.

In one or more embodiments, as noted above, a field extractor may be configured to automatically generate extraction rules for certain field values in the events when the events are being created, indexed, or stored, or possibly at a later time. In one embodiment, a user may be able to dynamically create custom fields by highlighting portions of a sample event that should be extracted as fields using a graphical user interface. The system would then generate a regular expression that extracts those fields from similar events and store the regular expression as an extraction rule for the associated field in the configuration file 712.

In some embodiments, the indexers may automatically discover certain custom fields at index time and the regular expressions for those fields will be automatically generated at index time and stored as part of extraction rules in configuration file 712. For example, fields that appear in the event data as "key=value" pairs may be automatically extracted as part of an automatic field discovery process. Note that there may be several other ways of adding field definitions to configuration files in addition to the methods discussed herein.

The search head 210 can apply the extraction rules derived from configuration file 1402 to event data that it receives from indexers 206. Indexers 206 may apply the extraction rules from the configuration file to events in an associated data store 208. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

In one more embodiments, the extraction rule in configuration file 712 will also need to define the type or set of events that the rule applies to. Because the raw record data store will contain events from multiple heterogeneous sources, multiple events may contain the same fields in different locations because of discrepancies in the format of the data generated by the various sources. Furthermore, certain events may not contain a particular field at all. For example, event 719 also contains "clientip" field, however, the "clientip" field is in a different format from events 713-715. To address the discrepancies in the format and content of the different types of events, the configuration file will also need to specify the set of events that an extraction rule applies to, e.g., extraction rule 716 specifies a rule for filtering by the type of event and contains a regular expression for parsing out the field value. Accordingly, each extraction rule will pertain to only a particular type of event. If a particular field, e.g., "clientip" occurs in multiple events, each of those types of events would need its own corresponding extraction rule in the configuration file 712 and each of the extraction rules would comprise a different regular expression to parse out the associated field value. The most common way to categorize events is by source type because events generated by a particular source can have the same format.

The field extraction rules stored in configuration file 712 perform search-time field extractions. For example, for a query that requests a list of events with source type "access_combined" where the "clientip" field equals "127.0.0.1," the query search engine would first locate the configuration file 712 to retrieve extraction rule 716 that would allow it to extract values associated with the "clientip" field from the event data 720 "where the source type is "access_combined." After the "clientip" field has been extracted from all the events comprising the "clientip" field where the source type is "access_combined," the query search engine can then execute the field criteria by performing the compare operation to filter out the events where the "clientip" field equals "127.0.0.1." In the example shown in FIG. 7B, events 713-715 would be returned in response to the user query. In this manner, the search engine can service queries containing field criteria in addition to queries containing keyword criteria (as explained above).

The configuration file can be created during indexing. It may either be manually created by the user or automatically generated with certain predetermined field extraction rules. As discussed above, the events may be distributed across several indexers, wherein each indexer may be responsible for storing and searching a subset of the events contained in a corresponding data store. In a distributed indexer system, each indexer would need to maintain a local copy of the configuration file that is synchronized periodically across the various indexers.

The ability to add schema to the configuration file at search time results in increased efficiency. A user can create new fields at search time and simply add field definitions to the configuration file. As a user learns more about the data in the events, the user can continue to refine the late-binding schema by adding new fields, deleting fields, or modifying the field extraction rules in the configuration file for use the next time the schema is used by the system. Because the data intake and query system maintains the underlying raw data and uses late-binding schema for searching the raw data, it enables a user to continue investigating and learn valuable insights about the raw data long after data ingestion time.

The ability to add multiple field definitions to the configuration file at search time also results in increased flexibility. For example, multiple field definitions can be added to the configuration file to capture the same field across events generated by different source types. This allows the data intake and query system to search and correlate data across heterogeneous sources flexibly and efficiently.

Further, by providing the field definitions for the queried fields at search time, the configuration file 712 allows the record data store 712 to be field searchable. In other words, the raw record data store 712 can be searched using keywords as well as fields, wherein the fields are searchable name/value pairings that distinguish one event from another and can be defined in configuration file 1402 using extraction rules. In comparison to a search containing field names, a keyword search does not need the configuration file and can search the event data directly as shown in FIG. 7B.

It should also be noted that any events filtered out by performing a search-time field extraction using a configuration file can be further processed by directing the results of the filtering step to a processing step using a pipelined search language. Using the prior example, a user could pipeline the results of the compare step to an aggregate function by asking the query search engine to count the number of events where the "clientip" field equals "127.0.0.1."

2.11. Example Search Screen

Figure 8A:
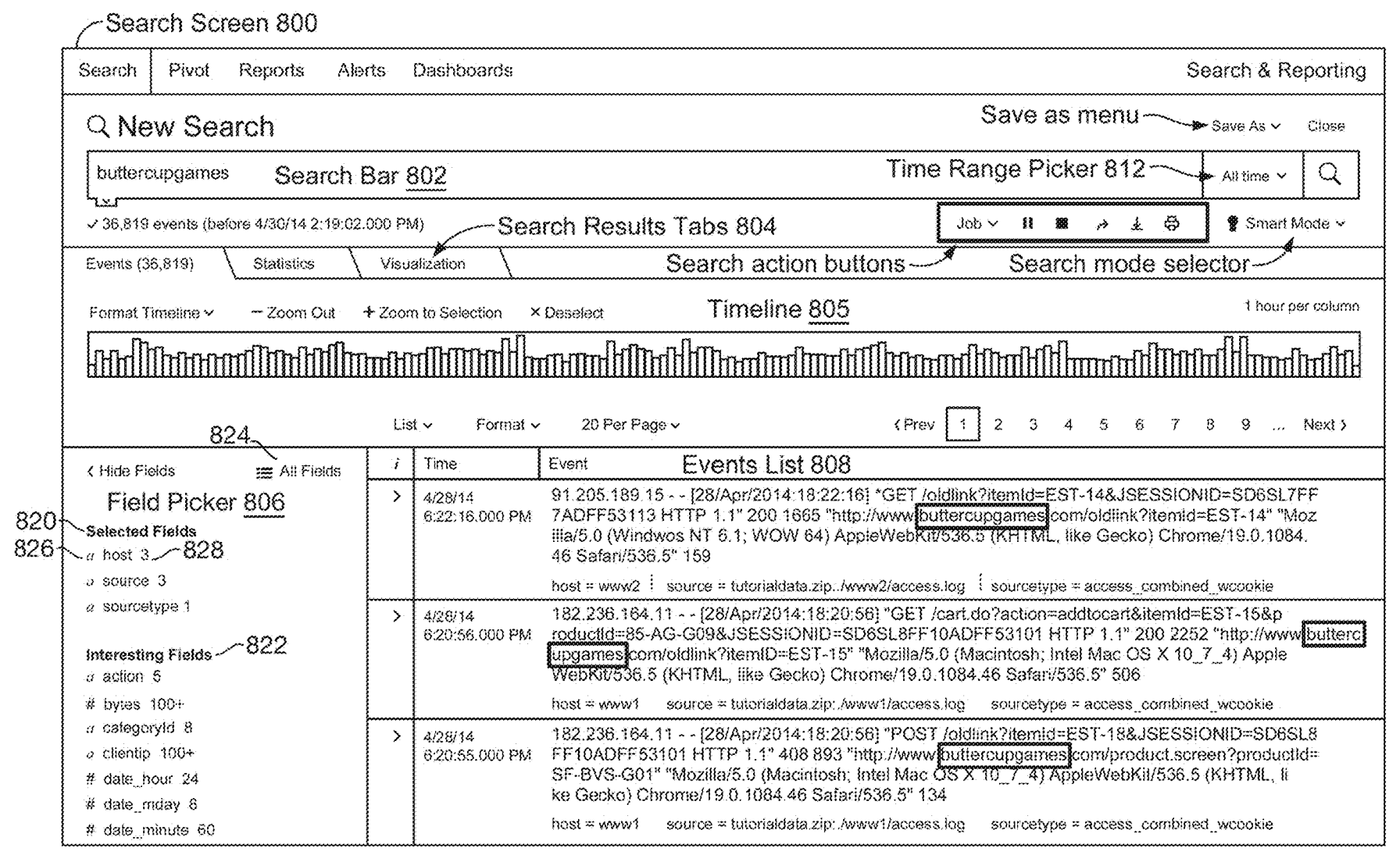

FIG. 8A is an interface diagram of an example user interface for a search screen 800, in accordance with example embodiments. Search screen 800 includes a search bar 802 that accepts user input in the form of a search string. It also includes a time range picker 812 that enables the user to specify a time range for the search. For historical searches (e.g., searches based on a particular historical time range), the user can select a specific time range, or alternatively a relative time range, such as "today," "yesterday" or "last week." For real-time searches (e.g., searches whose results are based on data received in real-time), the user can select the size of a preceding time window to search for real-time events. Search screen 800 also initially may display a "data summary" dialog as is illustrated in FIG. 8B that enables the user to select different sources for the events, such as by selecting specific hosts and log files.

After the search is executed, the search screen 800 in FIG. 8A can display the results through search results tabs 804, wherein search results tabs 804 includes: an "events tab" that may display various information about events returned by the search; a "statistics tab" that may display statistics about the search results; and a "visualization tab" that may display various visualizations of the search results. The events tab illustrated in FIG. 8A may display a timeline graph 805 that graphically illustrates the number of events that occurred in one-hour intervals over the selected time range. The events tab also may display an events list 808 that enables a user to view the machine data in each of the returned events.

The events tab additionally may display a sidebar that is an interactive field picker 806. The field picker 806 may be displayed to a user in response to the search being executed and allows the user to further analyze the search results based on the fields in the events of the search results. The field picker 806 includes field names that reference fields present in the events in the search results. The field picker may display any Selected Fields 820 that a user has pre-selected for display (e.g., host, source, sourcetype) and may also display any Interesting Fields 822 that the system determines may be interesting to the user based on pre-specified criteria (e.g., action, bytes, categoryid, clientip, date_hour, date_mday, date_minute, etc.). The field picker also provides an option to display field names for all the fields present in the events of the search results using the All Fields control 824.

Each field name in the field picker 806 has a value type identifier to the left of the field name, such as value type identifier 826. A value type identifier identifies the type of value for the respective field, such as an "a" for fields that include literal values or a "#" for fields that include numerical values.

Each field name in the field picker also has a unique value count to the right of the field name, such as unique value count 828. The unique value count indicates the number of unique values for the respective field in the events of the search results.

Each field name is selectable to view the events in the search results that have the field referenced by that field name. For example, a user can select the "host" field name, and the events shown in the events list 808 will be updated with events in the search results that have the field that is reference by the field name "host."

2.12. Data Models

A data model is a hierarchically structured search-time mapping of semantic knowledge about one or more datasets. It encodes the domain knowledge used to build a variety of specialized searches of those datasets. Those searches, in turn, can be used to generate reports.

A data model is composed of one or more "objects" (or "data model objects") that define or otherwise correspond to a specific set of data. An object is defined by constraints and attributes. An object's constraints are search criteria that define the set of events to be operated on by running a search having that search criteria at the time the data model is selected. An object's attributes are the set of fields to be exposed for operating on that set of events generated by the search criteria.

Objects in data models can be arranged hierarchically in parent/child relationships. Each child object represents a subset of the dataset covered by its parent object. The top-level objects in data models are collectively referred to as "root objects."

Child objects have inheritance. Child objects inherit constraints and attributes from their parent objects and may have additional constraints and attributes of their own. Child objects provide a way of filtering events from parent objects. Because a child object may provide an additional constraint in addition to the constraints it has inherited from its parent object, the dataset it represents may be a subset of the dataset that its parent represents. For example, a first data model object may define a broad set of data pertaining to e-mail activity generally, and another data model object may define specific datasets within the broad dataset, such as a subset of the e-mail data pertaining specifically to e-mails sent. For example, a user can simply select an "e-mail activity" data model object to access a dataset relating to e-mails generally (e.g., sent or received), or select an "e-mails sent" data model object (or data sub-model object) to access a dataset relating to e-mails sent.

Because a data model object is defined by its constraints (e.g., a set of search criteria) and attributes (e.g., a set of fields), a data model object can be used to quickly search data to identify a set of events and to identify a set of fields to be associated with the set of events. For example, an "e-mails sent" data model object may specify a search for events relating to e-mails that have been sent, and specify a set of fields that are associated with the events. Thus, a user can retrieve and use the "e-mails sent" data model object to quickly search source data for events relating to sent e-mails, and may be provided with a listing of the set of fields relevant to the events in a user interface screen.

Examples of data models can include electronic mail, authentication, databases, intrusion detection, malware, application state, alerts, compute inventory, network sessions, network traffic, performance, audits, updates, vulnerabilities, etc. Data models and their objects can be designed by knowledge managers in an organization, and they can enable downstream users to quickly focus on a specific set of data. A user iteratively applies a model development tool (not shown in FIG. 8A) to prepare a query that defines a subset of events and assigns an object name to that subset. A child subset is created by further limiting a query that generated a parent subset.

Data definitions in associated schemas can be taken from the common information model (CIM) or can be devised for a particular schema and optionally added to the CIM. Child objects inherit fields from parents and can include fields not present in parents. A model developer can select fewer extraction rules than are available for the sources returned by the query that defines events belonging to a model. Selecting a limited set of extraction rules can be a tool for simplifying and focusing the data model, while allowing a user flexibility to explore the data subset. Development of a data model is further explained in U.S. Pat. Nos. 8,788,525 and 8,788,526, both entitled "DATA MODEL FOR MACHINE DATA FOR SEMANTIC SEARCH", both issued on 22 Jul. 2014, U.S. Pat. No. 8,983,994, entitled "GENERATION OF A DATA MODEL FOR SEARCHING MACHINE DATA", issued on 17 Mar. 2015, U.S. Pat. No. 9,128,980, entitled "GENERATION OF A DATA MODEL APPLIED TO QUERIES", issued on 8 Sep. 2015, and U.S.

Pat. No. 9,589,012, entitled "GENERATION OF A DATA MODEL APPLIED TO OBJECT QUERIES", issued on 7 Mar. 2017, each of which is hereby incorporated by reference in its entirety for all purposes.

A data model can also include reports. One or more report formats can be associated with a particular data model and be made available to run against the data model. A user can use child objects to design reports with object datasets that already have extraneous data pre-filtered out. In some embodiments, the data intake and query system 108 provides the user with the ability to produce reports (e.g., a table, chart, visualization, etc.) without having to enter SPL, SQL, or other query language terms into a search screen. Data models are used as the basis for the search feature.

Data models may be selected in a report generation interface. The report generator supports drag-and-drop organization of fields to be summarized in a report. When a model is selected, the fields with available extraction rules are made available for use in the report. The user may refine and/or filter search results to produce more precise reports. The user may select some fields for organizing the report and select other fields for providing detail according to the report organization. For example, "region" and "salesperson" are fields used for organizing the report and sales data can be summarized (subtotaled and totaled) within this organization. The report generator allows the user to specify one or more fields within events and apply statistical analysis on values extracted from the specified one or more fields. The report generator may aggregate search results across sets of events and generate statistics based on aggregated search results. Building reports using the report generation interface is further explained in U.S. patent application Ser. No. 14/503,335, entitled "GENERATING REPORTS FROM UNSTRUCTURED DATA", filed on 30 Sep. 2014, and which is hereby incorporated by reference in its entirety for all purposes. Data visualizations also can be generated in a variety of formats, by reference to the data model. Reports, data visualizations, and data model objects can be saved and associated with the data model for future use. The data model object may be used to perform searches of other data.

FIGS. 9-15 are interface diagrams of example report generation user interfaces, in accordance with example embodiments. The report generation process may be driven by a predefined data model object, such as a data model object defined and/or saved via a reporting application or a data model object obtained from another source. A user can load a saved data model object using a report editor. For example, the initial search query and fields used to drive the report editor may be obtained from a data model object. The data model object that is used to drive a report generation process may define a search and a set of fields. Upon loading of the data model object, the report generation process may enable a user to use the fields (e.g., the fields defined by the data model object) to define criteria for a report (e.g., filters, split rows/columns, aggregates, etc.) and the search may be used to identify events (e.g., to identify events responsive to the search) used to generate the report. That is, for example, if a data model object is selected to drive a report editor, the graphical user interface of the report editor may enable a user to define reporting criteria for the report using the fields associated with the selected data model object, and the events used to generate the report may be constrained to the events that match, or otherwise satisfy, the search constraints of the selected data model object.

Figure 9:
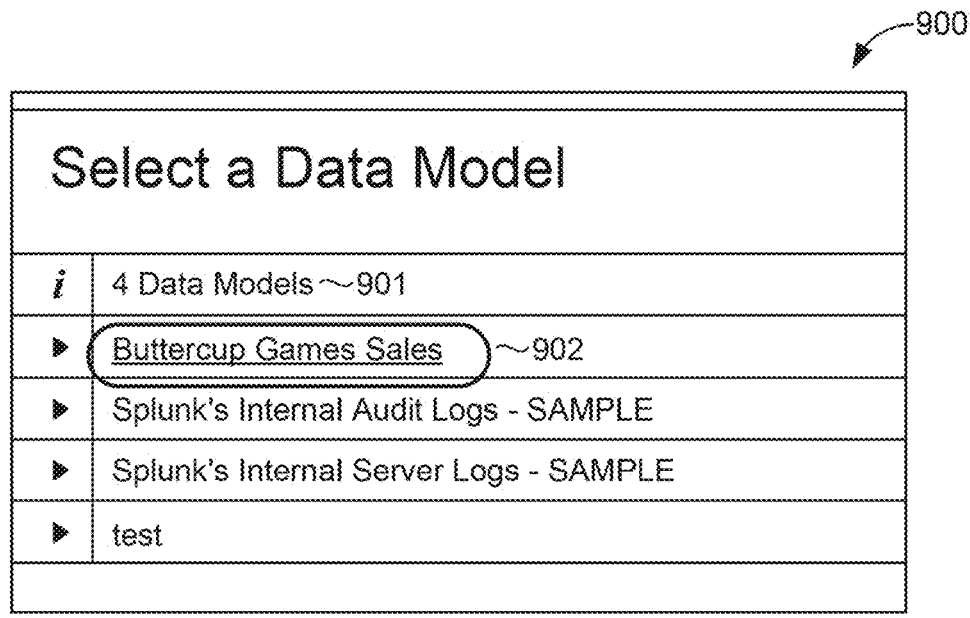

The selection of a data model object for use in driving a report generation may be facilitated by a data model object selection interface. FIG. 9 illustrates an example interactive data model selection graphical user interface 900 of a report editor that may display a listing of available data models 901. The user may select one of the data models 902.

Figure 10:
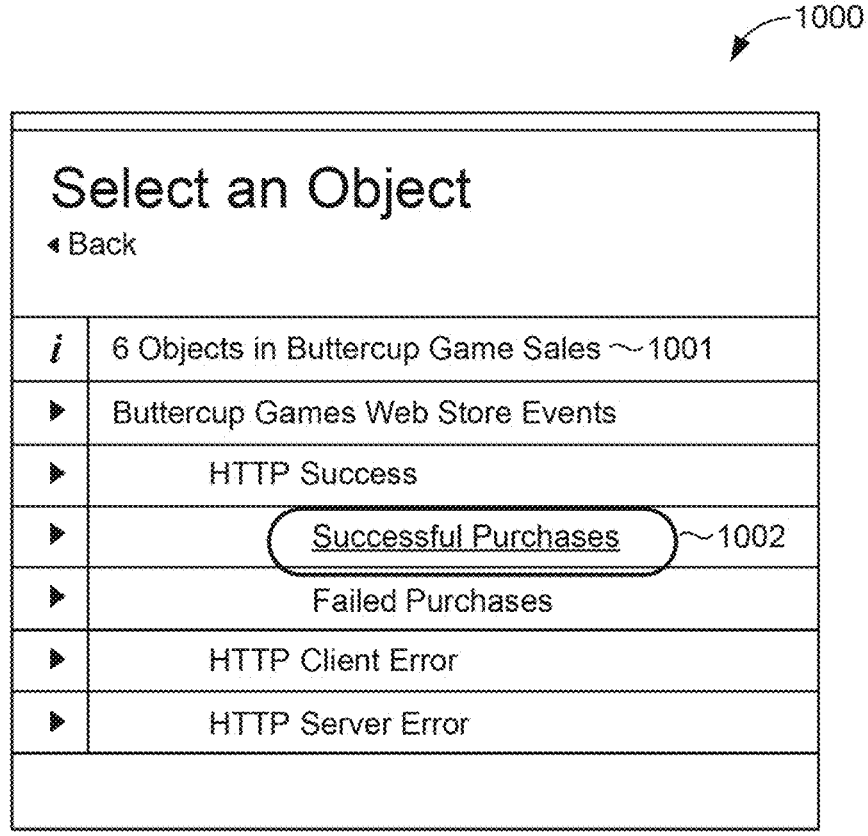

FIG. 10 illustrates an example data model object selection graphical user interface 1000 that may display available data objects 1001 for the selected data object model 902. The user may select one of the displayed data model objects 1002 for use in driving the report generation process.

Figure 11A:
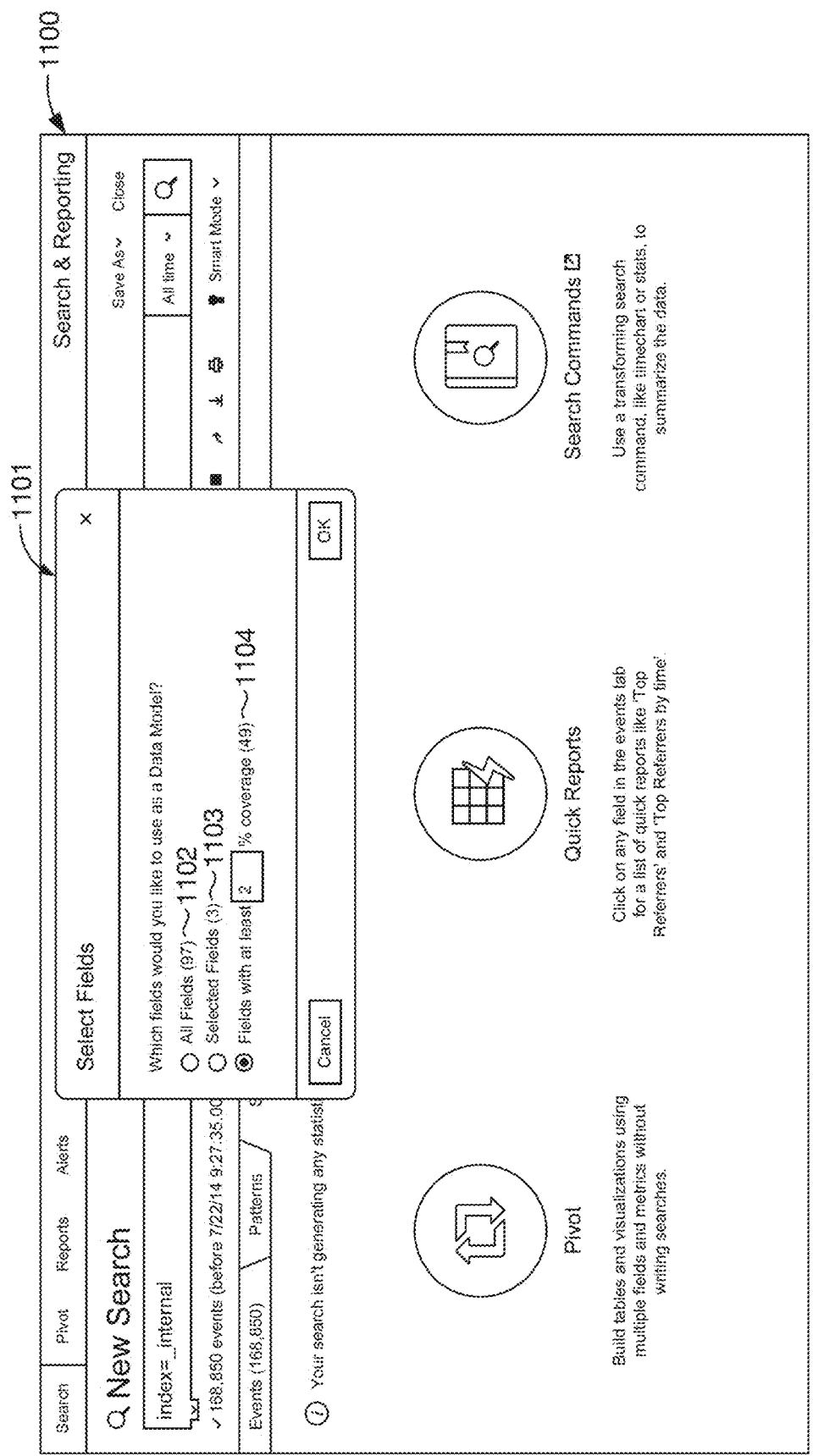

Once a data model object is selected by the user, a user interface screen 1100 shown in FIG. 11A may display an interactive listing of automatic field identification options 1101 based on the selected data model object. For example, a user may select one of the three illustrated options (e.g., the "All Fields" option 1102, the "Selected Fields" option 1103, or the "Coverage" option (e.g., fields with at least a specified % of coverage) 1104). If the user selects the "All Fields" option 1102, all of the fields identified from the events that were returned in response to an initial search query may be selected. That is, for example, all of the fields of the identified data model object fields may be selected. If the user selects the "Selected Fields" option 1103, only the fields from the fields of the identified data model object fields that are selected by the user may be used. If the user selects the "Coverage" option 1104, only the fields of the identified data model object fields meeting a specified coverage criteria may be selected. A percent coverage may refer to the percentage of events returned by the initial search query that a given field appears in. Thus, for example, if an object dataset includes 10,000 events returned in response to an initial search query, and the "avg_age" field appears in 854 of those 10,000 events, then the "avg_age" field would have a coverage of 8.54% for that object dataset. If, for example, the user selects the "Coverage" option and specifies a coverage value of 2%, only fields having a coverage value equal to or greater than 2% may be selected. The number of fields corresponding to each selectable option may be displayed in association with each option. For example, "97" displayed next to the "All Fields" option 1102 indicates that 97 fields will be selected if the "All Fields" option is selected. The "3" displayed next to the "Selected Fields" option 1103 indicates that 3 of the 97 fields will be selected if the "Selected Fields" option is selected. The "49" displayed next to the "Coverage" option 1104 indicates that 49 of the 97 fields (e.g., the 49 fields having a coverage of 2% or greater) will be selected if the "Coverage" option is selected. The number of fields corresponding to the "Coverage" option may be dynamically updated based on the specified percent of coverage.

Figure 11B:
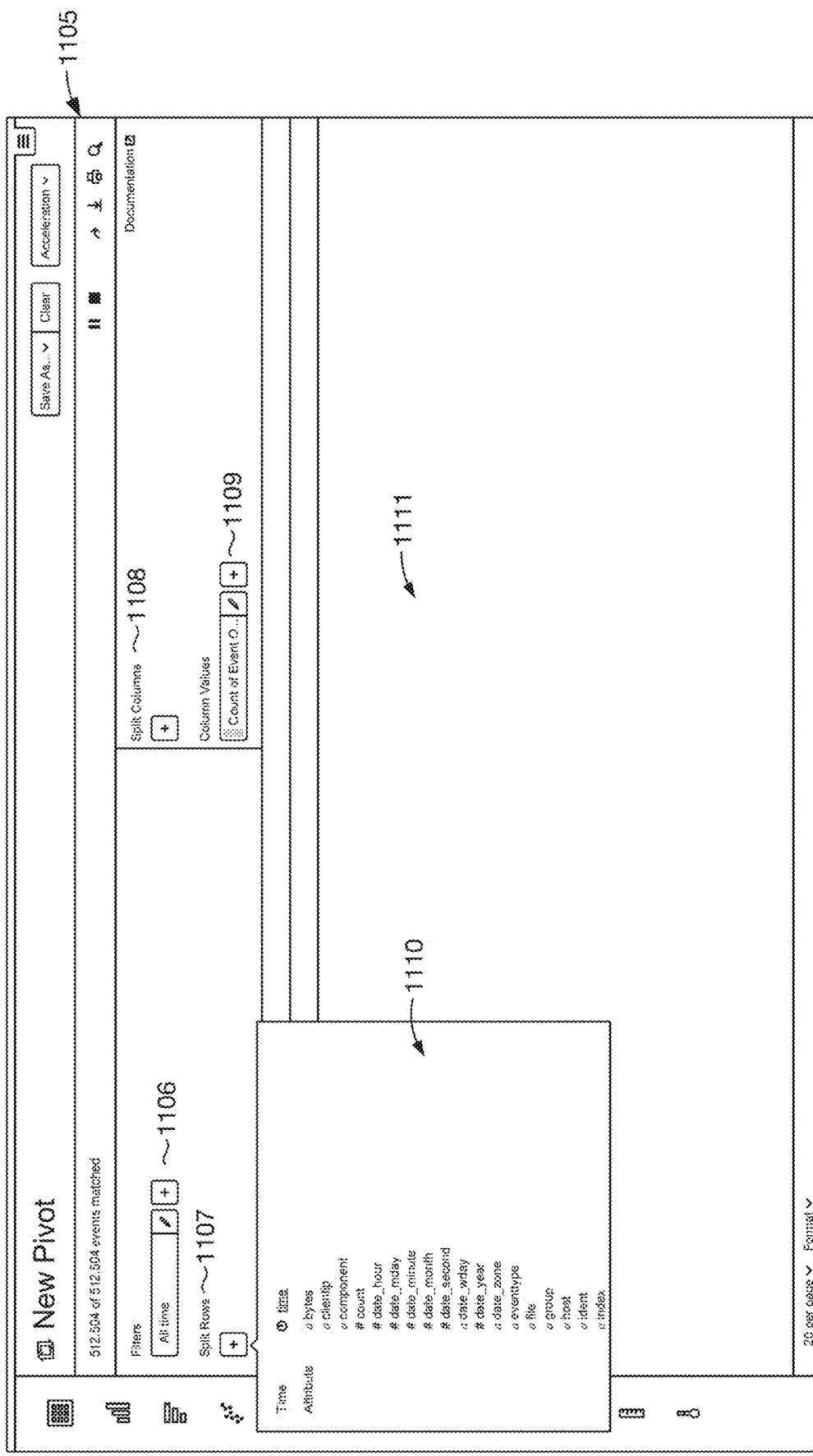
Figure 11C:
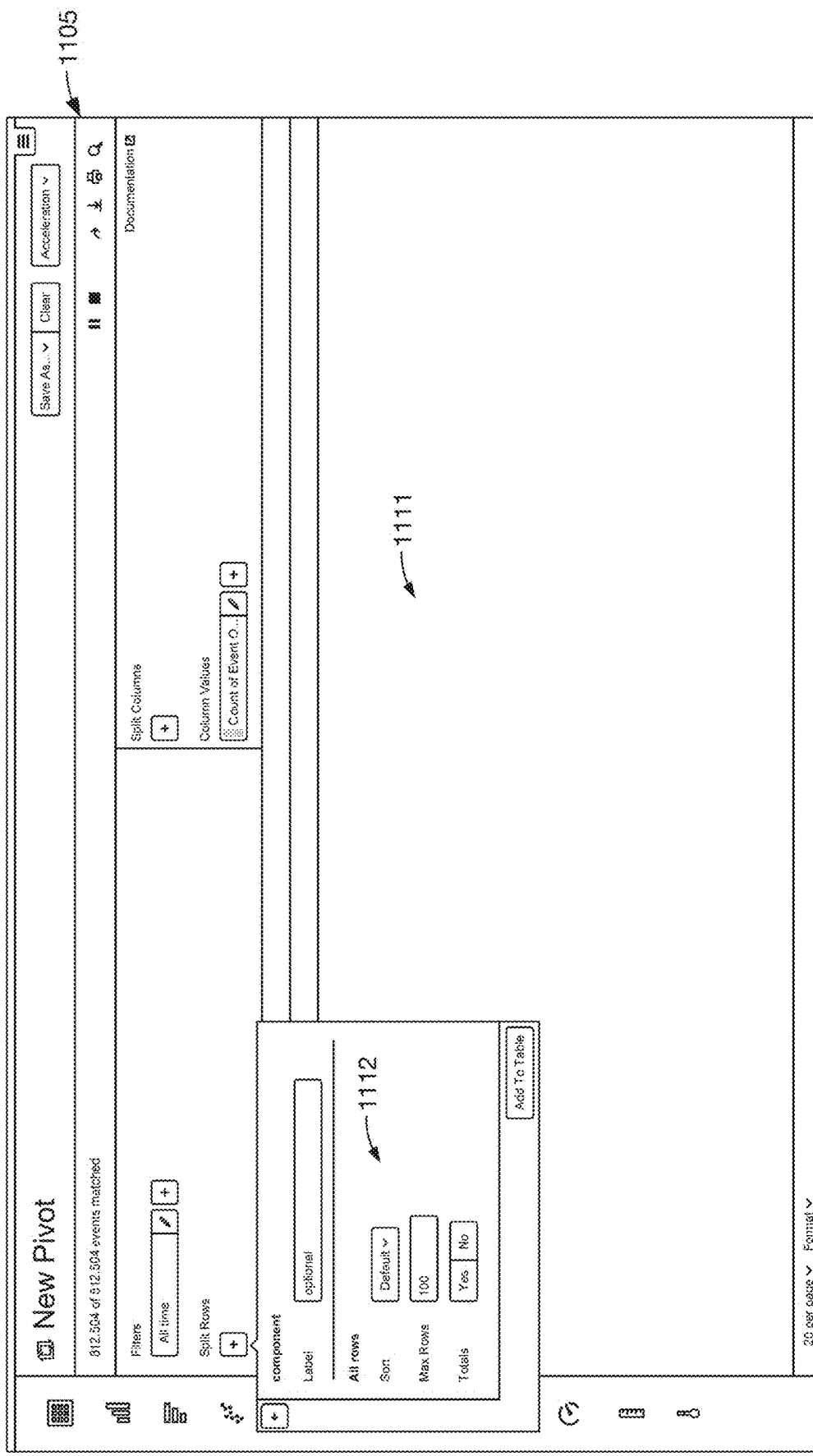

FIG. 11B illustrates an example graphical user interface screen 1105 displaying the reporting application's "Report Editor" page. The screen may display interactive elements for defining various elements of a report. For example, the page includes a "Filters" element 1106, a "Split Rows" element 1107, a "Split Columns" element 1108, and a "Column Values" element 1109. The page may include a list of search results 1111. In this example, the Split Rows element 1107 is expanded, revealing a listing of fields 1110 that can be used to define additional criteria (e.g., reporting criteria). The listing of fields 1110 may correspond to the selected fields. That is, the listing of fields 1110 may list only the fields previously selected, either automatically and/or manually by a user. FIG. 11C illustrates a formatting dialogue 1112 that may be displayed upon selecting a field from the listing of fields 1110. The dialogue can be used to format the display of the results of the selection (e.g., label the column for the selected field to be displayed as "component").

Figure 11D:
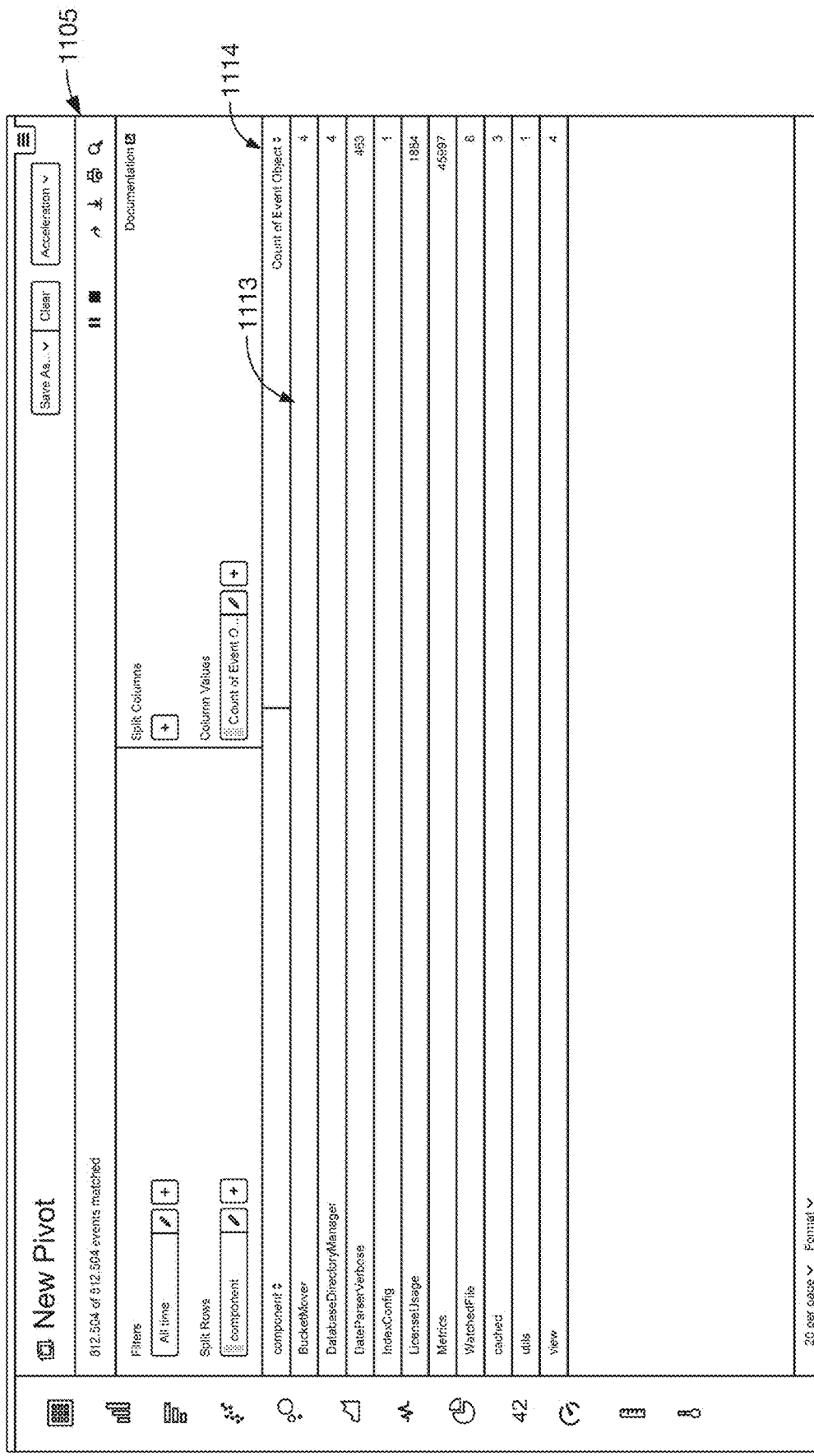

FIG. 11D illustrates an example graphical user interface screen 1105 including a table of results 1113 based on the selected criteria including splitting the rows by the "component" field. A column 1114 having an associated count for each component listed in the table may be displayed that indicates an aggregate count of the number of times that the particular field-value pair (e.g., the value in a row for a particular field, such as the value "BucketMover" for the field "component") occurs in the set of events responsive to the initial search query.

Figure 12:
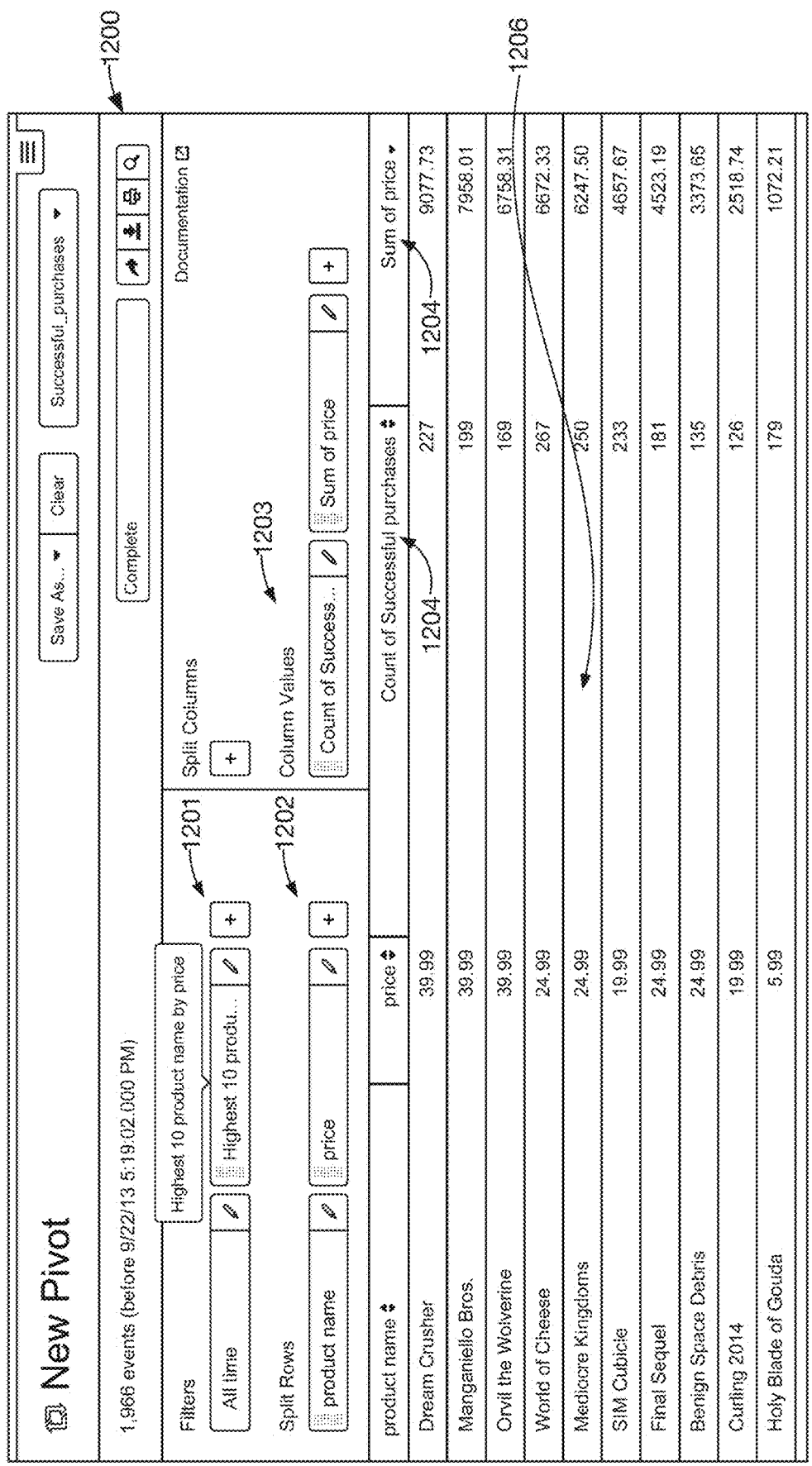

FIG. 12 illustrates an example graphical user interface screen 1200 that allows the user to filter search results and to perform statistical analysis on values extracted from specific fields in the set of events. In this example, the top ten product names ranked by price are selected as a filter 1201 that causes the display of the ten most popular products sorted by price. Each row is displayed by product name and price 1202. This results in each product displayed in a column labeled "product name" along with an associated price in a column labeled "price" 1206. Statistical analysis of other fields in the events associated with the ten most popular products have been specified as column values 1203. A count of the number of successful purchases for each product is displayed in column 1204. These statistics may be produced by filtering the search results by the product name, finding all occurrences of a successful purchase in a field within the events and generating a total of the number of occurrences. A sum of the total sales is displayed in column 1205, which is a result of the multiplication of the price and the number of successful purchases for each product.

Figure 13:
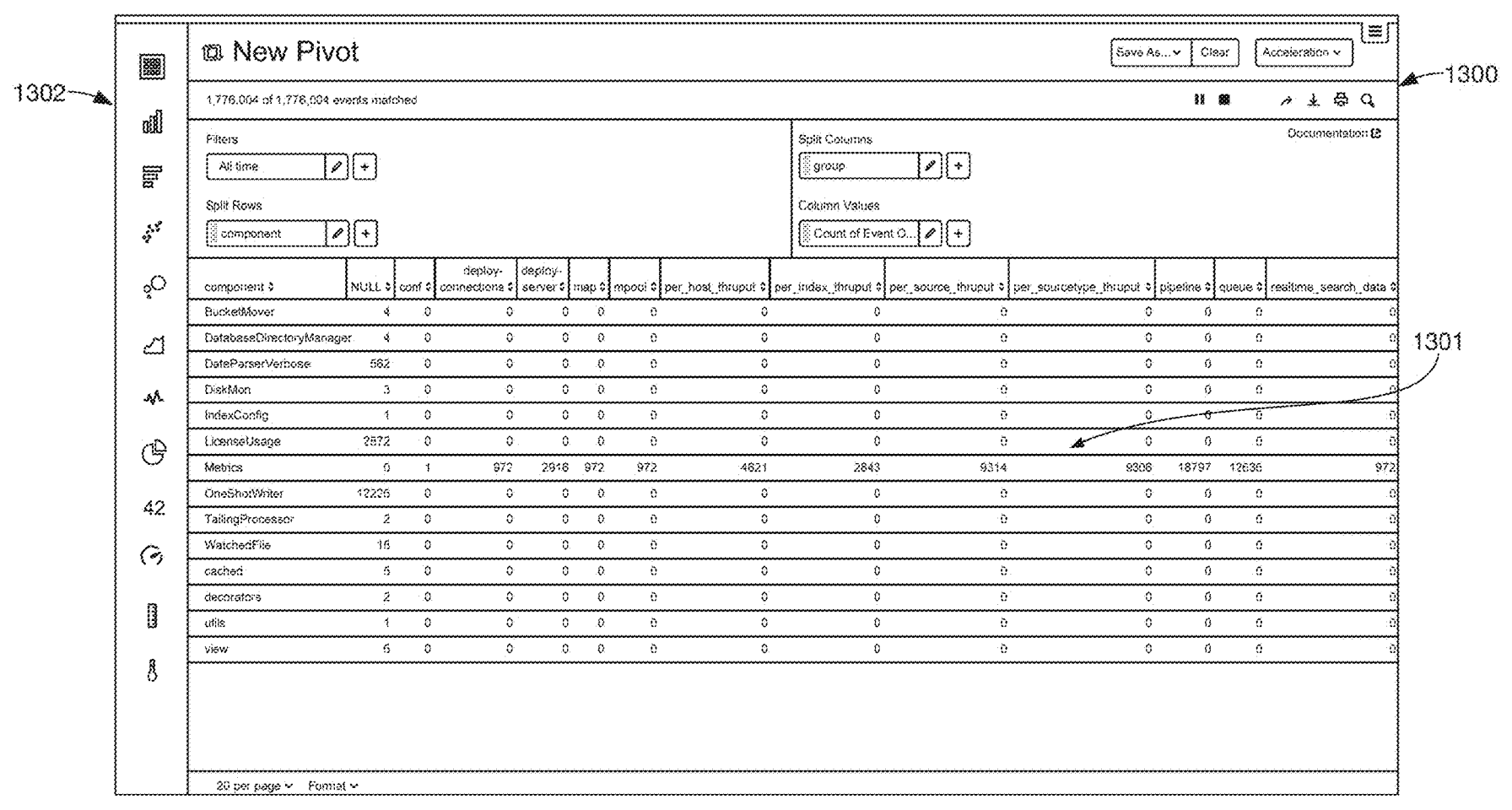
Figure 14:
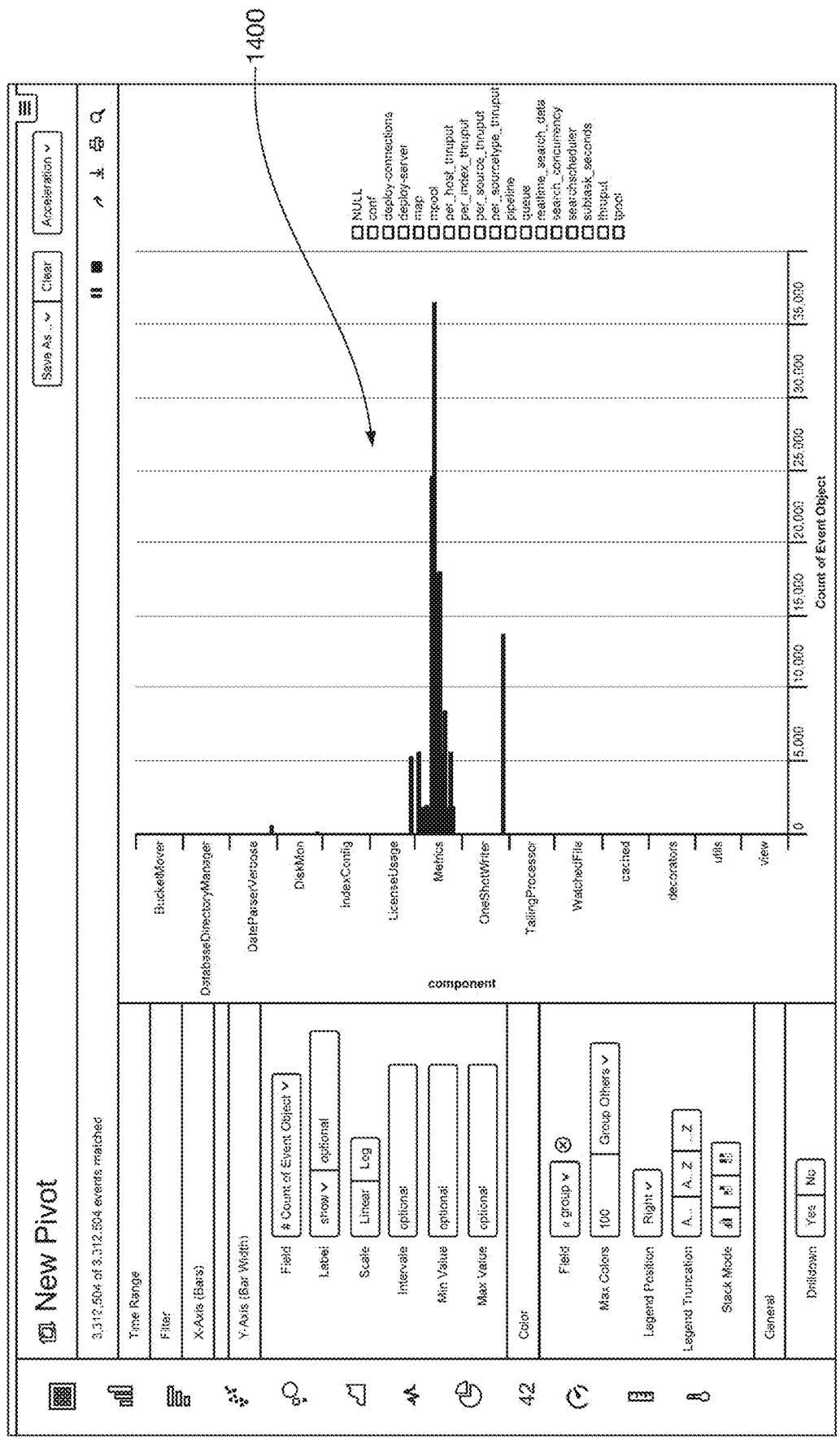
Figure 15:
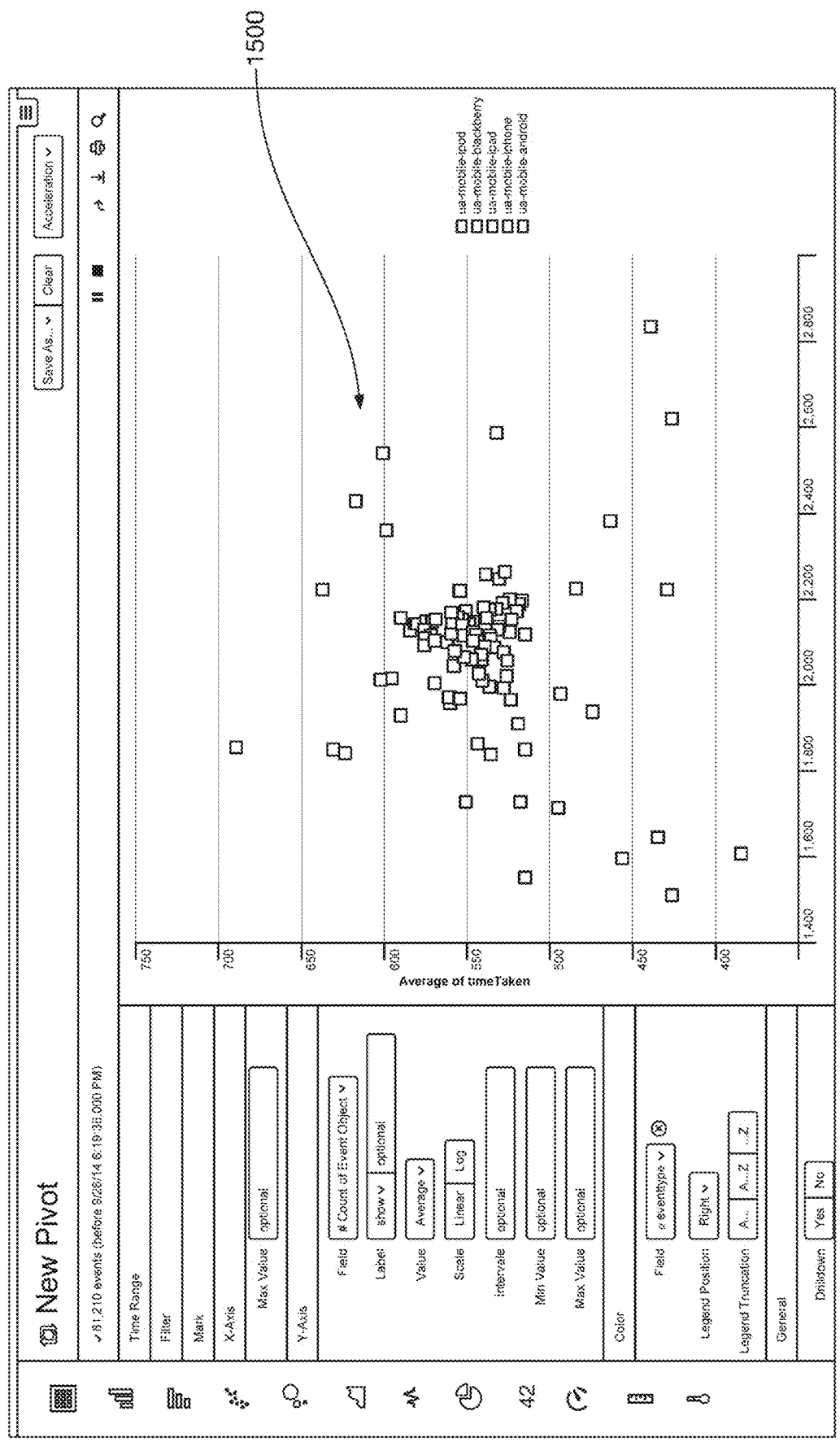

The reporting application allows the user to create graphical visualizations of the statistics generated for a report. For example, FIG. 13 illustrates an example graphical user interface 1300 that may display a set of components and associated statistics 1301. The reporting application allows the user to select a visualization of the statistics in a graph (e.g., bar chart, scatter plot, area chart, line chart, pie chart, radial gauge, marker gauge, filler gauge, etc.), where the format of the graph may be selected using the user interface controls 1302 along the left panel of the user interface 1300. FIG. 14 illustrates an example of a bar chart visualization 1400 of an aspect of the statistical data 1301. FIG. 15 illustrates a scatter plot visualization 1500 of an aspect of the statistical data 1301.

2.13. Acceleration Technique

The above-described system provides significant flexibility by enabling a user to analyze massive quantities of minimally-processed data "on the fly" at search time using a late-binding schema, instead of storing pre-specified portions of the data in a database at ingestion time. This flexibility enables a user to see valuable insights, correlate data, and perform subsequent queries to examine interesting aspects of the data that may not have been apparent at ingestion time.

However, performing extraction and analysis operations at search time can involve a large amount of data and require a large number of computational operations, which can cause delays in processing the queries. Advantageously, the data intake and query system also employs a number of unique acceleration techniques that have been developed to speed up analysis operations performed at search time. These techniques include: (1) performing search operations in parallel across multiple indexers; (2) using a keyword index; (3) using a high performance analytics store; and (4) accelerating the process of generating reports. These novel techniques are described in more detail below.

2.13.1. Aggregation Technique

Figure 16:
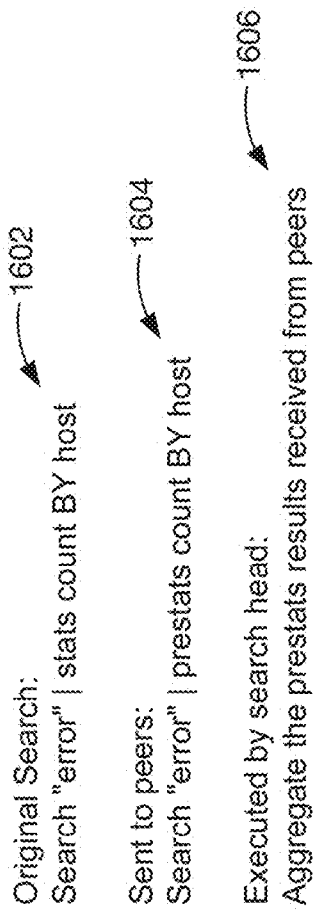
FIG. 16 is an example search query received from a client and executed by search peers, in accordance with example embodiments.

To facilitate faster query processing, a query can be structured such that multiple indexers perform the query in parallel, while aggregation of search results from the multiple indexers is performed locally at the search head. For example, FIG. 16 is an example search query received from a client and executed by search peers, in accordance with example embodiments. FIG. 16 illustrates how a search query 1602 received from a client at a search head 210 can split into two phases, including: (1) subtasks 1604 (e.g., data retrieval or simple filtering) that may be performed in parallel by indexers 206 for execution, and (2) a search results aggregation operation 1606 to be executed by the search head when the results are ultimately collected from the indexers.

During operation, upon receiving search query 1602, a search head 210 determines that a portion of the operations involved with the search query may be performed locally by the search head. The search head modifies search query 1602 by substituting "stats" (create aggregate statistics over results sets received from the indexers at the search head) with "prestats" (create statistics by the indexer from local results set) to produce search query 1604, and then distributes search query 1604 to distributed indexers, which are also referred to as "search peers" or "peer indexers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as illustrated in FIG. 6A, or may alternatively distribute a modified version (e.g., a more restricted version) of the search query to the search peers. In this example, the indexers are responsible for producing the results and sending them to the search head. After the indexers return the results to the search head, the search head aggregates the received results 1606 to form a single search result set. By executing the query in this manner, the system effectively distributes the computational operations across the indexers while minimizing data transfers.

2.13.2. Keyword Index

As described above with reference to the flow charts in FIG. 5A and FIG. 6A, data intake and query system 108 can construct and maintain one or more keyword indices to quickly identify events containing specific keywords. This technique can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

2.13.3. High Performance Analytics Store

To speed up certain types of queries, some embodiments of system 108 create a high performance analytics store, which is referred to as a "summarization table," that contains entries for specific field-value pairs. Each of these entries keeps track of instances of a specific value in a specific field in the events and includes references to events containing the specific value in the specific field. For example, an example entry in a summarization table can keep track of occurrences of the value "94107" in a "ZIP code" field of a set of events and the entry includes references to all of the events that contain the value "94107" in the ZIP code field. This optimization technique enables the system to quickly process queries that seek to determine how many events have a particular value for a particular field. To this end, the system can examine the entry in the summarization table to count instances of the specific value in the field without having to go through the individual events or perform data extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range. A bucket-specific summarization table includes entries for specific field-value combinations that occur in events in the specific bucket. Alternatively, the system can maintain a separate summarization table for each indexer. The indexer-specific summarization table includes entries for the events in a data store that are managed by the specific indexer. Indexer-specific summarization tables may also be bucket-specific.

The summarization table can be populated by running a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination.

In some cases, when the summarization tables may not cover all of the events that are relevant to a query, the system can use the summarization tables to obtain partial results for the events that are covered by summarization tables, but may also have to search through other events that are not covered by the summarization tables to produce additional results. These additional results can then be combined with the partial results to produce a final set of results for the query. The summarization table and associated techniques are described in more detail in U.S. Pat. No. 8,682,925, entitled "DISTRIBUTED HIGH PERFORMANCE ANALYTICS STORE", issued on 25 Mar. 2014, U.S. Pat. No. 9,128,985, entitled "SUPPLEMENTING A HIGH PERFORMANCE ANALYTICS STORE WITH EVALUATION OF INDIVIDUAL EVENTS TO RESPOND TO AN EVENT QUERY", issued on 8 Sep. 2015, and U.S. patent application Ser. No. 14/815,973, entitled "GENERATING AND STORING SUMMARIZATION TABLES FOR SETS OF SEARCHABLE EVENTS", filed on 1 Aug. 2015, each of which is hereby incorporated by reference in its entirety for all purposes.

To speed up certain types of queries, e.g., frequently encountered queries or computationally intensive queries, some embodiments of system 108 create a high performance analytics store, which is referred to as a "summarization table," (also referred to as a "lexicon" or "inverted index") that contains entries for specific field-value pairs. Each of these entries keeps track of instances of a specific value in a specific field in the event data and includes references to events containing the specific value in the specific field. For example, an example entry in an inverted index can keep track of occurrences of the value "94107" in a "ZIP code" field of a set of events and the entry includes references to all of the events that contain the value "94107" in the ZIP code field. Creating the inverted index data structure avoids needing to incur the computational overhead each time a statistical query needs to be run on a frequently encountered field-value pair. In order to expedite queries, in most embodiments, the search engine will employ the inverted index separate from the raw record data store to generate responses to the received queries.

Note that the term "summarization table" or "inverted index" as used herein is a data structure that may be generated by an indexer that includes at least field names and field values that have been extracted and/or indexed from event records. An inverted index may also include reference values that point to the location(s) in the field searchable data store where the event records that include the field may be found. Also, an inverted index may be stored using well-known compression techniques to reduce its storage size.

Further, note that the term "reference value" (also referred to as a "posting value") as used herein is a value that references the location of a source record in the field searchable data store. In some embodiments, the reference value may include additional information about each record, such as timestamps, record size, meta-data, or the like. Each reference value may be a unique identifier which may be used to access the event data directly in the field searchable data store. In some embodiments, the reference values may be ordered based on each event record's timestamp. For example, if numbers are used as identifiers, they may be sorted so event records having a later timestamp always have a lower valued identifier than event records with an earlier timestamp, or vice-versa. Reference values are often included in inverted indexes for retrieving and/or identifying event records.

In one or more embodiments, an inverted index is generated in response to a user-initiated collection query. The term "collection query" as used herein refers to queries that include commands that generate summarization information and inverted indexes (or summarization tables) from event records stored in the field searchable data store.

Note that a collection query is a special type of query that can be user-generated and is used to create an inverted index. A collection query is not the same as a query that is used to call up or invoke a pre-existing inverted index. In one or more embodiment, a query can comprise an initial step that calls up a pre-generated inverted index on which further filtering and processing can be performed. For example, referring back to FIG. 13, a set of events generated at block 1320 by either using a "collection" query to create a new inverted index or by calling up a pre-generated inverted index. A query with several pipelined steps will start with a pre-generated index to accelerate the query.

Figure 7C:
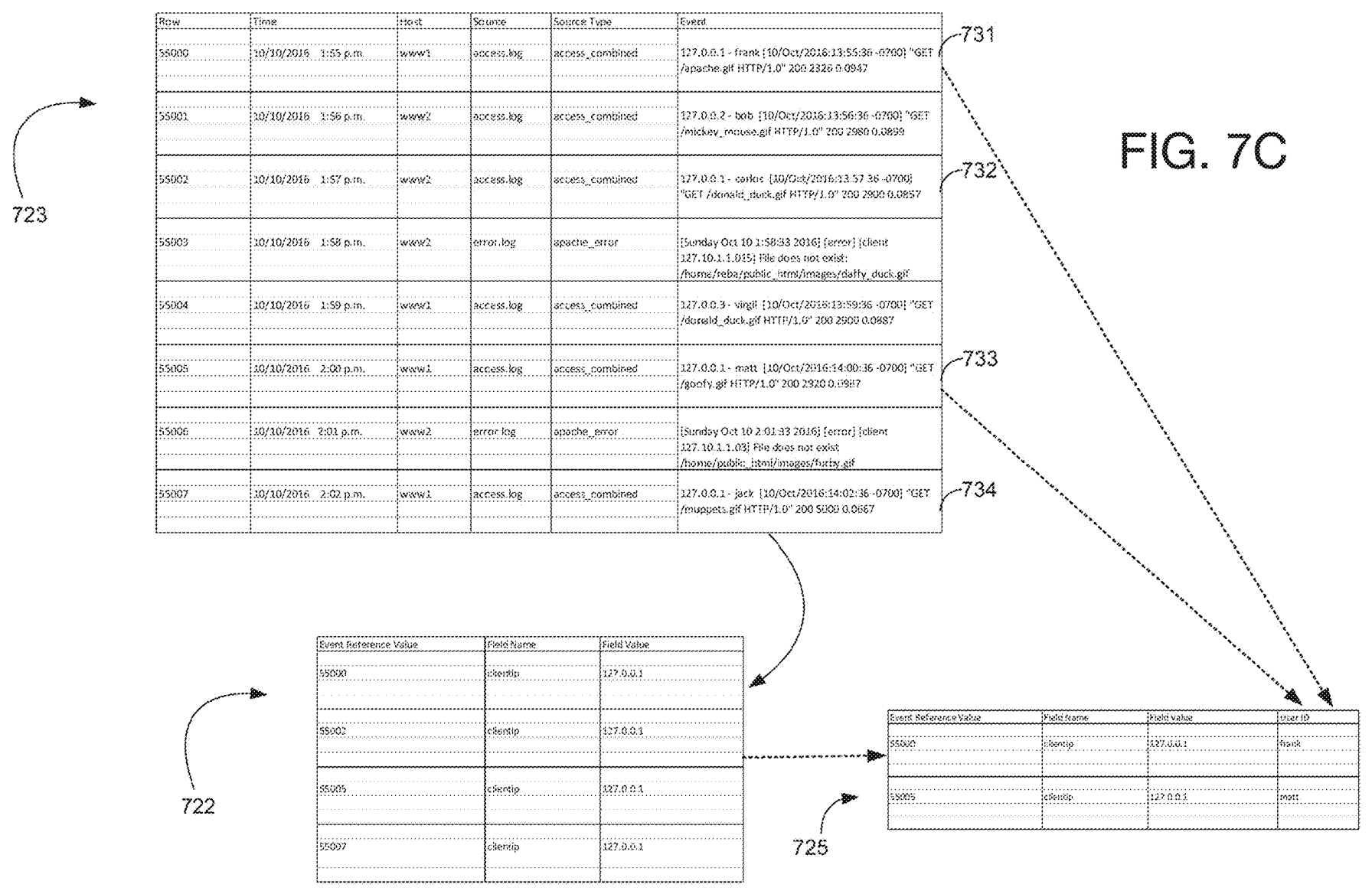

FIG. 7C illustrates the manner in which an inverted index is created and used in accordance with the disclosed embodiments. As shown in FIG. 7C, an inverted index 722 can be created in response to a user-initiated collection query using the event data 723 stored in the raw record data store. For example, a non-limiting example of a collection query may include "collect clientip=127.0.0.1" which may result in an inverted index 722 being generated from the event data 723 as shown in FIG. 7C. Each entry in inverted index 722 includes an event reference value that references the location of a source record in the field searchable data store. The reference value may be used to access the original event record directly from the field searchable data store.

In one or more embodiments, if one or more of the queries is a collection query, the responsive indexers may generate summarization information based on the fields of the event records located in the field searchable data store. In at least one of the various embodiments, one or more of the fields used in the summarization information may be listed in the collection query and/or they may be determined based on terms included in the collection query. For example, a collection query may include an explicit list of fields to summarize. Or, in at least one of the various embodiments, a collection query may include terms or expressions that explicitly define the fields, e.g., using regex rules. In FIG. 7C, prior to running the collection query that generates the inverted index 722, the field name "clientip" may need to be defined in a configuration file by specifying the "access_ combined" source type and a regular expression rule to parse out the client IP address. Alternatively, the collection query may contain an explicit definition for the field name "clientip" which may obviate the need to reference the configuration file at search time.

In one or more embodiments, collection queries may be saved and scheduled to run periodically. These scheduled collection queries may periodically update the summarization information corresponding to the query. For example, if the collection query that generates inverted index 722 is scheduled to run periodically, one or more indexers would periodically search through the relevant buckets to update inverted index 722 with event data for any new events with the "clientip" value of "127.0.0.1."

In some embodiments, the inverted indexes that include fields, values, and reference value (e.g., inverted index 722) for event records may be included in the summarization information provided to the user. In other embodiments, a user may not be interested in specific fields and values contained in the inverted index, but may need to perform a statistical query on the data in the inverted index. For example, referencing the example of FIG. 7C rather than viewing the fields within summarization table 722, a user may want to generate a count of all client requests from IP address "127.0.0.1." In this case, the search engine would simply return a result of "4" rather than including details about the inverted index 722 in the information provided to the user.

The pipelined search language, e.g., SPL of the SPLUNK® ENTERPRISE system can be used to pipe the contents of an inverted index to a statistical query using the "stats" command for example. A "stats" query refers to queries that generate result sets that may produce aggregate and statistical results from event records, e.g., average, mean, max, min, rms, etc. Where sufficient information is available in an inverted index, a "stats" query may generate their result sets rapidly from the summarization information available in the inverted index rather than directly scanning event records. For example, the contents of inverted index 722 can be pipelined to a stats query, e.g., a "count" function that counts the number of entries in the inverted index and returns a value of "4." In this way, inverted indexes may enable various stats queries to be performed absent scanning or search the event records. Accordingly, this optimization technique enables the system to quickly process queries that seek to determine how many events have a particular value for a particular field. To this end, the system can examine the entry in the inverted index to count instances of the specific value in the field without having to go through the individual events or perform data extractions at search time.

In some embodiments, the system maintains a separate inverted index for each of the above-described time-specific buckets that stores events for a specific time range. A bucket-specific inverted index includes entries for specific field-value combinations that occur in events in the specific bucket. Alternatively, the system can maintain a separate inverted index for each indexer. The indexer-specific inverted index includes entries for the events in a data store that are managed by the specific indexer. Indexer-specific inverted indexes may also be bucket-specific. In at least one or more embodiments, if one or more of the queries is a stats query, each indexer may generate a partial result set from previously generated summarization information. The partial result sets may be returned to the search head that received the query and combined into a single result set for the query As mentioned above, the inverted index can be populated by running a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination. In some embodiments, if summarization information is absent from an indexer that includes responsive event records, further actions may be taken, such as, the summarization information may generated on the fly, warnings may be provided the user, the collection query operation may be halted, the absence of summarization information may be ignored, or the like, or combination thereof.

In one or more embodiments, an inverted index may be set up to update continually. For example, the query may ask for the inverted index to update its result periodically, e.g., every hour. In such instances, the inverted index may be a dynamic data structure that is regularly updated to include information regarding incoming events.

In some cases, e.g., where a query is executed before an inverted index updates, when the inverted index may not cover all of the events that are relevant to a query, the system can use the inverted index to obtain partial results for the events that are covered by inverted index, but may also have to search through other events that are not covered by the inverted index to produce additional results on the fly. In other words, an indexer would need to search through event data on the data store to supplement the partial results. These additional results can then be combined with the partial results to produce a final set of results for the query. Note that in typical instances where an inverted index is not completely up to date, the number of events that an indexer would need to search through to supplement the results from the inverted index would be relatively small. In other words, the search to get the most recent results can be quick and efficient because only a small number of event records will be searched through to supplement the information from the inverted index. The inverted index and associated techniques are described in more detail in U.S. Pat. No. 8,682, 925, entitled "DISTRIBUTED HIGH PERFORMANCE ANALYTICS STORE", issued on 25 Mar. 2014, U.S. Pat. No. 9,128,985, entitled "SUPPLEMENTING A HIGH PERFORMANCE ANALYTICS STORE WITH EVALUATION OF INDIVIDUAL EVENTS TO RESPOND TO AN EVENT QUERY", filed on 31 Jan. 2014, and U.S. patent application Ser. No. 14/815,973, entitled "STORAGE MEDIUM AND CONTROL DEVICE", filed on 21 Feb. 2014, each of which is hereby incorporated by reference in its entirety.

2.13.3.1 Extracting Event Data Using Posting

In one or more embodiments, if the system needs to process all events that have a specific field-value combination, the system can use the references in the inverted index entry to directly access the events to extract further information without having to search all of the events to find the specific field-value combination at search time. In other words, the system can use the reference values to locate the associated event data in the field searchable data store and extract further information from those events, e.g., extract further field values from the events for purposes of filtering or processing or both.

The information extracted from the event data using the reference values can be directed for further filtering or processing in a query using the pipeline search language. The pipelined search language will, in one embodiment, include syntax that can direct the initial filtering step in a query to an inverted index. In one embodiment, a user would include syntax in the query that explicitly directs the initial searching or filtering step to the inverted index.

Referencing the example in FIG. 15, if the user determines that she needs the user id fields associated with the client requests from IP address "127.0.0.1," instead of incurring the computational overhead of performing a brand new search or re-generating the inverted index with an additional field, the user can generate a query that explicitly directs or pipes the contents of the already generated inverted index 1502 to another filtering step requesting the user ids for the entries in inverted index 1502 where the server response time is greater than "0.0900" microseconds. The search engine would use the reference values stored in inverted index 722 to retrieve the event data from the field searchable data store, filter the results based on the "response time" field values and, further, extract the user id field from the resulting event data to return to the user. In the present instance, the user ids "frank" and "carlos" would be returned to the user from the generated results table 722.

In one embodiment, the same methodology can be used to pipe the contents of the inverted index to a processing step. In other words, the user is able to use the inverted index to efficiently and quickly perform aggregate functions on field values that were not part of the initially generated inverted index. For example, a user may want to determine an average object size (size of the requested gif) requested by clients from IP address "127.0.0.1." In this case, the search engine would again use the reference values stored in inverted index 722 to retrieve the event data from the field searchable data store and, further, extract the object size field values from the associated events 731, 732, 733 and 734. Once, the corresponding object sizes have been extracted (i.e. 2326, 2900, 2920, and 5000), the average can be computed and returned to the user.

In one embodiment, instead of explicitly invoking the inverted index in a user-generated query, e.g., by the use of special commands or syntax, the SPLUNK® ENTERPRISE system can be configured to automatically determine if any prior-generated inverted index can be used to expedite a user query. For example, the user's query may request the average object size (size of the requested gif) requested by clients from IP address "127.0.0.1." without any reference to or use of inverted index 722. The search engine, in this case, would automatically determine that an inverted index 722 already exists in the system that could expedite this query. In one embodiment, prior to running any search comprising a field-value pair, for example, a search engine may search though all the existing inverted indexes to determine if a pre-generated inverted index could be used to expedite the search comprising the field-value pair. Accordingly, the search engine would automatically use the pre-generated inverted index, e.g., index 722 to generate the results without any user-involvement that directs the use of the index.

Using the reference values in an inverted index to be able to directly access the event data in the field searchable data store and extract further information from the associated event data for further filtering and processing is highly advantageous because it avoids incurring the computation overhead of regenerating the inverted index with additional fields or performing a new search.

The data intake and query system includes one or more forwarders that receive raw machine data from a variety of input data sources, and one or more indexers that process and store the data in one or more data stores. By distributing events among the indexers and data stores, the indexers can analyze events for a query in parallel. In one or more embodiments, a multiple indexer implementation of the search system would maintain a separate and respective inverted index for each of the above-described time-specific buckets that stores events for a specific time range. A bucket-specific inverted index includes entries for specific field-value combinations that occur in events in the specific bucket. As explained above, a search head would be able to correlate and synthesize data from across the various buckets and indexers.

This feature advantageously expedites searches because instead of performing a computationally intensive search in a centrally located inverted index that catalogues all the relevant events, an indexer is able to directly search an inverted index stored in a bucket associated with the time-range specified in the query. This allows the search to be performed in parallel across the various indexers. Further, if the query requests further filtering or processing to be conducted on the event data referenced by the locally stored bucket-specific inverted index, the indexer is able to simply access the event records stored in the associated bucket for further filtering and processing instead of needing to access a central repository of event records, which would dramatically add to the computational overhead.

In one embodiment, there may be multiple buckets associated with the time-range specified in a query. If the query is directed to an inverted index, or if the search engine automatically determines that using an inverted index would expedite the processing of the query, the indexers will search through each of the inverted indexes associated with the buckets for the specified time-range. This feature allows the High Performance Analytics Store to be scaled easily.

In certain instances, where a query is executed before a bucket-specific inverted index updates, when the bucket-specific inverted index may not cover all of the events that are relevant to a query, the system can use the bucket-specific inverted index to obtain partial results for the events that are covered by bucket-specific inverted index, but may also have to search through the event data in the bucket associated with the bucket-specific inverted index to produce additional results on the fly. In other words, an indexer would need to search through event data stored in the bucket (that was not yet processed by the indexer for the corresponding inverted index) to supplement the partial results from the bucket-specific inverted index.

Figure 7D:
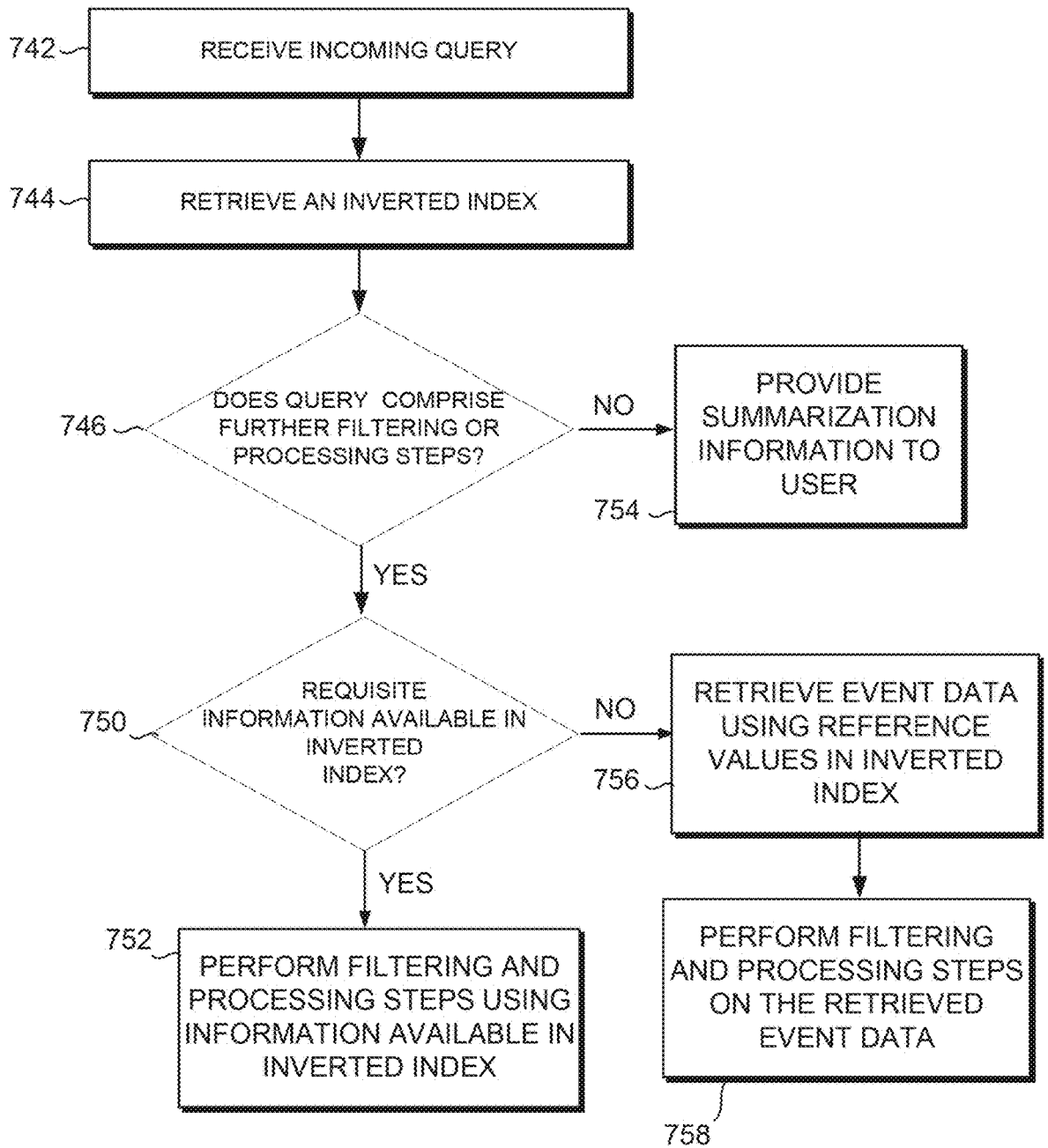
FIG. 7D depicts a flowchart of example use of an inverted index in a pipelined search query, in accordance with example embodiments.

FIG. 7D presents a flowchart illustrating how an inverted index in a pipelined search query can be used to determine a set of event data that can be further limited by filtering or processing in accordance with the disclosed embodiments.

At block 742, a query is received by a data intake and query system. In some embodiments, the query can be received as a user generated query entered into a search bar of a graphical user search interface. The search interface also includes a time range control element that enables specification of a time range for the query.

At block 744, an inverted index is retrieved. Note, that the inverted index can be retrieved in response to an explicit user search command inputted as part of the user generated query. Alternatively, the search engine can be configured to automatically use an inverted index if it determines that using the inverted index would expedite the servicing of the user generated query. Each of the entries in an inverted index keeps track of instances of a specific value in a specific field in the event data and includes references to events containing the specific value in the specific field. In order to expedite queries, in most embodiments, the search engine will employ the inverted index separate from the raw record data store to generate responses to the received queries.

At block 746, the query engine determines if the query contains further filtering and processing steps. If the query contains no further commands, then, in one embodiment, summarization information can be provided to the user at block 754.

If, however, the query does contain further filtering and processing commands, then at block 750, the query engine determines if the commands relate to further filtering or processing of the data extracted as part of the inverted index or whether the commands are directed to using the inverted index as an initial filtering step to further filter and process event data referenced by the entries in the inverted index. If the query can be completed using data already in the generated inverted index, then the further filtering or processing steps, e.g., a "count" number of records function, "average" number of records per hour etc. are performed and the results are provided to the user at block 752.

If, however, the query references fields that are not extracted in the inverted index, then the indexers will access event data pointed to by the reference values in the inverted index to retrieve any further information required at block 756. Subsequently, any further filtering or processing steps are performed on the fields extracted directly from the event data and the results are provided to the user at step 758.

2.13.4. Accelerating Report Generation

In some embodiments, a data server system such as the data intake and query system can accelerate the process of periodically generating updated reports based on query results. To accelerate this process, a summarization engine automatically examines the query to determine whether generation of updated reports can be accelerated by creating intermediate summaries. If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In addition to the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on these additional events. Then, the results returned by this query on the additional events, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so advantageously only the newer events needs to be processed while generating an updated report. These report acceleration techniques are described in more detail in U.S. Pat. No. 8,589,403, entitled "COMPRESSED JOURNALING IN EVENT TRACKING FILES FOR METADATA RECOVERY AND REPLICATION", issued on 19 Nov. 2013, U.S. Pat. No. 8,412,696, entitled "REAL TIME SEARCHING AND REPORTING", issued on 2 Apr. 2011, and U.S. Pat. Nos. 8,589,375 and 8,589,432, both also entitled "REAL TIME SEARCHING AND REPORTING", both issued on 19 Nov. 2013, each of which is hereby incorporated by reference in its entirety for all purposes.

2.14. Security Features

The data intake and query system provides various schemas, dashboards, and visualizations that simplify developers' tasks to create applications with additional capabilities. One such application is the an enterprise security application, such as SPLUNK® ENTERPRISE SECURITY, which performs monitoring and alerting operations and includes analytics to facilitate identifying both known and unknown security threats based on large volumes of data stored by the data intake and query system. The enterprise security application provides the security practitioner with visibility into security-relevant threats found in the enterprise infrastructure by capturing, monitoring, and reporting on data from enterprise security devices, systems, and applications. Through the use of the data intake and query system searching and reporting capabilities, the enterprise security application provides a top-down and bottom-up view of an organization's security posture.

The enterprise security application leverages the data intake and query system search-time normalization techniques, saved searches, and correlation searches to provide visibility into security-relevant threats and activity and generate notable events for tracking. The enterprise security application enables the security practitioner to investigate and explore the data to find new or unknown threats that do not follow signature-based patterns.

Conventional Security Information and Event Management (SIEM) systems lack the infrastructure to effectively store and analyze large volumes of security-related data. Traditional SIEM systems typically use fixed schemas to extract data from pre-defined security-related fields at data ingestion time and store the extracted data in a relational database. This traditional data extraction process (and associated reduction in data size) that occurs at data ingestion time inevitably hampers future incident investigations that may need original data to determine the root cause of a security issue, or to detect the onset of an impending security threat.

In contrast, the enterprise security application system stores large volumes of minimally-processed security-related data at ingestion time for later retrieval and analysis at search time when a live security threat is being investigated. To facilitate this data retrieval process, the enterprise security application provides pre-specified schemas for extracting relevant values from the different types of security-related events and enables a user to define such schemas.

The enterprise security application can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. The process of detecting security threats for network-related information is further described in U.S. Pat. No. 8,826,434, entitled "SECURITY THREAT DETECTION BASED ON INDICATIONS IN BIG DATA OF ACCESS TO NEWLY REGISTERED DOMAINS", issued on 2 Sep. 2014, U.S. Pat. No. 9,215,240, entitled "INVESTIGATIVE AND DYNAMIC DETECTION OF POTENTIAL SECURITY-THREAT INDICATORS FROM EVENTS IN BIG DATA", issued on 15 Dec. 2015, U.S. Pat. No. 9,173,801, entitled "GRAPHIC DISPLAY OF SECURITY THREATS BASED ON INDICATIONS OF ACCESS TO NEWLY REGISTERED DOMAINS", issued on 3 Nov. 2015, U.S. Pat. No. 9,248,068, entitled "SECURITY THREAT DETECTION OF NEWLY REGISTERED DOMAINS", issued on 2 Feb. 2016, U.S. Pat. No. 9,426,172, entitled "SECURITY THREAT DETECTION USING DOMAIN NAME ACCESSES", issued on 23 Aug. 2016, and U.S. Pat. No. 9,432,396, entitled "SECURITY THREAT DETECTION USING DOMAIN NAME REGISTRATIONS", issued on 30 Aug. 2016, each of which is hereby incorporated by reference in its entirety for all purposes. Security-related information can also include malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the enterprise security application facilitates detecting "notable events" that are likely to indicate a security threat. A notable event represents one or more anomalous incidents, the occurrence of which can be identified based on one or more events (e.g., time stamped portions of raw machine data) fulfilling pre-specified and/or dynamically-determined (e.g., based on machine-learning) criteria defined for that notable event. Examples of notable events include the repeated occurrence of an abnormal spike in network usage over a period of time, a single occurrence of unauthorized access to system, a host communicating with a server on a known threat list, and the like. These notable events can be detected in a number of ways, such as: (1) a user can notice a correlation in events and can manually identify that a corresponding group of one or more events amounts to a notable event; or (2) a user can define a "correlation search" specifying criteria for a notable event, and every time one or more events satisfy the criteria, the application can indicate that the one or more events correspond to a notable event; and the like. A user can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

The enterprise security application provides various visualizations to aid in discovering security threats, such as a "key indicators view" that enables a user to view security metrics, such as counts of different types of notable events.

Figure 17A:
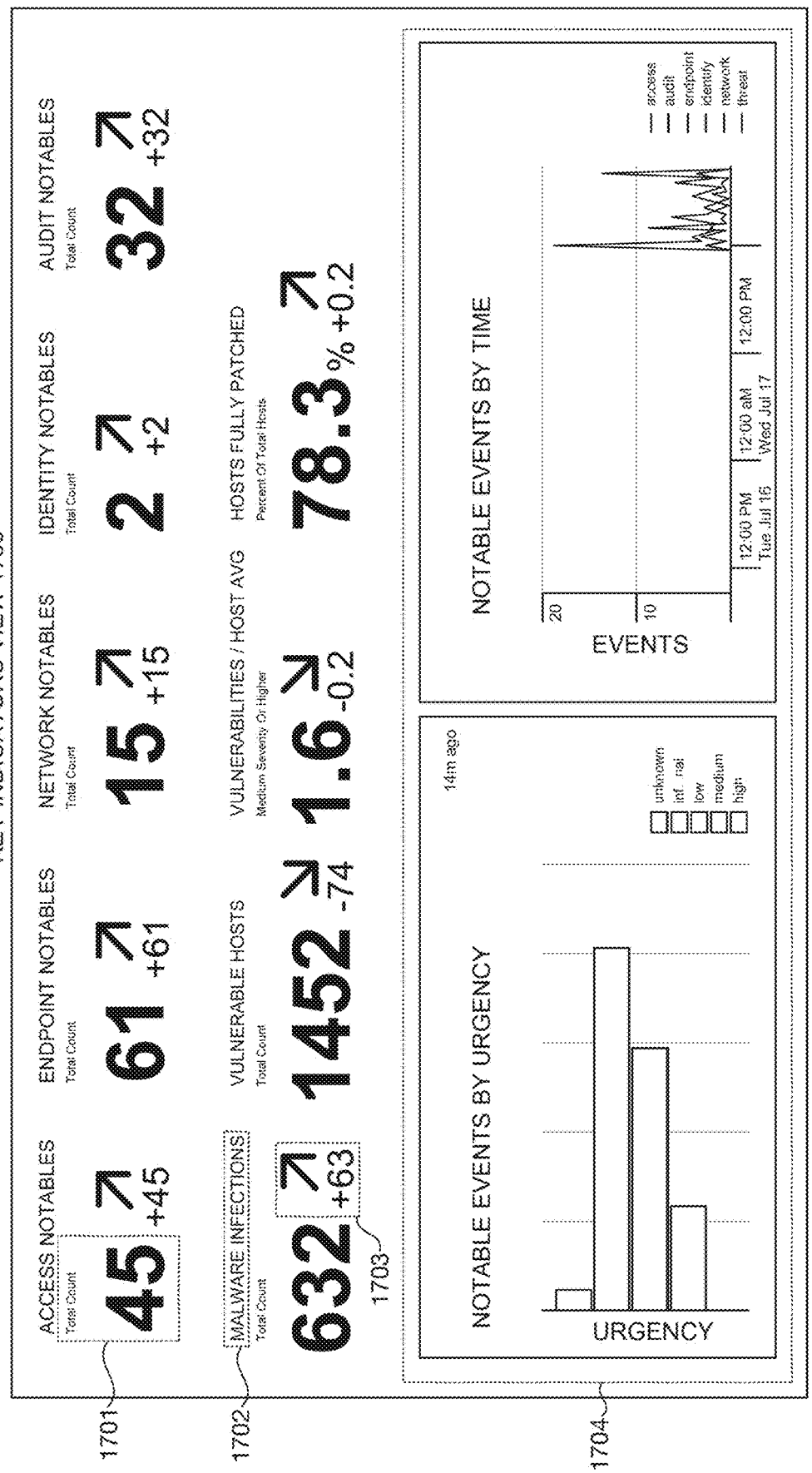
FIG. 17A is an interface diagram of an example user interface of a key indicators view, in accordance with example embodiments.

For example, FIG. 17A illustrates an example key indicators view 1700 that comprises a dashboard, which can display a value 1701, for various security-related metrics, such as malware infections 1702. It can also display a change in a metric value 1703, which indicates that the number of malware infections increased by 63 during the preceding interval. Key indicators view 1700 additionally displays a histogram panel 1704 that displays a histogram of notable events organized by urgency values, and a histogram of notable events organized by time intervals. This key indicators view is described in further detail in pending U.S. patent application Ser. No. 13/956,338, entitled "KEY INDICATORS VIEW", filed on 31 Jul. 2013, and which is hereby incorporated by reference in its entirety for all purposes.

Figure 17B:
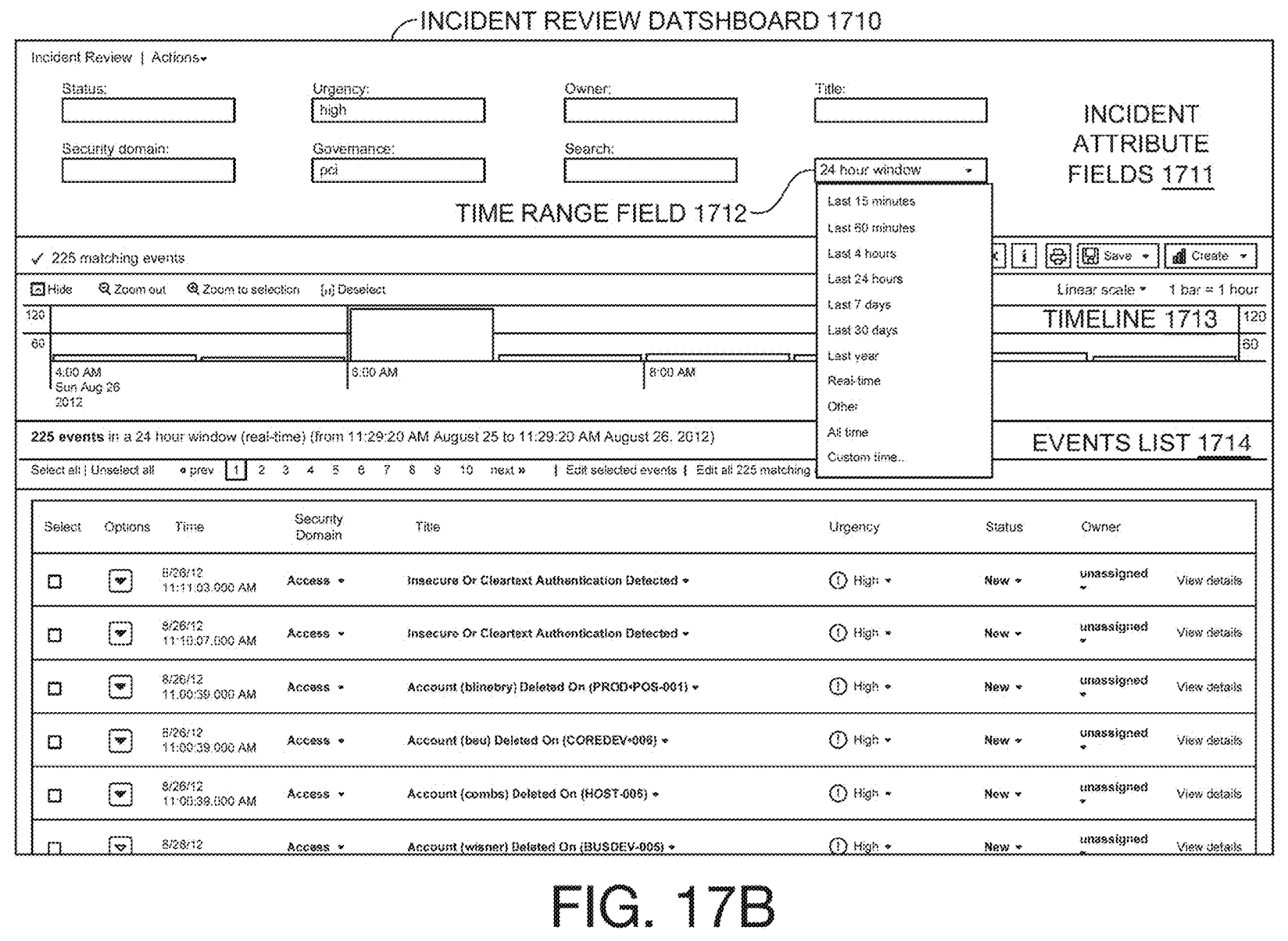

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 17B illustrates an example incident review dashboard 1710 that includes a set of incident attribute fields 1711 that, for example, enables a user to specify a time range field 1712 for the displayed events. It also includes a timeline 1713 that graphically illustrates the number of incidents that occurred in time intervals over the selected time range. It additionally displays an events list 1714 that enables a user to view a list of all of the notable events that match the criteria in the incident attributes fields 1711. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event.

2.15. Data Center Monitoring

As mentioned above, the data intake and query platform provides various features that simplify the developers' task to create various applications. One such application is a virtual machine monitoring application, such as SPLUNK® APP FOR VMWARE® that provides operational visibility into granular performance metrics, logs, tasks and events, and topology from hosts, virtual machines and virtual centers. It empowers administrators with an accurate real-time picture of the health of the environment, proactively identifying performance and capacity bottlenecks.

Conventional data-center-monitoring systems lack the infrastructure to effectively store and analyze large volumes of machine-generated data, such as performance information and log data obtained from the data center. In conventional data-center-monitoring systems, machine-generated data is typically pre-processed prior to being stored, for example, by extracting pre-specified data items and storing them in a database to facilitate subsequent retrieval and analysis at search time. However, the rest of the data is not saved and discarded during pre-processing.

In contrast, the virtual machine monitoring application stores large volumes of minimally processed machine data, such as performance information and log data, at ingestion time for later retrieval and analysis at search time when a live performance issue is being investigated. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. Such performance metrics are described in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

To facilitate retrieving information of interest from performance data and log files, the virtual machine monitoring application provides pre-specified schemas for extracting relevant values from different types of performance-related events, and also enables a user to define such schemas.

Figure 17C:
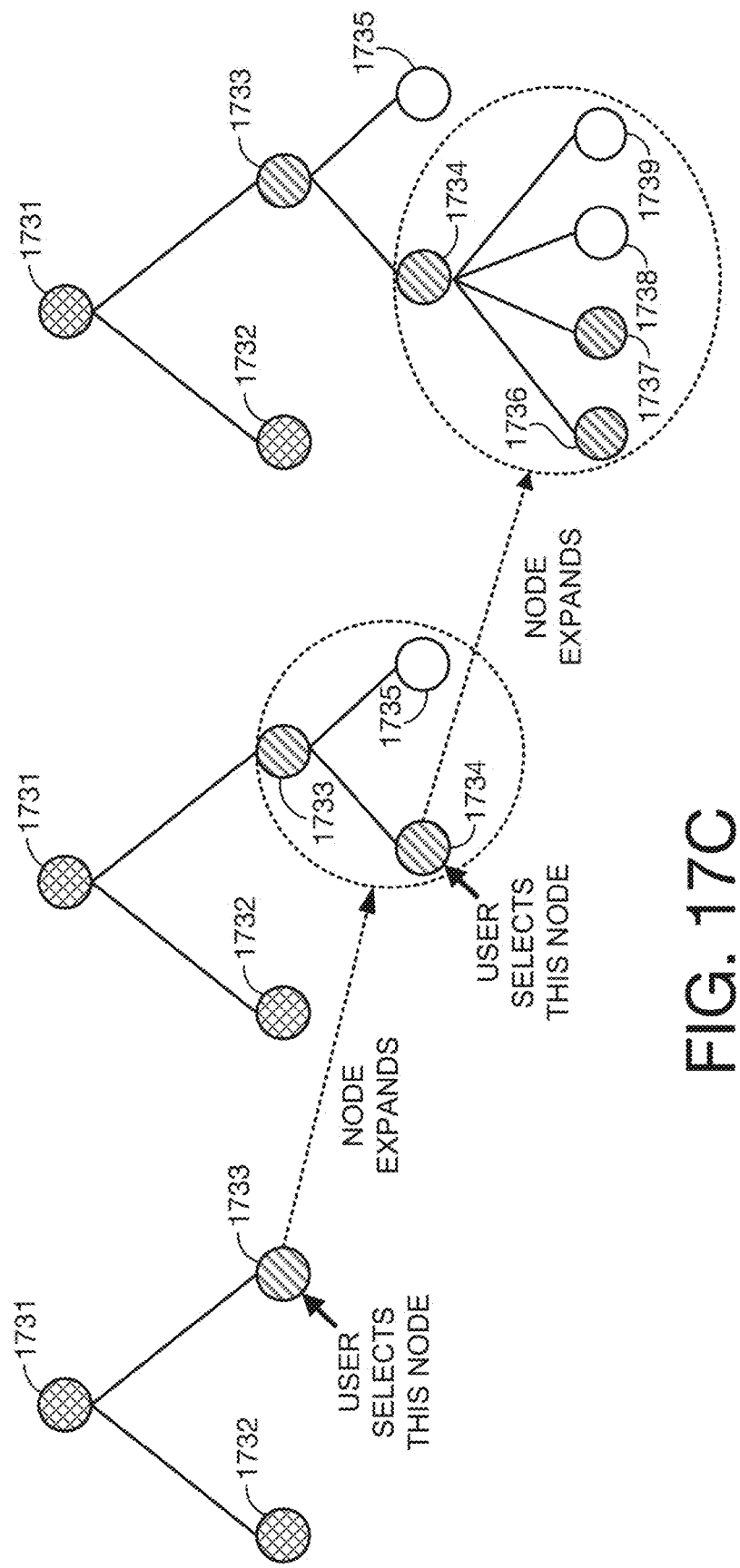
FIG. 17C is a tree diagram of an example a proactive monitoring tree, in accordance with example embodiments.

The virtual machine monitoring application additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Example node-expansion operations are illustrated in FIG. 17C, wherein nodes 1733 and 1734 are selectively expanded. Note that nodes 1731-1739 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. Pat. No. 9,185,007, entitled "PROACTIVE MONITORING TREE WITH SEVERITY STATE SORTING", issued on 10 Nov. 2015, and U.S. Pat. No. 9,426,045, also entitled "PROACTIVE MONITORING TREE WITH SEVERITY STATE SORTING", issued on 23 Aug. 2016, each of which is hereby incorporated by reference in its entirety for all purposes.

Figure 17D:
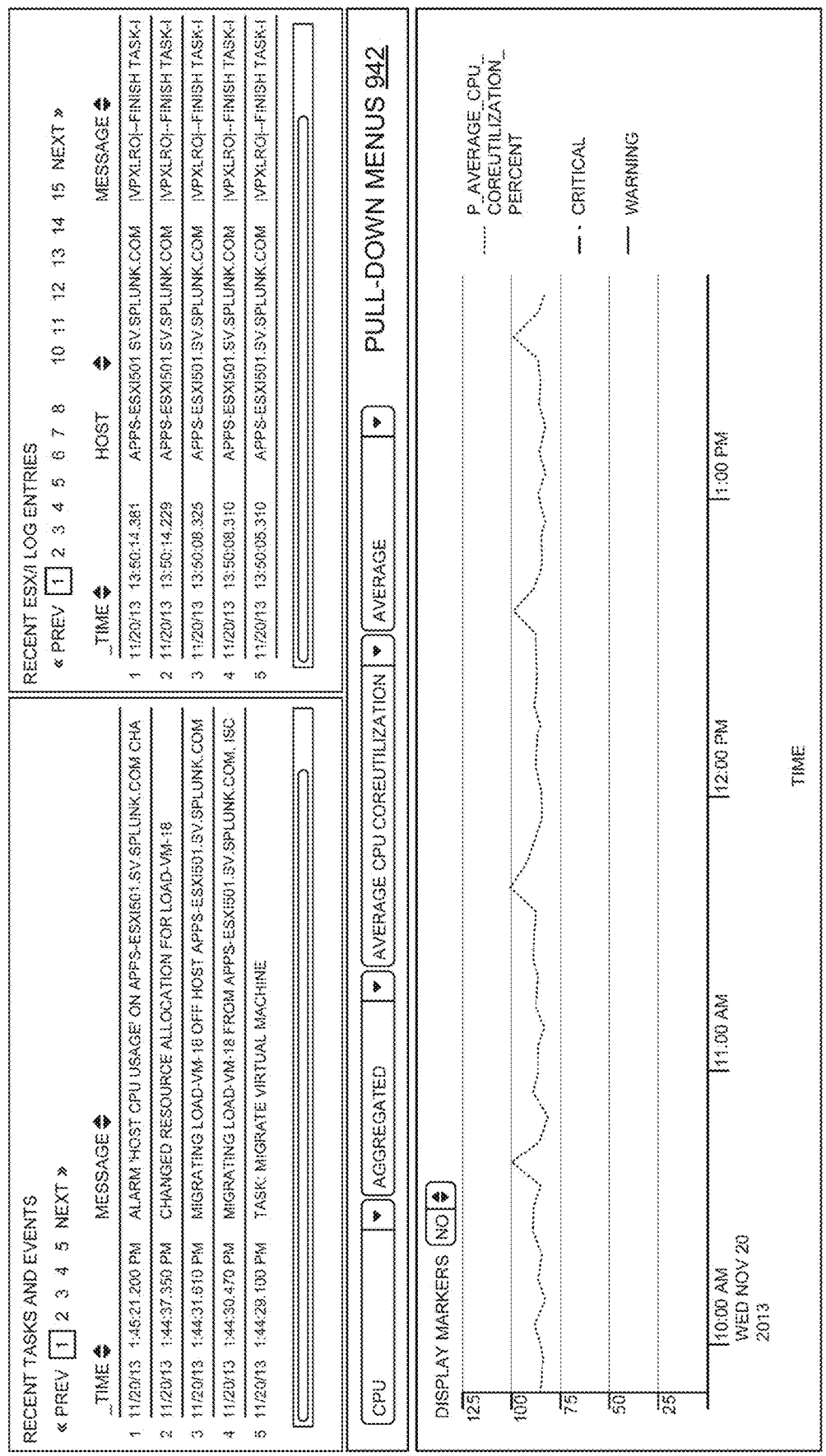
FIG. 17D is an interface diagram of an example a user interface displaying both log data and performance data, in accordance with example embodiments.

The virtual machine monitoring application also provides a user interface that enables a user to select a specific time range and then view heterogeneous data comprising events, log data, and associated performance metrics for the selected time range. For example, the screen illustrated in FIG. 17D displays a listing of recent "tasks and events" and a listing of recent "log entries" for a selected time range above a performance-metric graph for "average CPU core utilization" for the selected time range. Note that a user is able to operate pull-down menus 1742 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

2.16. IT Service Monitoring

As previously mentioned, the data intake and query platform provides various schemas, dashboards and visualizations that make it easy for developers to create applications to provide additional capabilities. One such application is an IT monitoring application, such as SPLUNK® IT SERVICE INTELLIGENCE™, which performs monitoring and alerting operations. The IT monitoring application also includes analytics to help an analyst diagnose the root cause of performance problems based on large volumes of data stored by the data intake and query system as correlated to the various services an IT organization provides (a service-centric view). This differs significantly from conventional IT monitoring systems that lack the infrastructure to effectively store and analyze large volumes of service-related events. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations, when all of the original data may be needed to determine the root cause of or contributing factors to a service issue.

In contrast, an IT monitoring application system stores large volumes of minimally-processed service-related data at ingestion time for later retrieval and analysis at search time, to perform regular monitoring, or to investigate a service issue. To facilitate this data retrieval process, the IT monitoring application enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the events that pertains to the entity, whether produced by the entity itself or by another machine, and considering the many various ways the entity may be identified in machine data (such as by a URL, an IP address, or machine name). The service and entity definitions can organize events around a service so that all of the events pertaining to that service can be easily identified. This capability provides a foundation for the implementation of Key Performance Indicators.

One or more Key Performance Indicators (KPI's) are defined for a service within the IT monitoring application. Each KPI measures an aspect of service performance at a point in time or over a period of time (aspect KPI's). Each KPI is defined by a search query that derives a KPI value from the machine data of events associated with the entities that provide the service. Information in the entity definitions may be used to identify the appropriate events at the time a KPI is defined or whenever a KPI value is being determined. The KPI values derived over time may be stored to build a valuable repository of current and historical performance information for the service, and the repository, itself, may be subject to search query processing. Aggregate KPIs may be defined to provide a measure of service performance calculated from a set of service aspect KPI values; this aggregate may even be taken across defined timeframes and/or across multiple services. A particular service may have an aggregate KPI derived from substantially all of the aspect KPI's of the service to indicate an overall health score for the service.

The IT monitoring application facilitates the production of meaningful aggregate KPI's through a system of KPI thresholds and state values. Different KPI definitions may produce values in different ranges, and so the same value may mean something very different from one KPI definition to another. To address this, the IT monitoring application implements a translation of individual KPI values to a common domain of "state" values. For example, a KPI range of values may be 1-100, or 50-275, while values in the state domain may be 'critical,' 'warning,' 'normal,' and 'informational'. Thresholds associated with a particular KPI definition determine ranges of values for that KPI that correspond to the various state values. In one case, KPI values 95-100 may be set to correspond to 'critical' in the state domain. KPI values from disparate KPI's can be processed uniformly once they are translated into the common state values using the thresholds. For example, "normal 80% of the time" can be applied across various KPI's. To provide meaningful aggregate KPI's, a weighting value can be assigned to each KPI so that its influence on the calculated aggregate KPI value is increased or decreased relative to the other KPI's.

One service in an IT environment often impacts, or is impacted by, another service. The IT monitoring application can reflect these dependencies. For example, a dependency relationship between a corporate e-mail service and a centralized authentication service can be reflected by recording an association between their respective service definitions. The recorded associations establish a service dependency topology that informs the data or selection options presented in a GUI, for example. (The service dependency topology is like a "map" showing how services are connected based on their dependencies.) The service topology may itself be depicted in a GUI and may be interactive to allow navigation among related services.

Entity definitions in the IT monitoring application can include informational fields that can serve as metadata, implied data fields, or attributed data fields for the events identified by other aspects of the entity definition. Entity definitions in the IT monitoring application can also be created and updated by an import of tabular data (as represented in a CSV, another delimited file, or a search query result set). The import may be GUI-mediated or processed using import parameters from a GUI-based import definition process. Entity definitions in the IT monitoring application can also be associated with a service by means of a service definition rule. Processing the rule results in the matching entity definitions being associated with the service definition. The rule can be processed at creation time, and thereafter on a scheduled or on-demand basis. This allows dynamic, rule-based updates to the service definition.

During operation, the IT monitoring application can recognize notable events that may indicate a service performance problem or other situation of interest. These notable events can be recognized by a "correlation search" specifying trigger criteria for a notable event: every time KPI values satisfy the criteria, the application indicates a notable event. A severity level for the notable event may also be specified. Furthermore, when trigger criteria are satisfied, the correlation search may additionally or alternatively cause a service ticket to be created in an IT service management (ITSM) system, such as a systems available from ServiceNow, Inc., of Santa Clara, Calif.

SPLUNK® IT SERVICE INTELLIGENCE™ provides various visualizations built on its service-centric organization of events and the KPI values generated and collected. Visualizations can be particularly useful for monitoring or investigating service performance. The IT monitoring application provides a service monitoring interface suitable as the home page for ongoing IT service monitoring. The interface is appropriate for settings such as desktop use or for a wall-mounted display in a network operations center (NOC). The interface may prominently display a services health section with tiles for the aggregate KPI's indicating overall health for defined services and a general KPI section with tiles for KPI's related to individual service aspects. These tiles may display KPI information in a variety of ways, such as by being colored and ordered according to factors like the KPI state value. They also can be interactive and navigate to visualizations of more detailed KPI information.

The IT monitoring application provides a service-monitoring dashboard visualization based on a user-defined template. The template can include user-selectable widgets of varying types and styles to display KPI information. The content and the appearance of widgets can respond dynamically to changing KPI information. The KPI widgets can appear in conjunction with a background image, user drawing objects, or other visual elements, that depict the IT operations environment, for example. The KPI widgets or other GUI elements can be interactive so as to provide navigation to visualizations of more detailed KPI information.

The IT monitoring application provides a visualization showing detailed time-series information for multiple KPI's in parallel graph lanes. The length of each lane can correspond to a uniform time range, while the width of each lane may be automatically adjusted to fit the displayed KPI data. Data within each lane may be displayed in a user selectable style, such as a line, area, or bar chart. During operation a user may select a position in the time range of the graph lanes to activate lane inspection at that point in time. Lane inspection may display an indicator for the selected time across the graph lanes and display the KPI value associated with that point in time for each of the graph lanes. The visualization may also provide navigation to an interface for defining a correlation search, using information from the visualization to pre-populate the definition.

The IT monitoring application provides a visualization for incident review showing detailed information for notable events. The incident review visualization may also show summary information for the notable events over a time frame, such as an indication of the number of notable events at each of a number of severity levels. The severity level display may be presented as a rainbow chart with the warmest color associated with the highest severity classification. The incident review visualization may also show summary information for the notable events over a time frame, such as the number of notable events occurring within segments of the time frame. The incident review visualization may display a list of notable events within the time frame ordered by any number of factors, such as time or severity. The selection of a particular notable event from the list may display detailed information about that notable event, including an identification of the correlation search that generated the notable event.

The IT monitoring application provides pre-specified schemas for extracting relevant values from the different types of service-related events. It also enables a user to define such schemas.

2.16.1 Example Service Monitoring System

Figure 18:
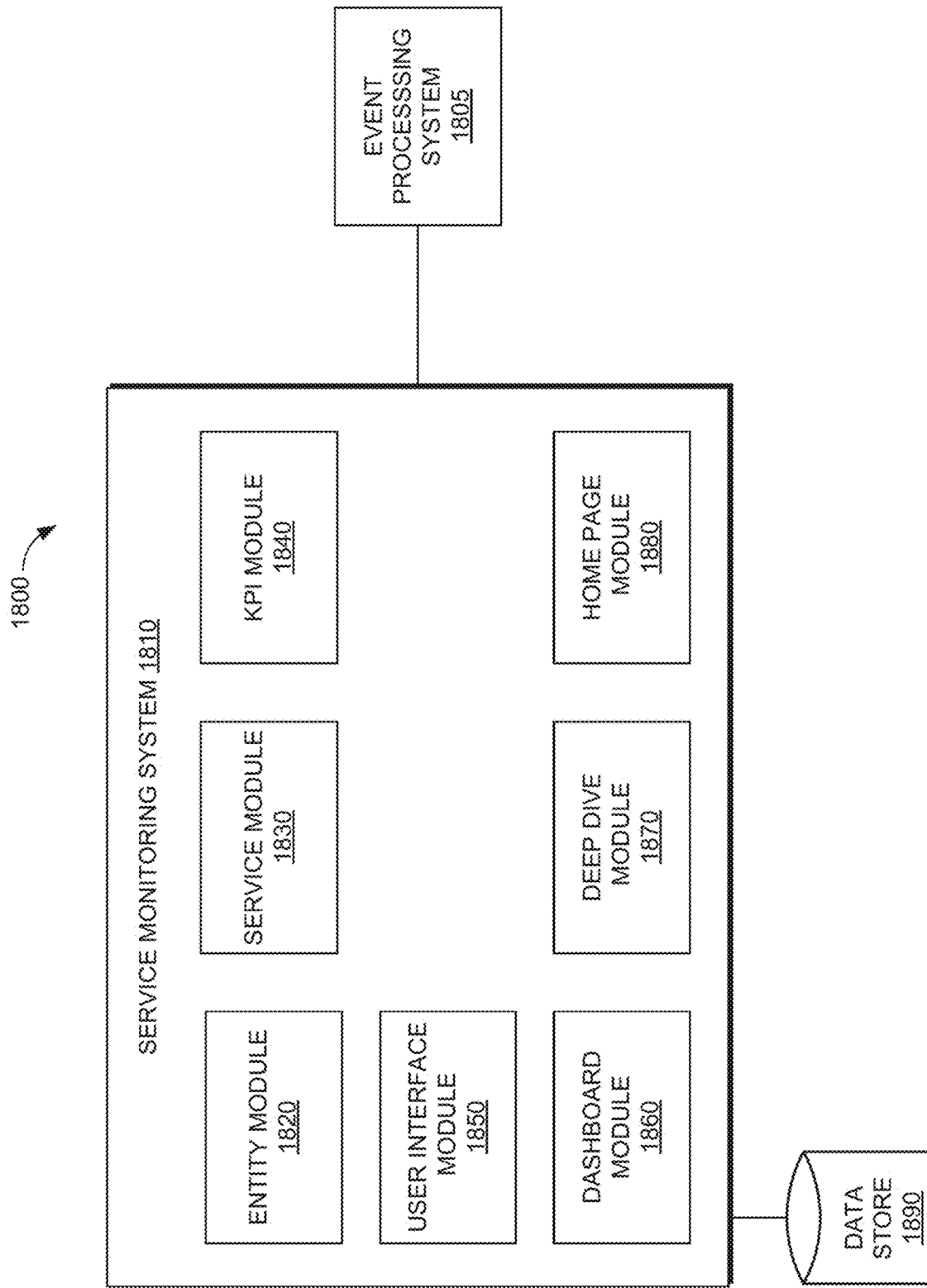
FIG. 18 is a block diagram of one implementation of a service monitoring system for monitoring performance of one or more services using key performance indicators derived from machine data, in accordance with one or more implementations of the present disclosure.

FIG. 18 is a block diagram 1800 of one implementation of a service monitoring system 1810 for monitoring performance of one or more services using key performance indicators derived from machine data, in accordance with one or more implementations of the present disclosure. The service monitoring system 1810 can be hosted by one or more computing machines and can include components for monitoring performance of one or more services. The components can include, for example, an entity module 1820, a service module 1830, a key performance indicator (KPI) module 1840, a user interface (UI) module 1850, a dashboard module 1860, a deep dive module 1870, and a home page module 1880. The components can be combined together or separated in further components, according to a particular embodiment. The components and/or combinations of components can be hosted on a single computing machine and/or multiple computing machines. The components and/or combinations of components can be hosted on one or more client computing machines and/or server computing machines.

The entity module 1820 can create entity definitions. "Create" hereinafter includes "edit" throughout this document. An entity definition is a data structure that associates an entity with machine data. The entity module 1820 can determine associations between machine data and entities, and can create an entity definition that associates an individual entity with machine data produced by different sources hosted by that entity and/or other entity(ies). In one implementation, the entity module 1820 automatically identifies the entities in an environment (e.g., IT environment), automatically determines, for each entity, which machine data is associated with that particular entity, and automatically generates an entity definition for each entity. In another implementation, the entity module 1820 receives input (e.g., user input) for creating an entity definition for an entity.

Referring to FIG. 18, the service module 1830 can create service definitions for services. A service definition is a data structure that associates one or more entities with a service. The service module 1830 can receive input (e.g., user input) of a title and/or description for a service definition.

Figure 19:
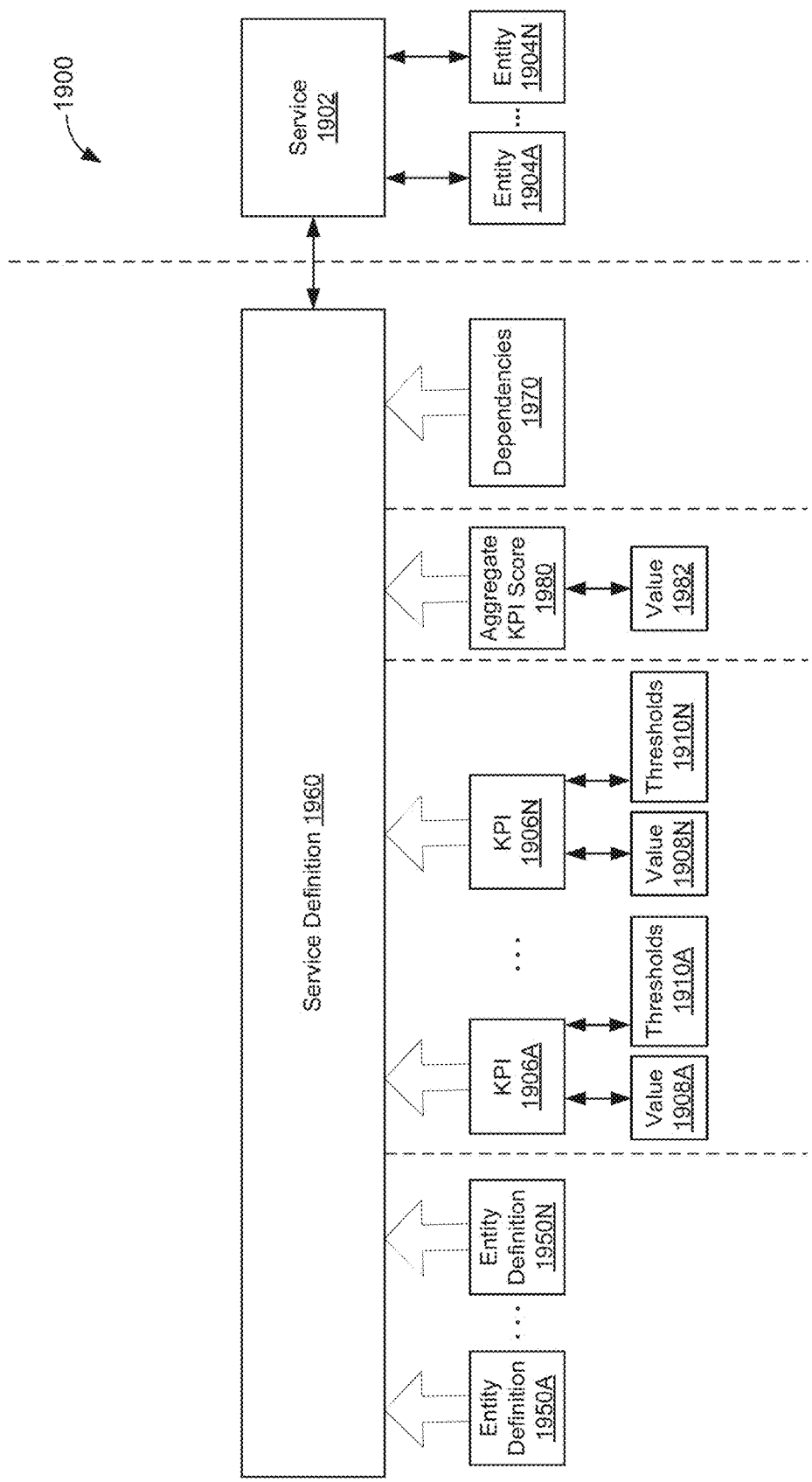
FIG. 19 is a block diagram illustrating a service definition that relates one or more entities with a service, in accordance with one or more implementations of the present disclosure.

FIG. 19 is a block diagram illustrating a service definition that relates one or more entities with a service, in accordance with one or more implementations of the present disclosure. In another implementation, a service definition specifies one or more other services which a service depends upon and does not associate any entities with the service. In another implementation, a service definition specifies a service as a collection of one or more other services and one or more entities.

In one example, a service 1902 is provided by one or more entities 1904A-N. For example, entities 1904A-N may be web servers that provide the service 1902 (e.g., web hosting service). In another example, a service 1902 may be a database service that provides database data to other services (e.g., analytical services). The entities 1904A-N, which provides the database service, may be database servers.

The service module 1830 can include an entity definition 1950A-450N, for a corresponding entity 1904A-N that provides the service 1902, in the service definition 1960 for the service 1902. The service module 1830 can receive input (e.g., user input) identifying one or more entity definitions to include in a service definition.

The service module 1830 can include dependencies 1970 in the service definition 1960. The dependencies 1970 indicate one or more other services for which the service 1902 is dependent upon. For example, another set of entities (e.g., host machines) may define a testing environment that provides a sandbox service for isolating and testing untested programming code changes. In another example, a specific set of entities (e.g., host machines) may define a revision control system that provides a revision control service to a development organization. In yet another example, a set of entities (e.g., switches, firewall systems, and routers) may define a network that provides a networking service. The sandbox service can depend on the revision control service and the networking service. The revision control service can depend on the networking service. If the service 1902 is the sandbox service and the service definition 1960 is for the sandbox service 1902, the dependencies 1970 can include the revision control service and the networking service. The service module 1830 can receive input specifying the other service(s) for which the service 1902 is dependent on and can include the dependencies 1970 between the services in the service definition 1960. In one implementation, the service associated defined by the service definition 1960 may be designated as a dependency for another service, and the service definition 1960 can include information indicating the other services which depend on the service described by the service definition 1960.

Referring to FIG. 18, the KPI module 1840 can create one or more KPIs for a service and include the KPIs in the service definition. For example, in FIG. 19, various aspects (e.g., CPU usage, memory usage, response time, etc.) of the service 1902 can be monitored using respective KPIs. The KPI module 1840 can receive input (e.g., user input) defining a KPI for each aspect of the service 1902 to be monitored and include the KPIs (e.g., KPIs 1906A-1906N) in the service definition 1960 for the service 1902. Each KPI can be defined by a search query that can produce a value. For example, the KPI 1906A can be defined by a search query that produces value 1908A, and the KPI 1906N can be defined by a search query that produces value 1908N.

The KPI module 1840 can receive input specifying the search processing language for the search query defining the KPI. The input can include a search string defining the search query and/or selection of a data model to define the search query. The search query can produce, for a corresponding KPI, value 1908A-N derived from machine data that is identified in the entity definitions 1950A-N that are identified in the service definition 1960.

The KPI module 1840 can receive input to define one or more thresholds for one or more KPIs. For example, the KPI module 1840 can receive input defining one or more thresholds 1910A for KPI 1906A and input defining one or more thresholds 1910N for KPI 1906N. Each threshold defines an end of a range of values representing a certain state for the KPI. Multiple states can be defined for the KPI (e.g., unknown state, trivial state, informational state, normal state, warning state, error state, and critical state), and the current state of the KPI depends on which range the value, which is produced by the search query defining the KPI, falls into. The KPI module 1840 can include the threshold definition(s) in the KPI definitions. The service module 1830 can include the defined KPIs in the service definition for the service.

The KPI module 1840 can calculate an aggregate KPI score 1980 for the service for continuous monitoring of the service. The score 1980 can be a calculated value 1982 for the aggregate of the KPIs for the service to indicate an overall performance of the service. For example, if the service has 10 KPIs and if the values produced by the search queries for 9 of the 10 KPIs indicate that the corresponding KPI is in a normal state, then the value 1982 for an aggregate KPI may indicate that the overall performance of the service is satisfactory.

Referring to FIG. 18, the service monitoring system 1810 can be coupled to one or more data stores 1890. The entity definitions, the service definitions, and the KPI definitions can be stored in the data store(s) 1890 that are coupled to the service monitoring system 1810. The entity definitions, the service definitions, and the KPI definitions can be stored in a data store 1890 in a key-value store, a configuration file, a lookup file, a database, or in metadata fields associated with events representing the machine data. A data store 1890 can be a persistent storage that is capable of storing data. A persistent storage can be a local storage unit or a remote storage unit. Persistent storage can be a magnetic storage unit, optical storage unit, solid state storage unit, electronic storage units (main memory), or similar storage unit. Persistent storage can be a monolithic device or a distributed set of devices. A 'set', as used herein, refers to any positive whole number of items.

The user interface (UI) module 1850 can generate graphical interfaces for creating and/or editing entity definitions for entities, creating and/or editing service definitions for services, defining key performance indicators (KPIs) for services, setting thresholds for the KPIs, and defining aggregate KPI scores for services. The graphical interfaces can be user interfaces and/or graphical user interfaces (GUIs).

The UI module 1850 can cause the display of the graphical interfaces and can receive input via the graphical interfaces. The entity module 1820, service module 1830, KPI module 1840, dashboard module 1860, deep dive module 1870, and home page module 1880 can receive input via the graphical interfaces generated by the UI module 1850. The entity module 1820, service module 1830, KPI module 1840, dashboard module 1860, deep dive module 1870, and home page module 1880 can provide data to be displayed in the graphical interfaces to the UI module 1850, and the UI module 1850 can cause the display of the data in the graphical interfaces.

The dashboard module 1860 can create a service-monitoring dashboard. In one implementation, dashboard module 1860 works in connection with UI module 1850 to present a dashboard-creation graphical interface that includes a modifiable dashboard template, an interface containing drawing tools to customize a service-monitoring dashboard to define flow charts, text and connections between different elements on the service-monitoring dashboard, a KPI-selection interface and/or service selection interface, and a configuration interface for creating service-monitoring dashboard. The service-monitoring dashboard displays one or more KPI widgets. Each KPI widget can provide a numerical or graphical representation of one or more values for a corresponding KPI indicating how an aspect of a service is performing at one or more points in time. Dashboard module 1860 can work in connection with UI module 1850 to define the service-monitoring dashboard in response to user input, and to cause display of the service-monitoring dashboard including the one or more KPI widgets. The input can be used to customize the service-monitoring dashboard. The input can include for example, selection of one or more images for the service-monitoring dashboard (e.g., a background image for the service-monitoring dashboard, an image to represent an entity and/or service), creation and representation of ad hoc search in the form of KPI widgets, selection of one or more KPIs to represent in the service-monitoring dashboard, selection of a KPI widget for each selected KPI. The input can be stored in the one or more data stores 1890 that are coupled to the dashboard module 1860. In other implementations, some other software or hardware module may perform the actions associated with generating and displaying the service-monitoring dashboard, although the general functionality and features of the service-monitoring dashboard should remain as described herein.

In one implementation, deep dive module 1870 works in connection with UI module 1850 to present a wizard for creation and editing of the deep dive visual interface, to generate the deep dive visual interface in response to user input, and to cause display of the deep dive visual interface including the one or more graphical visualizations. The input can be stored in the one or more data stores 1890 that are coupled to the deep dive module 1870. In other implementations, some other software or hardware module may perform the actions associated with generating and displaying the deep dive visual interface, although the general functionality and features of deep dive should remain as described herein.

The home page module 1880 can create a home page graphical interface. The home page graphical interface can include one or more tiles, where each tile represents a service-related alarm, service-monitoring dashboard, a deep dive visual interface, or the value of a particular KPI. In one implementation home page module 1880 works in connection with UI module 1850. The UI module 1850 can cause the display of the home page graphical interface. The home page module 1880 can receive input (e.g., user input) to request a service-monitoring dashboard or a deep dive to be displayed. The input can include for example, selection of a tile representing a service-monitoring dashboard or a deep dive. In other implementations, some other software or hardware module may perform the actions associated with generating and displaying the home page graphical interface, although the general functionality and features of the home page graphical interface should remain as described herein.

Referring to FIG. 18, the service monitoring system 1810 can be coupled to an event processing system 1805 via one or more networks. The event processing system 1805 can receive a request from the service monitoring system 1810 to process a search query. For example, the dashboard module 1860 may receive input request to display a service-monitoring dashboard with one or more KPI widgets. The dashboard module 1860 can request the event processing system 1805 to process a search query for each KPI represented by a KPI widget in the service-monitoring dashboard.

The one or more networks can include one or more public networks (e.g., the Internet), one or more private networks (e.g., a local area network (LAN) or one or more wide area networks (WAN)), one or more wired networks (e.g., Ethernet network), one or more wireless networks (e.g., an 802.11 network or a Wi-Fi network), one or more cellular networks (e.g., a Long Term Evolution (LTE) network), routers, hubs, switches, server computers, and/or a combination thereof.

2.16.2 Key Performance Indicators

Figure 20:
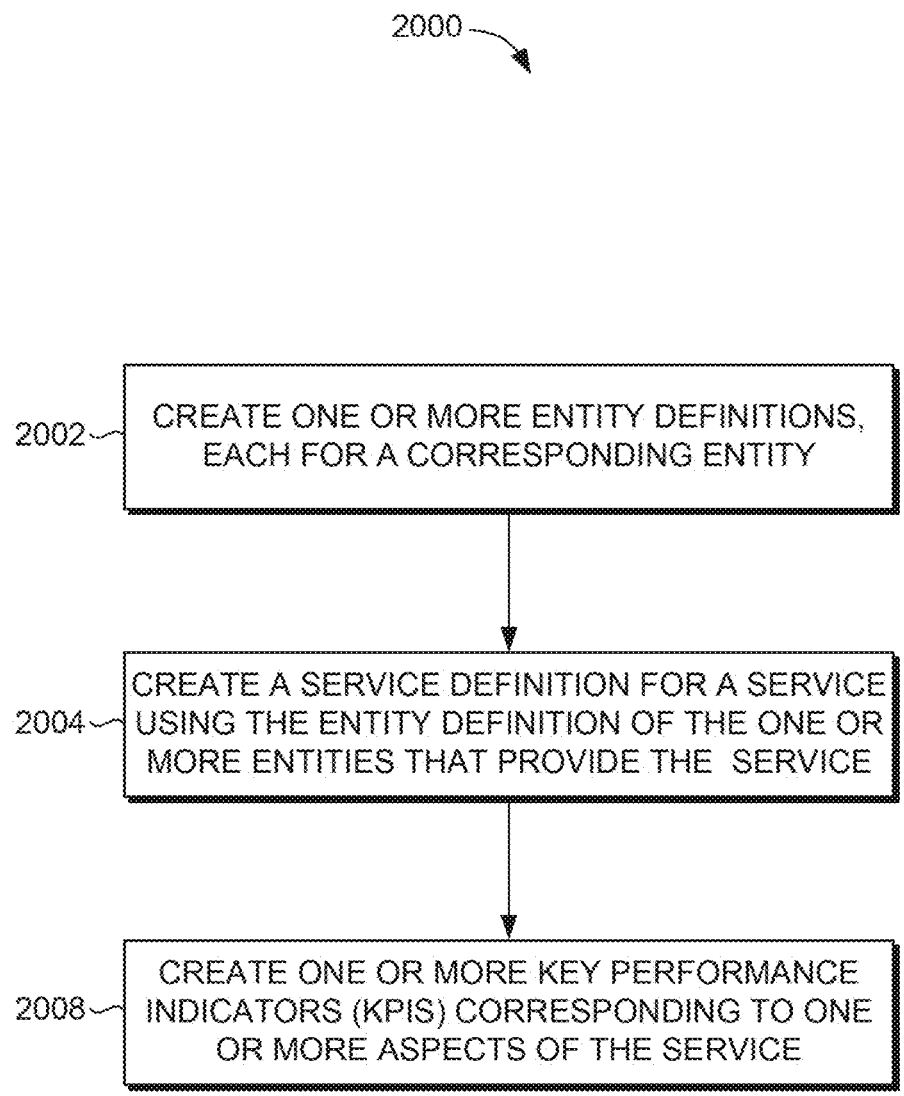
FIG. 20 is a flow diagram of an implementation of a method for creating one or more key performance indicators for a service, in accordance with one or more implementations of the present disclosure.

FIG. 20 is a flow diagram of an implementation of a method 2000 for creating one or more key performance indicators for a service, in accordance with one or more implementations of the present disclosure. The method may be performed by processing logic that may comprise hardware (circuitry, dedicated logic, etc.), software (such as is run on a general purpose computer system or a dedicated machine), or a combination of both. In one implementation, at least a portion of method is performed by a client computing machine. In another implementation, at least a portion of method is performed by a server computing machine.

At block 2002, the computing machine creates one or more entity definitions, each for a corresponding entity. Each entity definition associates an entity with machine data that pertains to that entity. As described above, various machine data may be associated with a particular entity, but may use different aliases for identifying the same entity. The entity definition for an entity normalizes the different aliases of that entity. In one implementation, the computing machine receives input for creating the entity definition. The input can be user input.

In another implementation, the computing machine imports a data file (e.g., CSV (comma-separated values) data file) that includes information identifying entities in an environment and uses the data file to automatically create entity definitions for the entities described in the data file. The data file may be stored in a data store (e.g., data store 1890 in FIG. 18) that is coupled to the computing machine.

In another implementation, the computing machine automatically (without any user input) identifies one or more aliases for an entity in machine data, and automatically creates an entity definition in response to automatically identifying the aliases of the entity in the machine data. For example, the computing machine can execute a search query from a saved search to extract data to identify an alias for an entity in machine data from one or more sources, and automatically create an entity definition for the entity based on the identified aliases.

At block 2004, the computing machine creates a service definition for a service using the entity definitions of the one or more entities that provide the service, according to one implementation. A service definition can relate one or more entities to a service. For example, the service definition can include an entity definition for each of the entities that provide the service. In one implementation, the computing machine receives input (e.g., user input) for creating the service definition. In one implementation, the computing machine automatically creates a service definition for a service. In another example, a service may not directly be provided by one or more entities, and the service definition for the service may not directly relate one or more entities to the service. For example, a service definition for a service may not contain any entity definitions and may contain information indicating that the service is dependent on one or more other services. For example, a business service may not be directly provided by one or more entities and may be dependent on one or more other services. For example, an online store service may depend on an e-commerce service provided by an e-commerce system, a database service, and a network service. The online store service can be monitored via the entities of the other services (e.g., e-commerce service, database service, and network service) upon which the service depends on.

At block 2006, the computing machine creates one or more key performance indicators (KPIs) corresponding to one or more aspects of the service. An aspect of a service may refer to a certain characteristic of the service that can be measured at various points in time during the operation of the service. For example, aspects of a web hosting service may include request response time, CPU usage, and memory usage. Each KPI for the service can be defined by a search query that produces a value derived from the machine data that is identified in the entity definitions included in the service definition for the service. Each value is indicative of how an aspect of the service is performing at a point in time or during a period of time. In one implementation, the computing machine receives input (e.g., user input) for creating the KPI(s) for the service. In one implementation, the computing machine automatically creates one or more key performance indicators (KPIs) corresponding to one or more aspects of the service.

Figure 21:
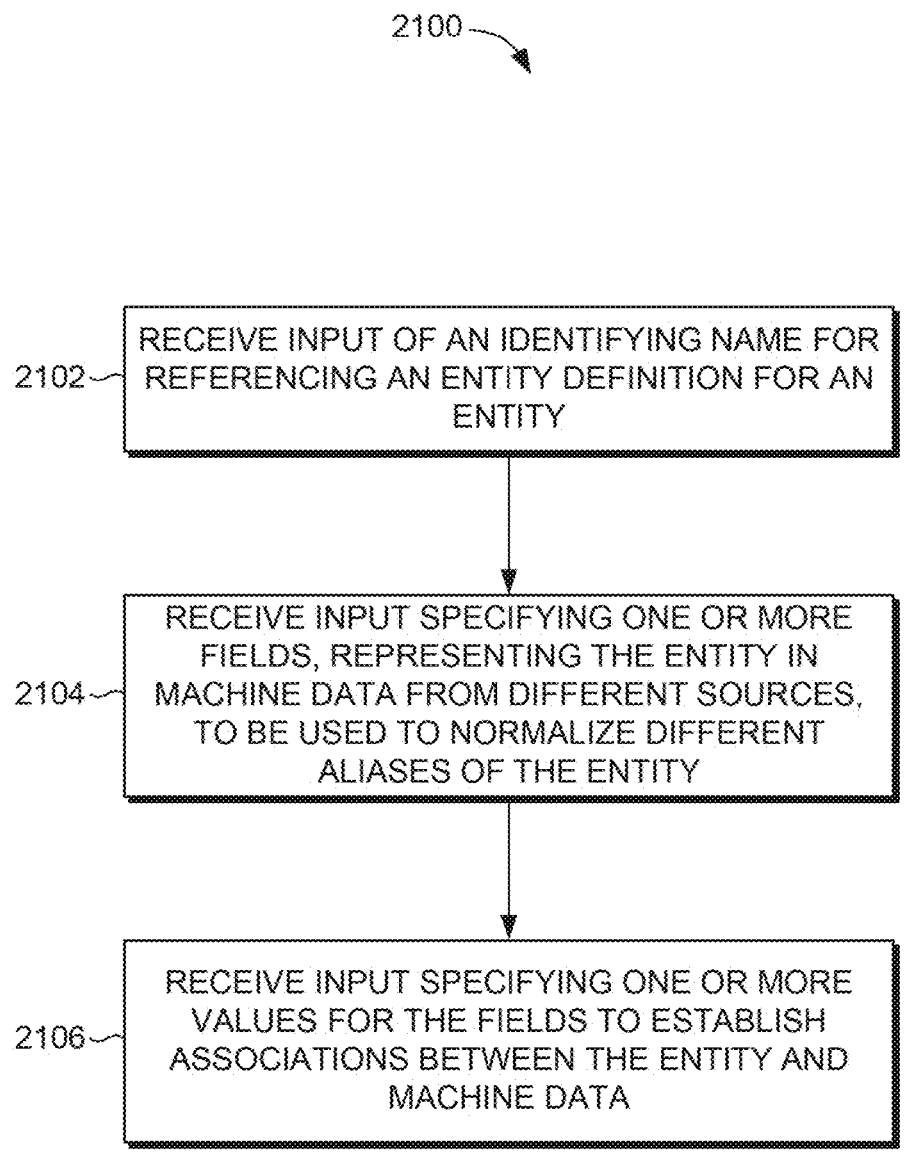
FIG. 21 is a flow diagram of an implementation of a method for creating an entity definition for an entity, in accordance with one or more implementations of the present disclosure.

FIG. 21 is a flow diagram of an implementation of a method 2100 for creating an entity definition for an entity, in accordance with one or more implementations of the present disclosure. The method may be performed by processing logic that may comprise hardware (circuitry, dedicated logic, etc.), software (such as is run on a general purpose computer system or a dedicated machine), or a combination of both. In one implementation, at least a portion of method is performed by a client computing machine. In another implementation, at least a portion of method is performed by a server computing machine.

At block 2102, the computing machine receives input of an identifying name for referencing the entity definition for an entity. The input can be user input. The user input can be received via a graphical interface. The identifying name can be a unique name.

At block 2104, the computing machine receives input (e.g., user input) specifying one or more search fields ("fields") representing the entity in machine data from different sources, to be used to normalize different aliases of the entity. Machine data can be represented as events. As described above, the computing machine can be coupled to an event processing system (e.g., event processing system 1805 in FIG. 18). The event processing system can process machine data to represent the machine data as events. Each of the events is raw data, and when a late-binding schema is applied to the events, values for fields defined by the schema are extracted from the events. A number of "default fields" that specify metadata about the events rather than data in the events themselves can be created automatically. For example, such default fields can specify: a timestamp for the event data; a host from which the event data originated; a source of the event data; and a source type for the event data. These default fields may be determined automatically when the events are created, indexed or stored. Each event has metadata associated with the respective event. Implementations of the event processing system processing the machine data to be represented as events.

At block 2106, the computing machine receives input (e.g., user input) specifying one or more search values ("values") for the fields to establish associations between the entity and machine data. The values can be used to search for the events that have matching values for the above fields. The entity can be associated with the machine data that is represented by the events that have fields that store values that match the received input.

The computing machine can optionally also receive input (e.g., user input) specifying a type of entity to which the entity definition applies. The computing machine can optionally also receive input (e.g., user input) associating the entity of the entity definition with one or more services.

3.0. Collaborative Incident Management

Figure 22:
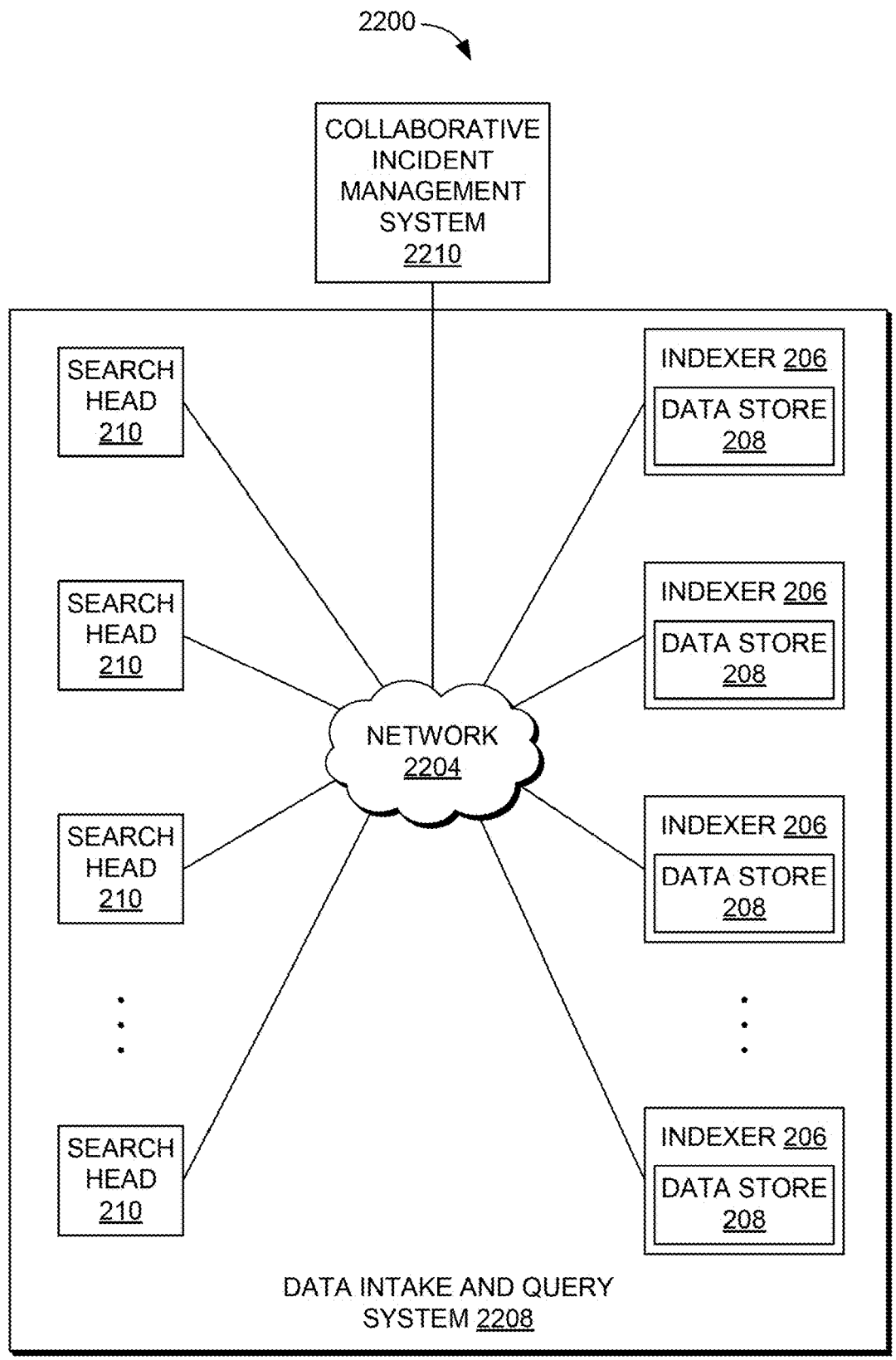
FIG. 22 illustrates a block diagram of an example computing environment in accordance with the disclosed embodiments.

FIG. 22 illustrates a block diagram of an example computing environment 2200 in accordance with the disclosed embodiments. As shown, the computing environment 2200 may include, without limitation, a data intake and query system 2208 and a collaborative incident management system 2210. As further shown, the data intake and query system 2208 may include, without limitation, search heads 210 and indexers 206 that communicate with each other over a network 2204. Each of the indexers 206 may include, without limitation, a data store 208. The search heads 210, indexers 206, and data stores 208 function substantially the same as corresponding elements of the data intake and query system 108 of FIG. 2 with detail of their specific operation described below. Network 2204 broadly represents one or more LANs, WANs, cellular networks (e.g., LTE, HSPA, 3G, and other cellular technologies), and/or networks using any of wired, wireless, terrestrial microwave, or satellite links, and may include the public Internet.

Each search head 210 of data intake and query system 2208 may receive one or more search queries, for example, via collaborative incident management system 2210. Upon receiving one or more search queries, a search head 210 may analyze each search query to determine which portion(s) of the search query may be delegated to indexers 206 and which portion(s) of the search query may be executed locally by the search head 210. The search head 210 may distribute the determined portions of the search query to the appropriate indexers 206. The search head 210 may coordinate with peer search heads to schedule jobs, replicate search results, update configurations, fulfill search requests, etc.

As further described herein, the collaborative incident management system 2210 may retrieve information and updates related to an incident and may display the information and updates in the form of a centralized graphical user interface. The collaborative incident management system 2210 may retrieve the information and updates via various communications channels, data sources, and software application programs (also referred to herein as "application programs"). In some embodiments, the retrieved information and updates may include data stored within the data intake and query system 2208. Such data may include, without limitation, data that indicates the activities or performance of one or more services related to the incident, data associated with KPIs related to the incident, and data associated with application programs utilized by members of the incident response team to resolve the incident. In such embodiments, the data intake and query system 2208 may schedule search queries for execution by search heads 210. The data intake and query system 2208 may communicate with search heads 210 to dispatch each search query to one or more of the search heads 210 for execution. In operation, search heads 210 may direct network traffic associated with search queries to indexers 206 via network 2204. Indexers 206 may return network traffic associated with search results to search heads 210 via network 2204. Search heads 210, in turn, may return network traffic associated with search results to the collaborative incident management system 2210 via network 2204.

In some embodiments, the collaborative incident management system 2210 may be included with an instance of a search head 210. In such embodiments, each search head 210 may be capable of performing the functions of the collaborative incident management system 2210 in addition to the functions of the search head 210. The collaborative incident management system 2210 is now described in further detail.

In some embodiments, when an incident is initialized, one or more systems and application programs within the SPLUNK® environment are instrumented. As a result, the collaborative incident management system 2210 may collect and index all or substantially all incident-related activities associated with the instrumented systems and application programs that the members of the incident response team members are performing. The instrumented systems and application programs may include, without limitation, the SPLUNK® ENTERPRISE system, the SPLUNK® IT SERVICE INTELLIGENCE™ IT monitoring application, and the SPLUNK® APP FOR ENTERPRISE SECURITY. In this manner, the collaborative incident management system 2210, in conjunction with the instrumented systems and application programs may collect and index activities related to resolving the incident without specific interaction or input from the incident manager or the members of the incident response team. As a result, the collaborative incident management system 2210 may collect and index incident-related activities without imposing additional burden to the incident manager and the members of the incident response team. In parallel, the incident manager may collate the collected and indexed activity data stored in the data store of the collaborative incident management system 2210 and may identify or flag important activities.

After the incident is resolved, the incident manager and the members of the incident response team may review all of the collected and indexed activity data in order to investigate the root cause of the incident. Further, based on the review of the activity data for the incident, the incident manager may create new SPLUNK® IT SERVICE INTELLIGENCE™ services and KPIs to proactively monitor for symptoms that led to the incident. Further, the incident manager may use the activity data in conjunction with the collaborative incident management system 2210 to automatically generate or update an electronic support runbook. Such an electronic support runbook may include diagnostic steps and operations that a system administrator, an incident manager, or a member of the incident response team may perform if a similar incident occurs in the future.

Figure 23:
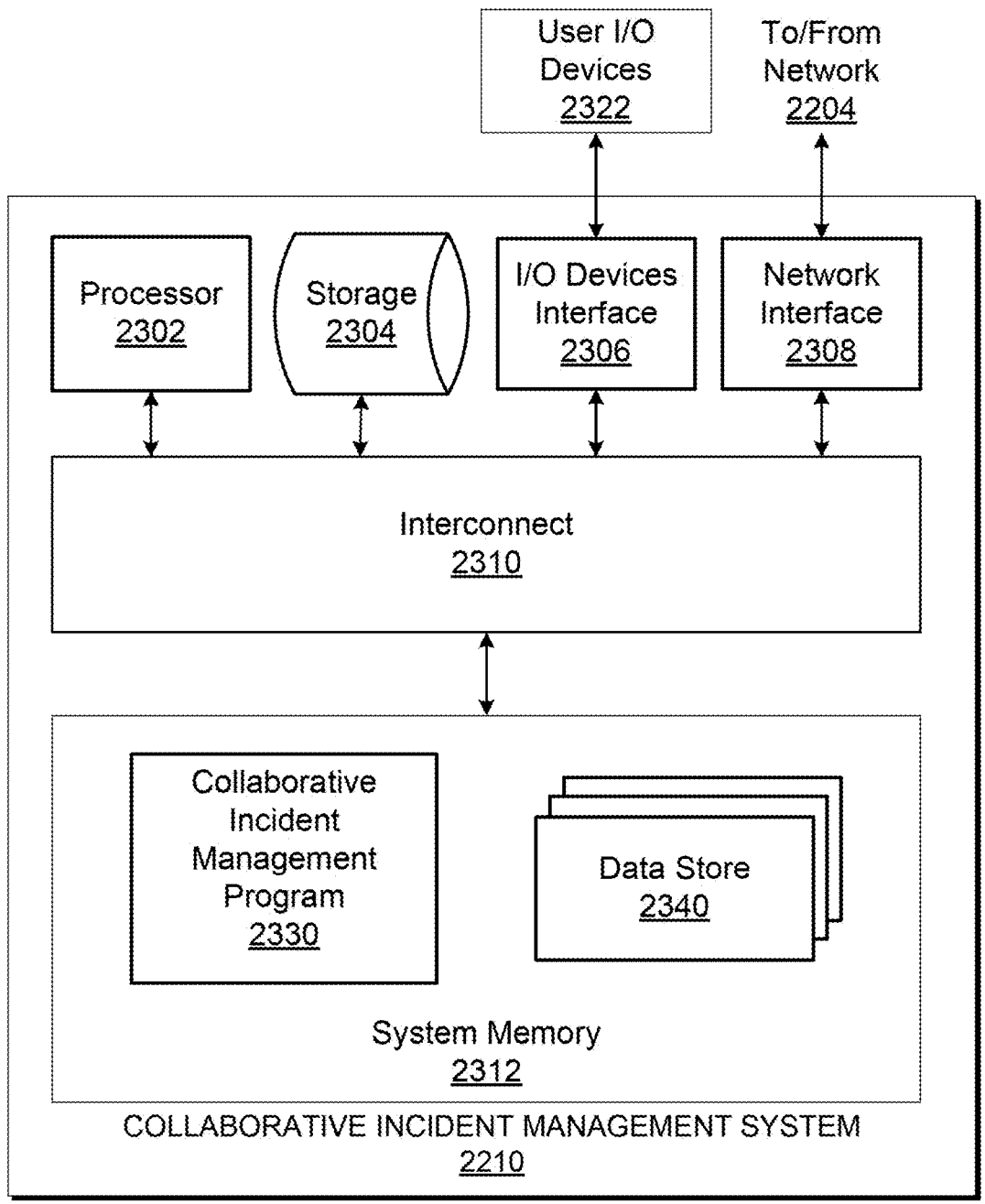
FIG. 23 is a more detailed illustration of the collaborative incident management system of FIG. 22 in accordance with the disclosed embodiments.

FIG. 23 is a more detailed illustration of the collaborative incident management system 2210 of FIG. 22 in accordance with the disclosed embodiments. As shown, the collaborative incident management system 2210 may include, without limitation, a processor 2302, storage 2304, an input/output (I/O) device interface 2306, a network interface 2308, an interconnect 2310, and a system memory 2312.

In general, processor 2302 may retrieve and execute programming instructions stored in system memory 2312. Processor 2302 may be any technically feasible form of processing device configured to process data and execute program code. Processor 2302 could be, for example, a central processing unit (CPU), a graphics processing unit (GPU), an application-specific integrated circuit (ASIC), a field-programmable gate array (FPGA), and so forth. Processor 2302 stores and retrieves application data residing in the system memory 2312. Processor 2302 is included to be representative of a single CPU, multiple CPUs, a single CPU having multiple processing cores, and the like. In operation, processor 2302 is the master processor of collaborative incident management system 2210, controlling and coordinating operations of other system components. System memory 2312 stores software application programs and data for use by processor 2302. Processor 2302 executes software application programs stored within system memory 2312 and optionally an operating system. In particular, processor 2302 executes software and then performs one or more of the functions and operations set forth in the present application.

The storage 2304 may be a disk drive storage device. Although shown as a single unit, the storage 2304 may be a combination of fixed and/or removable storage devices, such as fixed disc drives, floppy disc drives, tape drives, removable memory cards, or optical storage, network attached storage (NAS), or a storage area-network (SAN). Processor 2302 communicates to other computing devices and systems via network interface 2308, where network interface 2308 is configured to transmit and receive data via a communications network.

The interconnect 2310 facilitates transmission, such as of programming instructions and application data, between the processor 2302, input/output (I/O) devices interface 2306, storage 2304, network interface 2308, and system memory 2312. The I/O devices interface 2306 is configured to receive input data from user I/O devices 2322. Examples of user I/O devices 2322 may include one or more buttons, a keyboard, and a mouse or other pointing device. The I/O devices interface 2306 may also include an audio output unit configured to generate an electrical audio output signal, and user I/O devices 2322 may further include a speaker configured to generate an acoustic output in response to the electrical audio output signal. Another example of a user I/O device 2322 is a display device that generally represents any technically feasible means for generating an image for display. For example, the display device may be a liquid crystal display (LCD) display, CRT display, or DLP display. The display device may be a TV that includes a broadcast or cable tuner for receiving digital or analog television signals.

The system memory 2312 may include, without limitation, a collaborative incident management program 2330 and a data store 2340. In operation, processor 2302 executes collaborative incident management program 2330 to perform one or more of the techniques disclosed herein.

In operation, collaborative incident management program 2330 executing on the collaborative incident management system 2210 may generate a virtual incident management room, also referred to herein as a virtual "war room," where information and updates from multiple communications channels, data sources, and application programs related to resolving an incident may be collected and presented. The virtual incident management room functions analogously to a physical war room, by presenting a centralized interface whereby members of an incident response team may meet to collaborate in resolving an incident.

By way of the virtual incident management room, members of an incident response team may perform various incident-related activities. These incident-related activities may include, without limitation, sharing information, providing updates regarding assigned tasks, and conferring regarding tactics and strategy to resolve the incident. By providing a centralized interface for viewing and sharing information, interacting with various software application programs, and sending status updates to interested parties, the collaborative incident management program 2330 relieves the incident manager and members of the incident response team from many of the administrative burdens of communication and collaboration relative to prior approaches. Instead, the incident manager and incident response team are able to devote more effort and focus to resolving the incident. As a result, the incident may be resolved more efficiently and in less time relative to prior approaches. The details of the operation of the collaborative incident management program 2330 and of the particulars of an exemplary virtual incident management room are now described in further detail.

In various embodiments, the collaborative incident management program 2330 presents coordinated information and updates via a centralized graphical user interface. In some embodiments, the centralized graphical user interface includes various graphical elements that, when selected, indicates or signals a user request to effect processing to perform one or more techniques described herein. In response to receiving a selection of one or more graphical elements, the collaborative incident management program 2330 executes software instructions to perform one or more of the functions and operations set forth in the present application. The centralized graphical user interface may include four main sections: (1) an incident generation section; (2) an investigation view section; (3) a timeline view section; and (4) a status update section. These sections are now described in further detail.

As noted above, the collaborative incident management program 2330 may generate a graphical user interface for initializing and viewing various incidents. In some embodiments, the collaborative incident management program 2330 may initialize the virtual incident management room based on various attributes related to the incident, including, without limitation, a list of desired communications channels, a list of services affected by the incident, and a list of response team members.

The collaborative incident management program 2330 may receive a selection to view the graphical user interface in investigation view. In response, the collaborative incident management program 2330 may display the investigation view of the virtual incident management room. The investigation view includes various tools by which members of the incident response team may collaborate to resolve the incident. Via the investigation view, the collaborative incident management program 2330 receives data related to the incident from one or more members of the incident response team. In response to receiving the data related to the incident, the collaborative incident management program 2330 may update a data store related to the virtual incident management room based on the received data.

The members of the incident response team may interact with the virtual incident management room via a graphical user interface. Alternatively or additionally, the members of incident response team may interact with the virtual incident management room via any technically feasible human-machine interface. In particular, the members of the incident response team may perform various tasks and functions related to resolving the incident, including, without limitation, entering or modifying status, attaching screenshots, and submitting notes via the graphical user interface. The collaborative incident management program 2330 may then receive the status information, screenshots, notes, and/or other types of data and update the data store 2340 to reflect the changes to the virtual incident management room. Once the data store 2340 is updated to reflect the changes to the virtual incident management room, the members of the incident response team may view the updated information via the graphical user interface.

The collaborative incident management program 2330 may generate a graphical user interface that includes various elements including, without limitation, a visualization of the affected services, a mechanism for generating check items and assigning completion times and response team members to the check items, and one or more interactive element associated with the communications channels.

Each such interactive element may include any technically feasible mechanism for establishing communications via the associated communications channel, in various embodiments. In one example, the interactive element could include a link, whereby when a user selects the link, the collaborative incident management program 2330 could establish a communications channel for communicating with an application program. The collaborative incident management program 2330 could then update the graphical user interface to include a window corresponding to the application program. Alternatively or additionally, the interactive element could include a graphical icon, whereby, when a user selects the graphical icon, the collaborative incident management program 2330 could establish a communications channel for communicating with an application program. The collaborative incident management program 2330 could then update the graphical user interface to include a window corresponding to an application program. Alternatively or additionally, the interactive element could include any other technically feasible element that, when selected, indicates a request to effect processing to establish a communications channel to the application program and update the graphical user interface to include a window corresponding to the application program. In various embodiments, the application program may include, without limitation, a chat room application program, an online meeting application program, a software bug tracking application program, and/or an email services application program By way of the communications channel, the collaborative incident management program 2330 may receive data from the application program, where the data may include, without limitation, chat room messages, online meeting documents, software bug tracking information, and/or email messages. In general, the data from the application program is associated with the activities of various members of the incident response team as the members interact with the application program. The collaborative incident management program 2330 may display the received data in the window corresponding to the application program. Further, the collaborative incident management program 2330 may receive data entered into one or more input fields of the window and may transmit the data to the application program via the communications channel. In this manner, the incident manager and members of the incident response team may view data associated with the incident and communicate via one or more application programs from a centralized graphical user interface. Various example application programs that may be accessed via such communications channels are now described.

In some embodiments, a communications channel may exchange data with a chat room application program. Chat room application programs may include, without limitation, HipChat and Slack. In general, such a chat room application program facilitates the exchange of text messages, screenshots, and other textual and graphical information among the members of the incident response team. When one member of the incident response team posts a text message, screenshot, or other textual and graphical information via the chat room application program, all members of the incident response team may view the posted material via the centralized graphical user interface associated with the collaborative incident management program 2330.

In some embodiments, a communications channel may exchange data with an online meeting application program. Online meeting application programs may include, without limitation, WebEx and GoToMeeting. In general, such an online meeting application program facilitates the sharing of documents, reports, slide presentations, and other information among the members of the incident response team. In some embodiments, the online meeting application program may include a virtual whiteboard feature whereby members of the incident response team may contemporaneously enter textual, graphical, or other data as if writing on a physical whiteboard. When one member of the incident response team shares a document or writes on the virtual whiteboard, all members of the incident response team may view the shared document or the virtual whiteboard via the centralized graphical user interface associated with the collaborative incident management program 2330.

In some embodiments, a communications channel may exchange data with a software bug tracking application program. Software bug tracking application programs may include, without limitation, Jira and Bugzilla. In general, such a software bug tracking application program facilitates the entry, tracking, and resolution of defects related to one or more affected services related to the incident. Members of the incident response team may perform various functions related to the software bug tracking application program including, without limitation, entering a new software bug, assigning a software bug to an individual, changing the status of a software bug, and marking the software bug as resolved. In some embodiments, assigning an incident-related software bug to an individual who is not currently a member of the incident response team may automatically add the individual to the incident response team. When one member of the incident response team enters, assigns, updates, or resolves a software bug, all members of the incident response team may view the entered, assigned, updated, or resolved software bug via the centralized graphical user interface associated with the collaborative incident management program 2330.

In some embodiments, a communications channel may exchange data with an email services application program. Email services application programs include, without limitation, Outlook and Gmail. In general, such an email services application program facilitates exchange of email messages among the incident manager, members of the incident response team, and other interested parties. Email messages may be transmitted and received via the centralized graphical user interface associated with the collaborative incident management program 2330.

The collaborative incident management program 2330 may generate a graphical user interface with a timeline view that may be filtered by various criteria, including, without limitation, affected service, keyword, and check item owner. The collaborative incident management program 2330 may also provide a mechanism for automatically generating regular status update reports and transmitting email messages that may include the status update reports to specified recipients. Such status update reports may include, without limitation, the current status of the incident, the time elapsed since the incident was created, a list of the completed tasks or check items, a list of the open tasks or check items, a list of the services impacted by the incident, and notes related to the incident.

In operation, the collaborative incident management program 2330 executing on the collaborative incident management system 2210 may receive a set of parameters associated with an incident occurring in a networked computing environment. Typically, the set of parameters are entered by an incident manager via one or more graphical controls associated with the collaborative incident management program 2330. The set of parameters may include, without limitation, an incident title and description, a link to an external service ticket related to the incident, a start time associated with the incident, a priority, and a selection of one or more communications channels to employ to resolve the incident. The collaborative incident management program 2330 may establish communications with one or more application programs via the one or more communications channels, including, without limitation, a chat message application program, an online meeting application program, a software bug tracking system, and an email alias that includes one or more members of the incident response team. The set of parameters may further include, without limitation, a selection of services affected by the incident along with the names, email addresses, and titles of the members of the incident response team. In response to receiving the set of parameters, the collaborative incident management program 2330 may generate a virtual incident management room for the incident based on the set of parameters.

The collaborative incident management program 2330 may receive a selection of a communications channel via one or more graphical controls. For example, the collaborative incident management program 2330 could receive a selection of a link associated with a chat message application program or an online meeting application program. In response to receiving the selection of the communications channel, the collaborative incident management program 2330 could open the selected communications channel. In some embodiments, the collaborative incident management program 2330 may update the graphical user interface to include a window with an interface to an application program associated with the opened communications channel. For example, the collaborative incident management program 2330 could update the graphical user interface to include a chat message window where chat messages may be viewed from and posted to the chat message application program.

The collaborative incident management program 2330 may receive a selection to view the graphical user interface in timeline view. In response, the collaborative incident management program 2330 may update the graphical user interface to display the selected timeline view. The collaborative incident management program 2330 may update the graphical user interface to display only the timeline. Alternatively or additionally, the collaborative incident management program 2330 may update the graphical user interface to display the timeline along with one or more other elements, such as a screenshot, a detailed incident history, or a detailed view of one or more KPIs as measured over a range of time represented in the timeline.

The collaborative incident management program 2330 may generate a graphical user interface for scheduling status updates. The collaborative incident management program 2330 may receive a new or modified schedule update. The new or modified schedule update may specify various elements to include with the scheduled update including, without limitation, the title of the scheduled update, email addresses for one or more recipients of the scheduled update, a subject line to include with the scheduled update, and a selection of items related to the incident to include with the scheduled update. In addition, the scheduled update may include a frequency at which to send the scheduled updates to the specified recipients, such as once per hour or once every four hours. Alternatively, the scheduled update may not include a frequency, in which case the scheduled update is transmitted once. In response to receiving the new or modified schedule updates, the collaborative incident management program 2330 may transmit the scheduled updates according to the schedule specified for each scheduled update.

The collaborative incident management program 2330 may receive an indication that the incident is resolved. In response to receiving the indication that the incident is resolved, the collaborative incident management program 2330 may stop the incident timer, close the virtual incident management room associated with the incident, and mark the incident as resolved.

It will be appreciated that the systems shown and described herein are illustrative and that variations and modifications are possible. In particular, the collaborative incident management system 2210 is described as a communicating and interacting with system that implements the SPLUNK® IT SERVICE INTELLIGENCE™ IT monitoring application described herein. For example, the collaborative incident management system 2210 could communicate and interact with the service monitoring system shown and described in conjunction with FIGS. 18-21. Such a service monitoring system may monitor performance of one or more services using key performance indicators derived from machine data. Alternatively or additionally, the collaborative incident management system 2210 could communicate and interact with any technically feasible system or application program that monitors the performance of services or a suitable equivalent thereof. Such services, or their equivalents, could be monitored using key performance indicators or other suitable metrics derived from machine data. As one non-limiting example, the collaborative incident management system 2210 could communicate and interact with a system executing the SPLUNK® APP FOR ENTERPRISE SECURITY that monitors performance of one or more enterprise security related services using key performance indicators derived from machine data.

Further, the techniques disclosed herein may be deployed in a cloud-based computing or software as a service (SaaS) environment including, without limitation, SPLUNK CLOUD™ In such embodiments, application programs that are not connected to the virtual incident management room via a communications channel may transmit data directed to the virtual incident management room via an applications programming interface (API). Likewise, application programs that are not connected to the virtual incident management room via a communications channel may receive data from the virtual incident management room via the API. Via this API, the collaborative incident management program 2330 may receive data from such application programs and may incorporate the received data into the data store for the incident. Likewise, via this API, the collaborative incident management program 2330 may retrieve data from the data store for the incident and may transmit the retrieved data to such application programs.

In some embodiments, the collaborative incident management program 2330 may automatically execute certain actions upon the occurrence of certain conditions. The conditions may include, without limitation, a health score for a KPI reaching or exceeding a threshold value, the generation of a new check item, the completion of an existing check item, or the incident being marked as resolved. In some embodiments, the collaborative incident management program 2330 monitors the value of the health score of a KPI over a range of time. The collaborative incident management program 2330 identifies that the occurrence of a condition if any one or more values of the health score reach or exceed a threshold value. Upon discovery of a particular condition, the collaborative incident management program 2330 may execute any technically feasible action including, without limitation, presenting a visual or audible alert to the virtual incident management room, transmitting an email message to one or more of the incident manager and members of the incident response team, and retrieving and presenting data related to the condition. In some embodiments, the collaborative incident management program 2330 may execute the same or similar action that was taken in a previous incident upon the occurrence of the same condition. In this manner, the action executed by the collaborative incident management program 2330 may be informed by the same or similar actions taken during investigation of previous incidents.

FIGS. 24A-24D illustrate an example of a user interface that may be generated by the collaborative incident management program 2330 of FIG. 23 for initializing a virtual incident management room in accordance with the disclosed embodiments. The user interfaces illustrated in FIGS. 24A-24D may include various graphical user interface elements as now described.

Figure 24A:
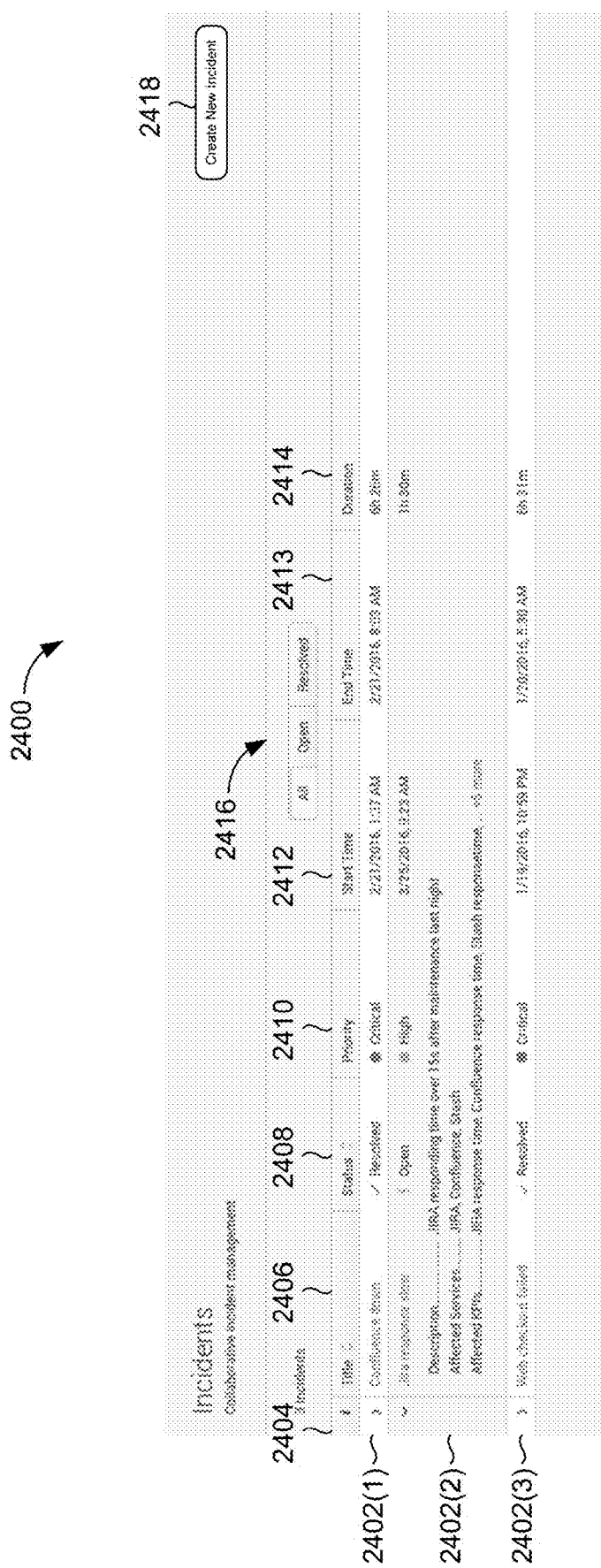

As shown in FIG. 24A, user interface 2400 indicates that there are currently three incidents 2402(1), 2402(2), and 2402(3), where each incident 2402(1), 2402(2), and 2402(3) is associated with a different virtual incident management room. An information detail column 2404 may include, without limitation, a symbol for each incident 2402(1), 2402(2), and 2402(3). Repeatedly selecting the symbol in the information detail column 2404 indicates a request to effect processing to cause the user interface 2400 to toggle between a compact view, as shown for incidents 2402(1) and 2402(3), and a detail view, as shown for incident 2402(2). The detail view for incident 2402(2) may include, without limitation, additional information, such as the description, affected services, and affected key performance indicators (KPIs) for incident 2402(2).

A title column 2406 may include, without limitation, the title of each incident 2402(1), 2402(2), and 2402(3). In some embodiments, selecting the title for an incident indicates a request to effect processing to open the virtual incident management room for that incident, whether the incident is open or resolved. A status column 2408 may include, without limitation, the status of each incident 2402(1), 2402(2), and 2402(3). As shown, the status of incidents 2402(1) and 2402(3) indicates that these incidents are resolved, while the status of incident 2402(2) indicates that this incident is open. A priority column 2410 may include, without limitation, the priority of each incident 2402(1), 2402(2), and 2402(3). In general, each incident has a status of open or resolved. As shown, the priority of incidents 2402(1) and 2402(3) indicate that these incidents are critical, while the priority of incident 2402(2) indicates that this incident is has high priority. In general, each incident has a priority of low, medium, high, or critical, in order of lowest priority to highest priority.

A start time column 2412 and an end time column 2413 may include, without limitation, the start time and end time for each incident 2402(1), 2402(2), and 2402(3). Because incidents 2402(1) and 2402(3) are resolved, these incidents may include, without limitation, both a start time and an end time. Because incident 2402(2) is open, this incident includes only a start time. A duration column 2414 may include, without limitation, the duration for each incident 2402(1), 2402(2), and 2402(3). Because incidents 2402(1) and 2402(3) are resolved, the duration for each of these incidents is the difference between the respective end time and start time. Because incident 2402(2) is open, the duration for this incident is the difference between the current time and the start time.

A filter selector 2416, when selected, indicates a request to effect processing to display all incidents, only incidents that are open, or only incidents that are resolved. A create button 2418, when selected, indicates a request to effect processing to generate and open a new incident, in some embodiments. In some embodiments, selecting the create button 2418 indicates a request to effect processing to cause the display of user interface 2420, as now described.

Figure 24B:
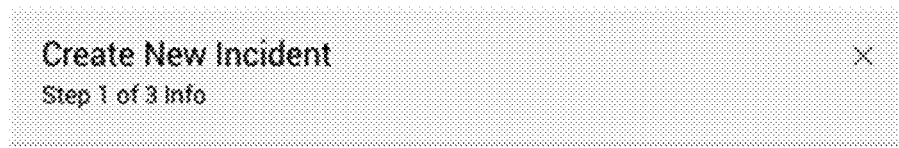

As shown in FIG. 24B, user interface 2420 is the first of three dialog boxes for creating a new incident. When creating a new incident, a link to an external customer service ticket is entered into a ticket link field 2422. In some embodiments, the link may be a universal resource locator (URL) that points to a location where the external customer service ticket may be accessed. A short title and description is entered into a title field 2424 and a description field 2426, respectively. A start time field 2428 is automatically populated with the current time, although the value start time field 2428 may be manually edited.

A priority selector 2430 provides a mechanism for selecting a priority for the new incident. The possible priority values are low, medium, high, or critical, in order of lowest priority to highest priority. A channel selector 2432 provides a mechanism for selecting the desired communications channels for virtual incident management room associated with the new incident. As shown, a HipChat chat room, a WebEx online meeting, and an email alias are selected for the virtual incident management room associated with the new incident. When selected, cancel button 2434 indicates a request to effect processing to cancel the creation of the new incident and return to user interface 2400, in some embodiments. When selected, next button 2436 causes the display of user interface 2440, as now described.

Figure 24C:

As shown in FIG. 24C, user interface 2440 is the second of three dialog boxes for creating a new incident. A navigation bar 2442 includes a field for typing in and searching for a service name. Further, the navigation bar 2442 provides a mechanism to invoke processing for navigating among multiple lists of service names. A selection column 2444 provides a mechanism for selecting or deselecting certain services for inclusion in the virtual incident management room associated with the new incident. A service name column 2446 may display the name of each display service. A latest status column 2448 identifies the current status of each service as informational, low, medium, high, or critical. A health score graph column 2450 may display a graph of the health score for the corresponding service name. Similarly, a health score column 2452 may display the current value of the health score for the corresponding service name. In operation, the collaborative incident management program 2330 receives transmits a search query at different times within a range of time. The collaborative incident management program 2330 receives different values for a KPI or other measure of an affected service over the range of time. The collaborative incident management program 2330 generates latest status column 2448, health score graph column 2450, and health score column 2452 based on the values of the KPI or other measure.

When selected, cancel button 2454 indicates a request to effect processing to cancel the creation of the new incident and return to user interface 2400, in some embodiments. User interaction with back button 2456 may invoke processing to cause the display of user interface 2440. When selected, next button 2458 causes the display of user interface 2460, as now described.

As shown in FIG. 24D, user interface 2460 is the third of three dialog boxes for creating a new incident. An email entry field 2462 provides a mechanism for entering an email address of a person to add to the incident response team. When selected, an add button 2464 indicates a request to effect processing to add the email address entered in the email entry field 2462 to the incident response team. An information column 2466 may include, without limitation, a graphic with the initials of each person added to the incident response team along with the name and email address of each person. A title column 2468 may include, without limitation, the job title of each person. A delete column 2472 provides a mechanism for individually deleting each person, other than the incident manager, from the incident response team.

When selected, cancel button 2472 indicates a request to effect processing to cancel the creation of the new incident and return to user interface 2400, in some embodiments. User interaction with back button 2474 may invoke processing to cause the display of user interface 2440. When selected, next button 2476 indicates a request to effect processing to dismiss user interface 2460 and create a virtual incident management room for the new incident, in some embodiments. The virtual incident management room may be presented via three main graphical user interface or GUIs: an investigation view GUI, a timeline view GUI, and a status update GUI. These three main GUIs are now described.

FIGS. 25A-25K illustrate an example of a user interface that may be generated by the collaborative incident management program 2330 of FIG. 23 for investigating a virtual incident management room in accordance with the disclosed embodiments. The user interfaces illustrated in FIGS. 25A-25K may include various graphical user interface elements as now described.

Figure 25A:
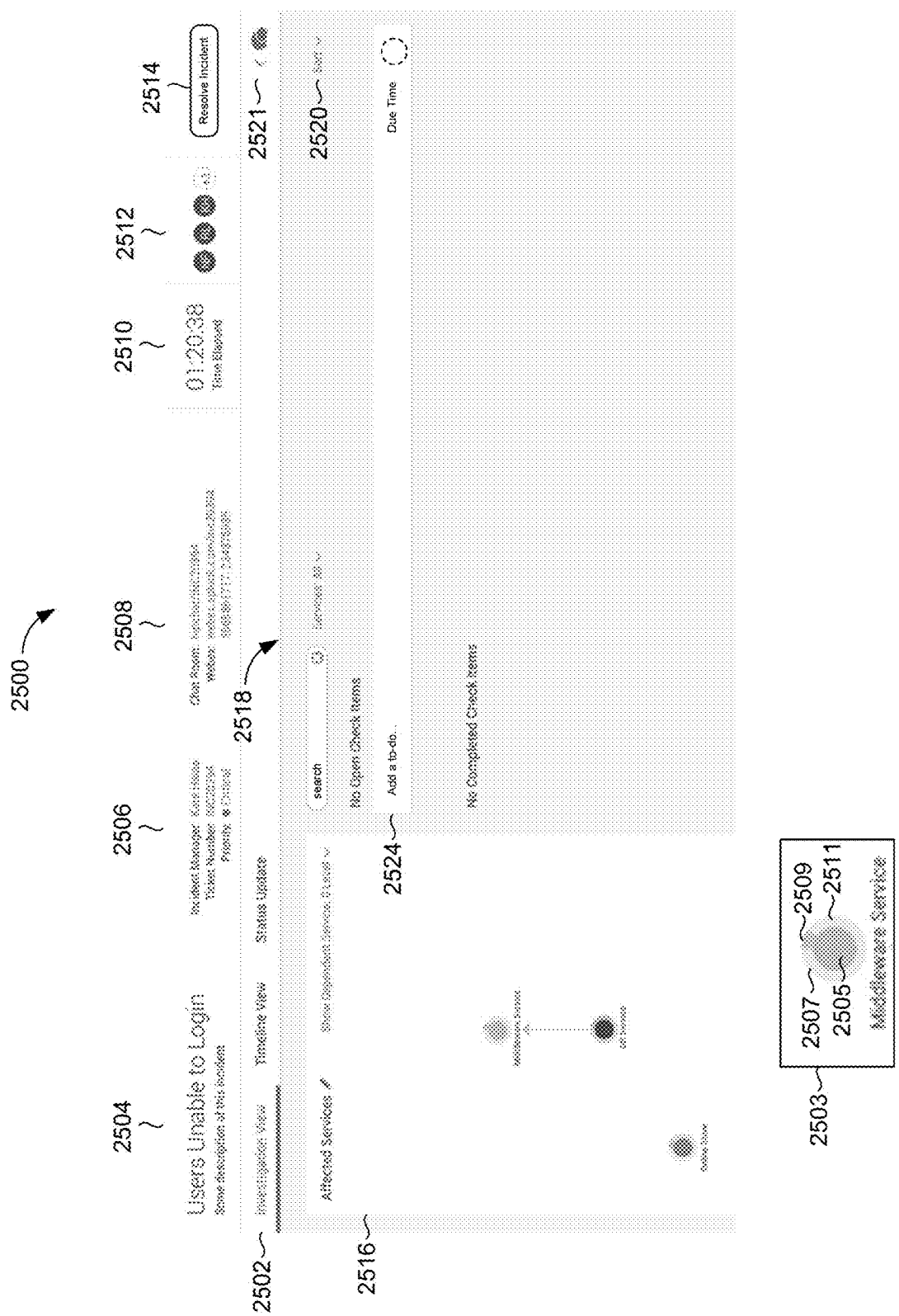

As shown in FIG. 25A, a user interface 2500 may include, without limitation, a navigation bar 2502 that indicates that an investigation view is selected. A title region 2504 may include, without limitation, the title and description of the incident, as entered in the title field 2424 and the description field 2426, respectively, of user interface 2420 when the incident was initialized. A summary region 2506 may include, without limitation, the name of the incident manager who created the incident. The summary region 2506 may further include, without limitation, the ticket number and the priority of the incident as entered in the ticket link field 2422 and the priority selector 2430, respectively, of user interface 2420 when the incident was initialized. A communications channels region 2508 may include, without limitation, one or more interactive elements associated with application programs that may be accessible via the communications channels selected via the channel selector 2432 of user interface 2420 when the incident was initialized. Selecting an interactive element in the communications channels region 2508 indicates a request to effect processing to access the associated communications channel, in some embodiments.

Each such interactive element may include any technically feasible mechanism for establishing communications via the associated communications channel, in various embodiments. In one example, the interactive element could include a link, whereby when a user selects the link, the collaborative incident management program 2330 could establish a communications channel to an application program and could update the graphical user interface to include a window corresponding to the application program. Alternatively or additionally, the interactive element could include a graphical icon, whereby when a user selects the graphical icon, the collaborative incident management program 2330 could establish a communications channel to an application program and could update the graphical user interface to include a window corresponding to the application program. Alternatively or additionally, the interactive element could include any other technically feasible element that, when selected, indicates a request to effect processing to establish a communications channel to an application program and update the graphical user interface to include a window corresponding to the application program.

A time elapsed region 2510 indicates the amount of time between the current time and the start time as entered in the start time field 2428 of user interface 2420 when the incident was initialized. The user interface 2500 may include, without limitation, a resolve incident button 2514. When selected, the resolve incident button 2514 indicates a request to effect processing to close the virtual incident management room associated with the incident and set the status of the incident to "resolved," in some embodiments.

The user interface 2500 may include, without limitation, a visualization 2516 of the affected services selected via user interface 2440 when the incident was initialized. As shown, the visualization 2516 may include, without limitation, a node graph illustrating interdependencies among the affected services. The DB service depends on the middleware service, while the online store service does not have a direct interdependency with either the DB service or the middleware service. In operation, the collaborative incident management program 2330 receives information regarding dependences among the affected services. The collaborative incident management program 2330 then generates the visualization 2516 that indicates the interdependencies among the affected services.

Inset 2503 provides further detail regarding the middleware services node in visualization 2516. In operation, the collaborative incident management program 2330 receives status information for various KPIs related to the affected services. The collaborative incident management program 2330 then generates visualizations for each of the affected services as shown in inset 2503. As shown, inset 2503 includes a central region 2505 and an outer region that is divided into three outer region portions 2507, 2509, and 2511. The color of the central region 2505 represents the status of the middleware service. For example, if the status of the middleware service is medium, then the color of the central region 2505 would indicate that the status of the middleware service is medium. The three outer region portions 2507, 2509, and 2511 represent the statuses of various KPIs associated with the middleware service. For example, outer region portion 2507 could represent six KPIs at a first status level as indicated by the color of outer region portion 2507. Similarly, outer region portion 2509 could represent one KPI at a second status level as indicated by the color of outer region portion 2509. Outer region portion 2511 could further represent three KPIs at a third status level as indicated by the color of outer region portion 2511. The arc length of the three outer region portions 2507, 2509, and 2511 are in proportion to the number of KPIs that are at the corresponding status. Therefore, outer region portion 2507, representing six KPIs, would surround 60% of the central region 2505. Outer region portion 2509, representing one KPI, would surround 10% of the central region 2505. Outer region portion 2511, representing three KPIs, would surround 30% of the central region 2505.

Although the visualization 2516 is shown as a node graph, the visualization 2516 may be displayed via any technically feasible technique, including, without limitation, a linked list view, a hierarchical tree view, and a tile view where each tile may display information related to a particular key performance indicator (KPI).

A search and filter selector 2518 provides a mechanism for entering a title, portion of a title, affected service, tag, or other text string. In response, the check items associated with the incident are searched and only those check items that contain the title, portion of a title, affected service, tag, or other text string are displayed. The search and filter selector 2518 further provides a mechanism for selecting predetermined filters, where only those check items that meet the filter criteria are displayed. A sort selector 2520 provides a mechanism for sorting the list of check items according to any technically feasible criteria, including, without limitation, due time, affected service, and incident team member to which the check item is assigned.

The user interface 2500 may include one or more graphical icons to access application programs via certain communications channels. As shown, the user interface 2500 may include a chat icon 2521. Selecting the chat icon 2521, in some embodiments, indicates a request to effect processing to open a chat window (not shown in FIG. 25A) that may include a chat stream associated with the incident. The chat window may be opened or closed by selecting the chat icon 2521, in some embodiments. In various embodiments, the chat window may include, without limitation, various text messages, screenshots, and other information entered into the chat window by members of the incident response team.

The user interface 2500 may include an open check item region 2522 that may display a list of check items, also referred to herein as tasks, that are currently open. As shown, the open check item region 2522 does not currently include any open check items. A new check item entry field 2524 provides a mechanism for adding check items, as now described.

Figure 25B:
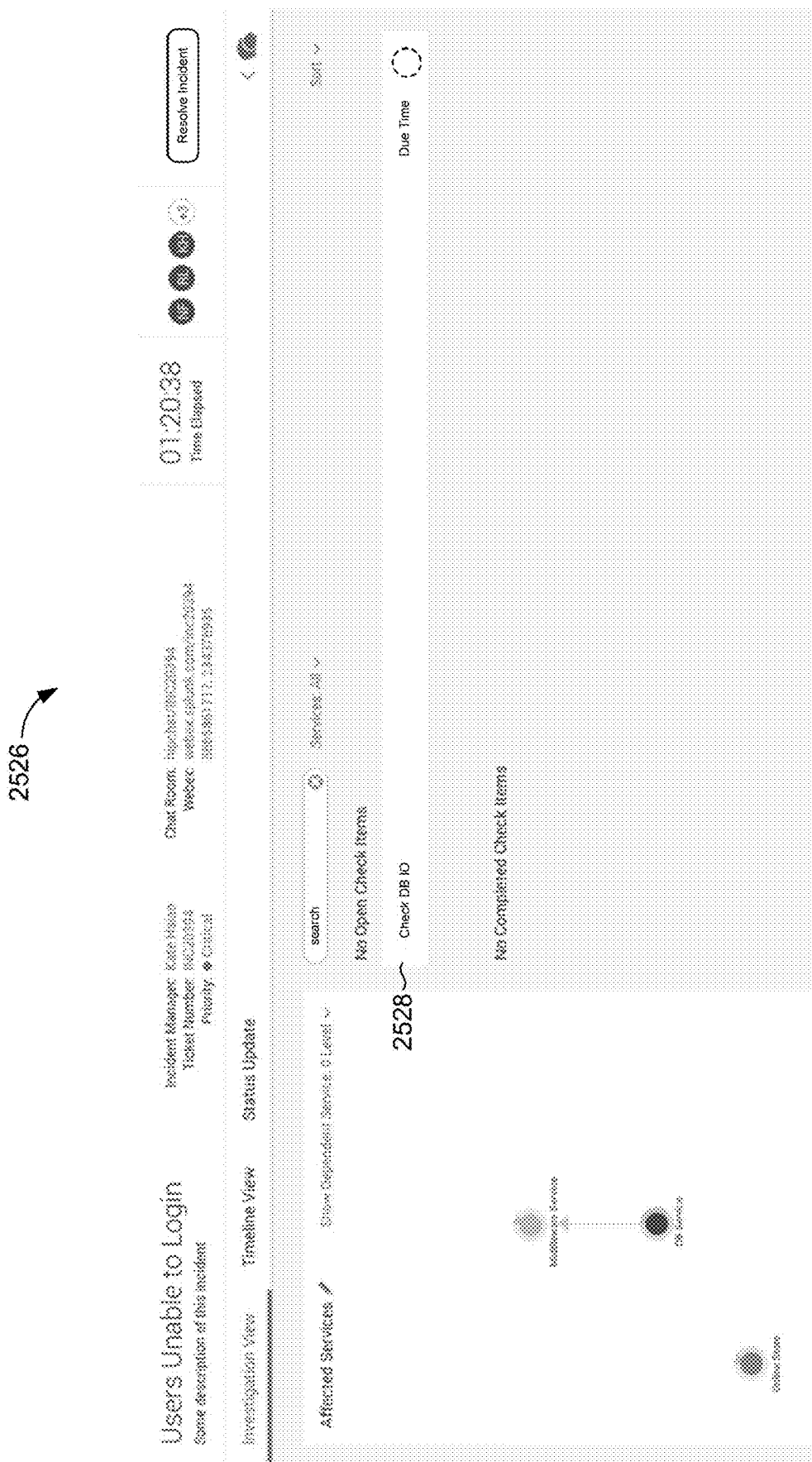
Figure 25C:
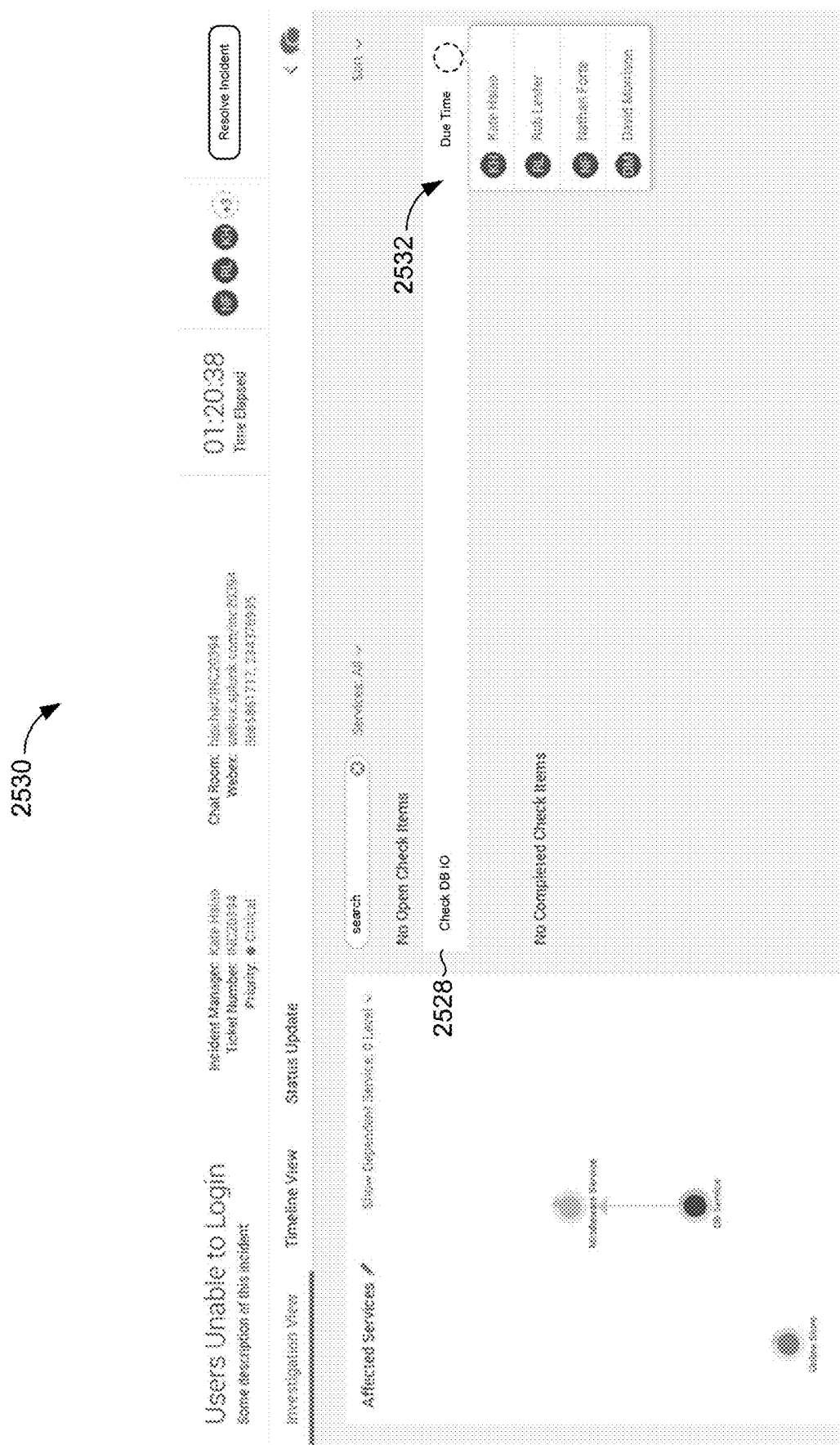
Figure 25D:
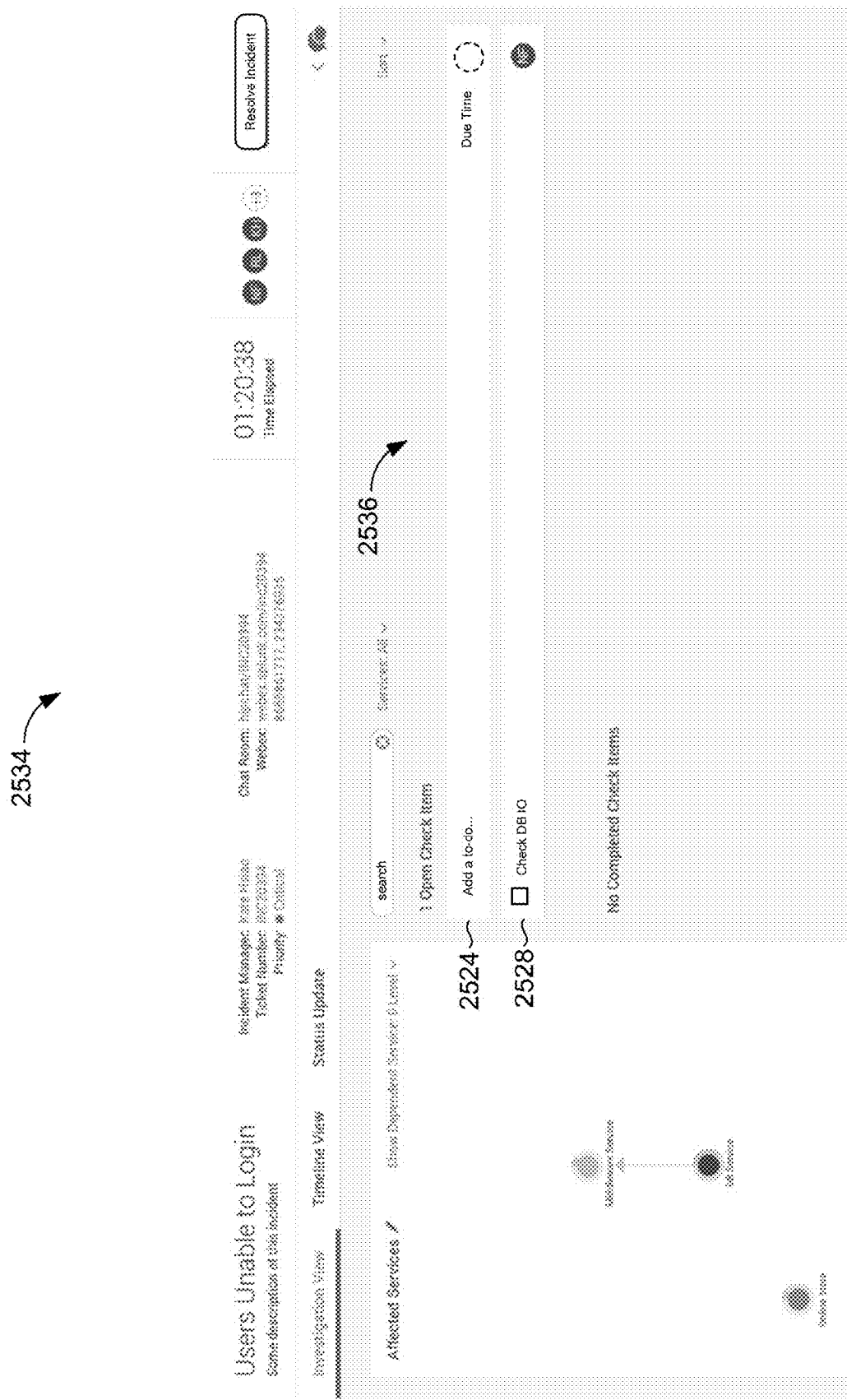

As shown in FIG. 25B, user interface 2526 may include a new check item 2528, in some embodiments. The new check item 2528 may include the title "Check DB IO," as entered by the incident manager. As shown in FIG. 25C, user interface 2530, may include an assignment drop-down list 2532 for the new check item 2528. The assignment drop-down list 2532 may be accessed by selecting the right hand area of the new check item 2528, in some embodiments. As shown in FIG. 25D, user interface 2534 may include a new check item region 2536 that includes the new check item 2528. The new check item region 2536 may include a new check item entry field 2524 that, when selected, indicates a request to effect processing to add additional check items. In some embodiments, selecting an open check item, such as check item 2528, indicates a request to effect processing to open user interface 2538, as now described.

Figure 25E:
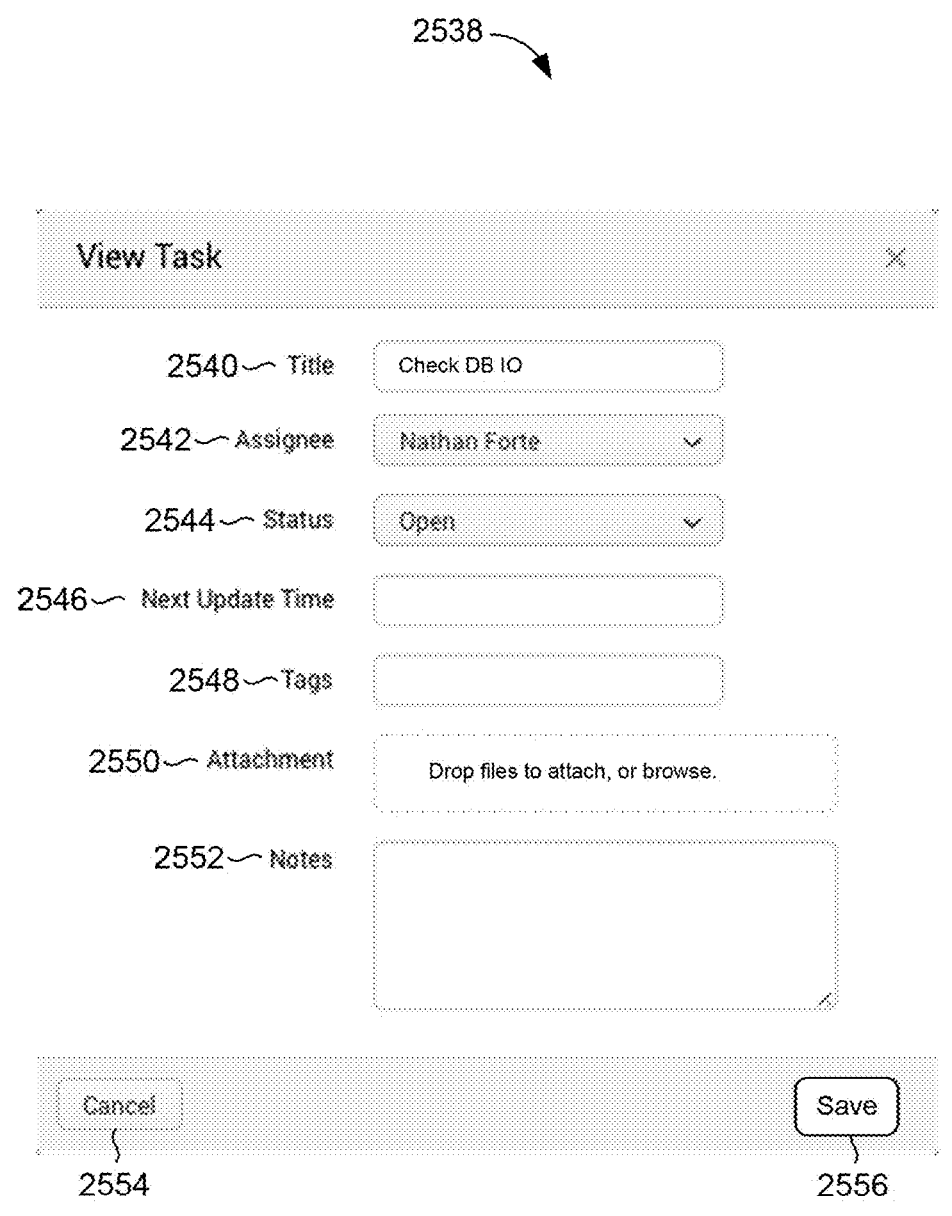

As shown in FIG. 25E, user interface 2538 provides a mechanism for entering or modifying details regarding the corresponding check item 2528. The title of the check item 2528 may be entered or modified via title field 2540 provides a mechanism for entering or modifying the title of the check item 2528. The name of the person responsible for completing the check item 252 may be entered or modified via an assignee field 2540 provides a mechanism for of the person responsible for completing the check item 2528. A status field 2544 provides a mechanism for entering or modifying the current status of the check item 2528. In general, the status of a check item 2528 is either open or closed. The time by when the assignee is to provide a status update related to the check item 2528 may be specified via a next update time field 2546. A tags field 2548 provides a mechanism for adding one or more textual tags to the check item 2528. The tags entered in the tags field 2548 allow the check items to be filtered or sorted based on the tags entered in the respective check items. One or more files, screenshots, or other relevant data to the check item 2528 may be attached via an attachment field 2550. Descriptive comments, status updates, and other information may be added to the check item 2528a notes field 2552. In some embodiments, user interface 2538 may include a service field (not shown in FIG. 23E) that provides a mechanism for adding one or more affected service names to the check item 2528. The service names entered in the service field allow the check items to be filtered or sorted based on the service names entered in the respective check items. Alternatively or additionally, the names of the one or more services may be entered into the tags field 2548 allowing for sorting according to service based on the service names entered into the tags field 2548.

When selected, cancel button 2554 indicates a request to effect processing to discard any entries and modifications made and close user interface 2538, in some embodiments. When selected, save button 2556 may engage processing that saves any entries and modifications made and closes user interface 2538.

Figure 25F:
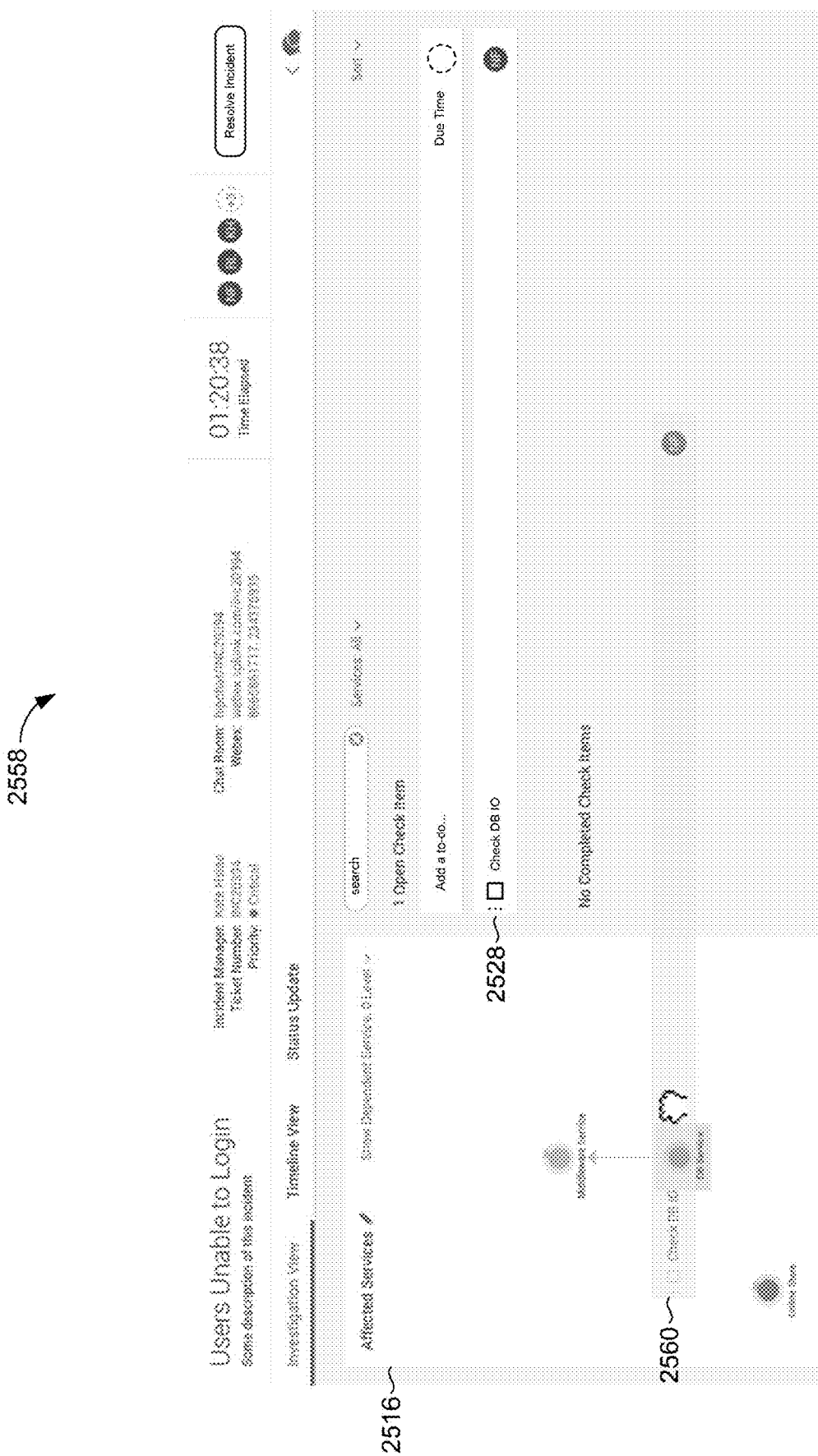
Figure 25G:
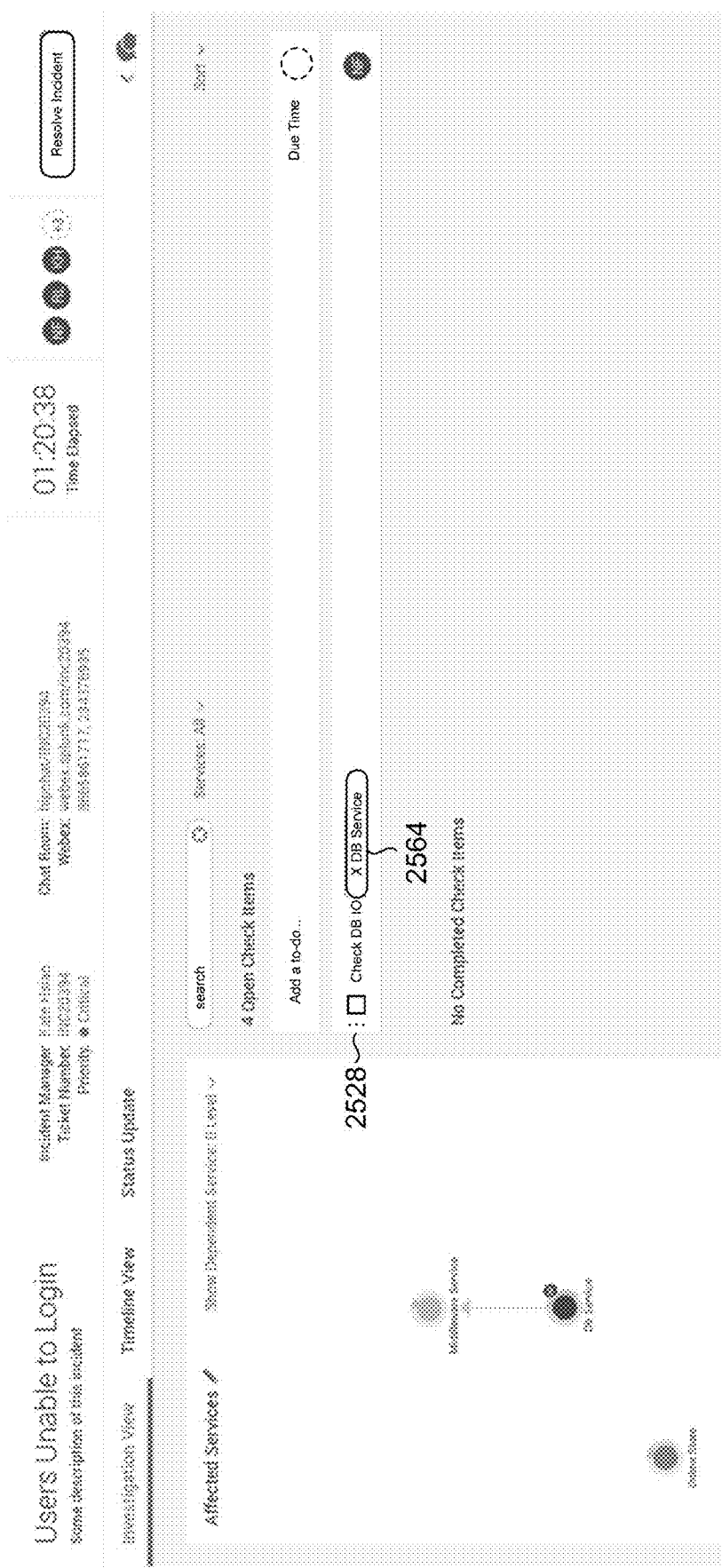

As shown in FIG. 25F, user interface 2558 illustrates that check item 2528 can be associated with an affected service by a drag-and-drop action, whereby the check item 2528 is dragged to position 2560 such that part of the check item 2528 overlaps with an affected service illustrated in visualization 2516. As shown, the check item 2528 is dragged to position 2560 to overlap with the affected service identified as "DB service" in visualization 2516. The check item 2528 is then dropped onto DB service, thereby associating DB service with the check item 2528. As shown in FIG. 25G, user interface 2562 illustrates that check item 2528 is now associated with DB service, as indicated by the affected service section 2564 of the check item 2528.

Figure 25H:
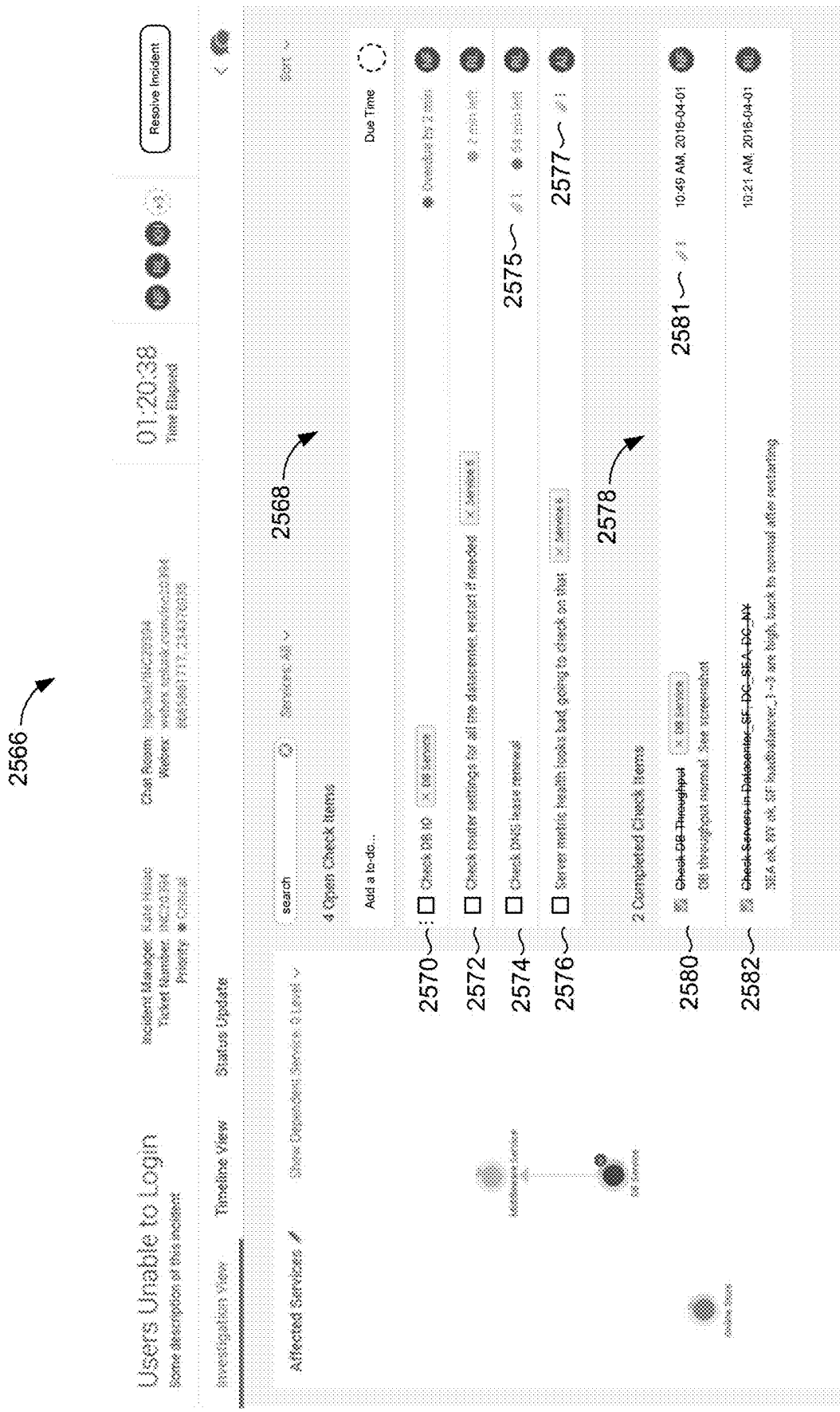

As shown in FIG. 25H, user interface 2566 may include an open check items region 2568 that illustrates four open check items. Check item 2570 is associated with service "DB service," and a status update for check item 2570 is now overdue by two minutes. Check item 2572 is associated with service "Service 6," and a status update for check item 2572 is due in two minutes. Check item 2574 is not currently associated with any service, and a status update for check item 2574 is due in 54 minutes. Check item 2576 is associated with service "Service 6," and no status update is scheduled for check item 2576. As also shown, each of check items 2574 and 2576 includes one attachment, such as a file or screenshot, as indicated by icons 2575 and 2577, respectively. In various embodiments, any number of files, screenshots, or other data elements may be attached to a check item.

User interface 2566 may further include a closed check items region 2578 that illustrates two closed check items. Check item 2570 is associated with service "DB service." Check item 2570 may include the time that check item 2570 was closed as well as the notes entered for check item 2570 via user interface 2538. As shown, check item 2572 is not associated with any service. Check item 2572 may include the time that check item 2572 was closed as well as the notes entered for check item 2572 via user interface 2538. As also shown, check item 2580 may include one attached file, as indicated by icon 2581.

Figure 25I:
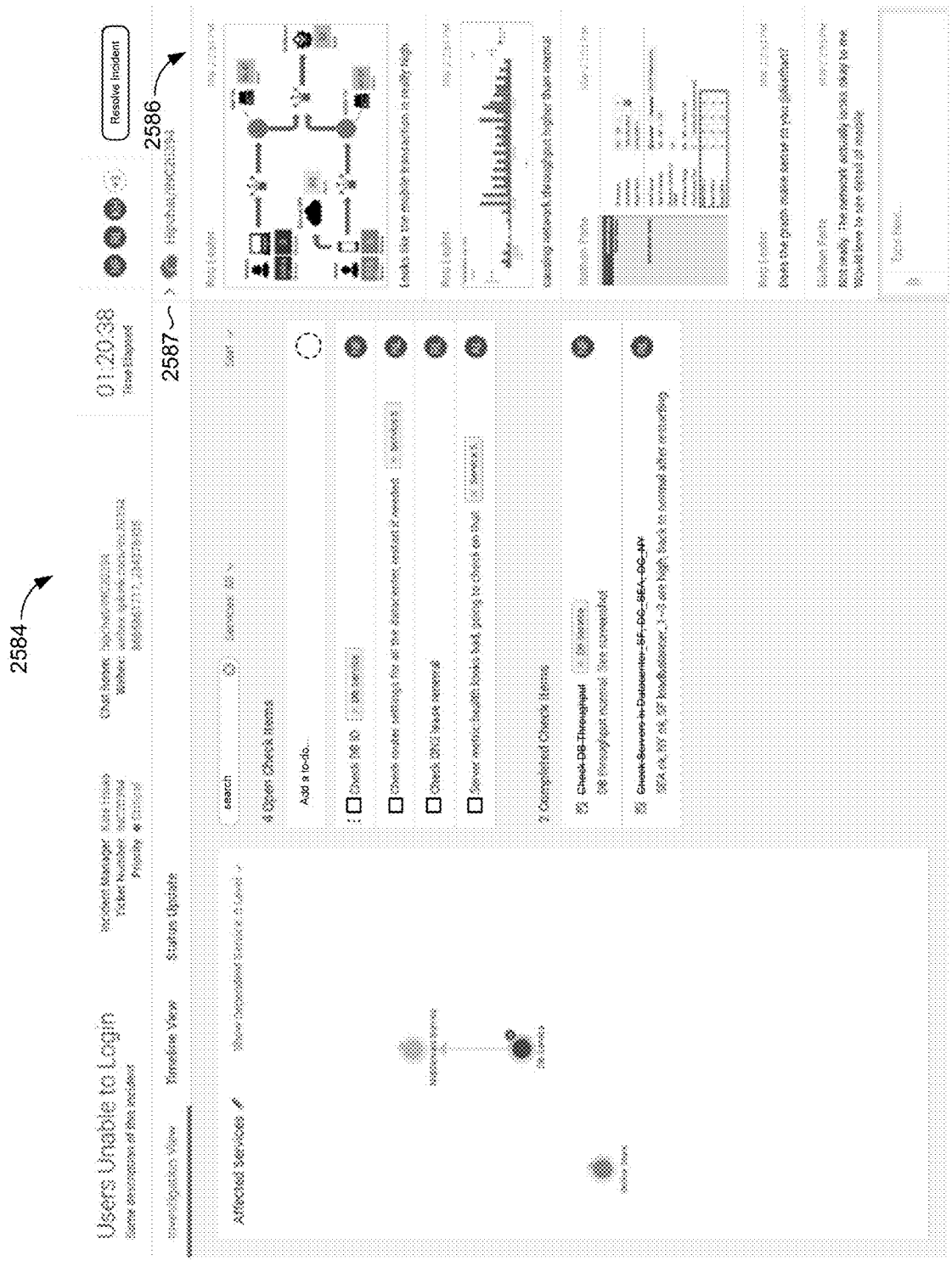

As shown in FIG. 25I, user interface 2584 may include a chat window 2586 that displays a chat stream associated with the incident. The chat window 2586 may be opened or closed by selecting the chat icon 2521, in some embodiments. The chat window may include various text messages, screenshots, and other information entered into the chat window 2586 by members of the incident response team.

Figure 25J:
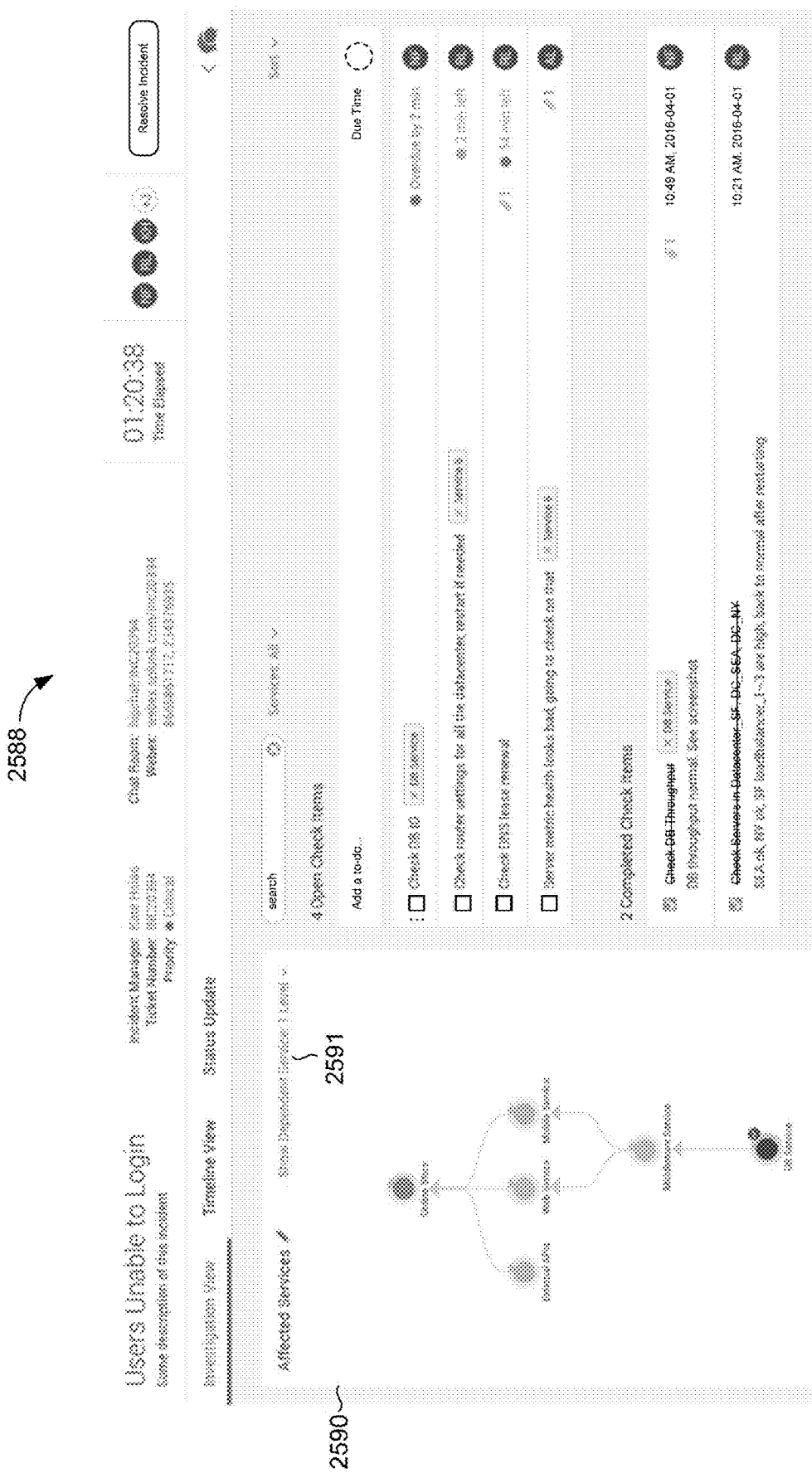

As shown in FIG. 25J, user interface 2588 may include a visualization 2590 that is more detailed than visualization 2516 shown in user interface 2500, in some embodiments. Visualization 2590 may be accessed by activating level selector 2591 and selecting a new level for visualization 2590, in some embodiments. In particular, visualization 2590 of user interface 2588 corresponds to visualization level 1, while visualization 2516 of user interface 2500 corresponds to visualization level 1.

Figure 25K:
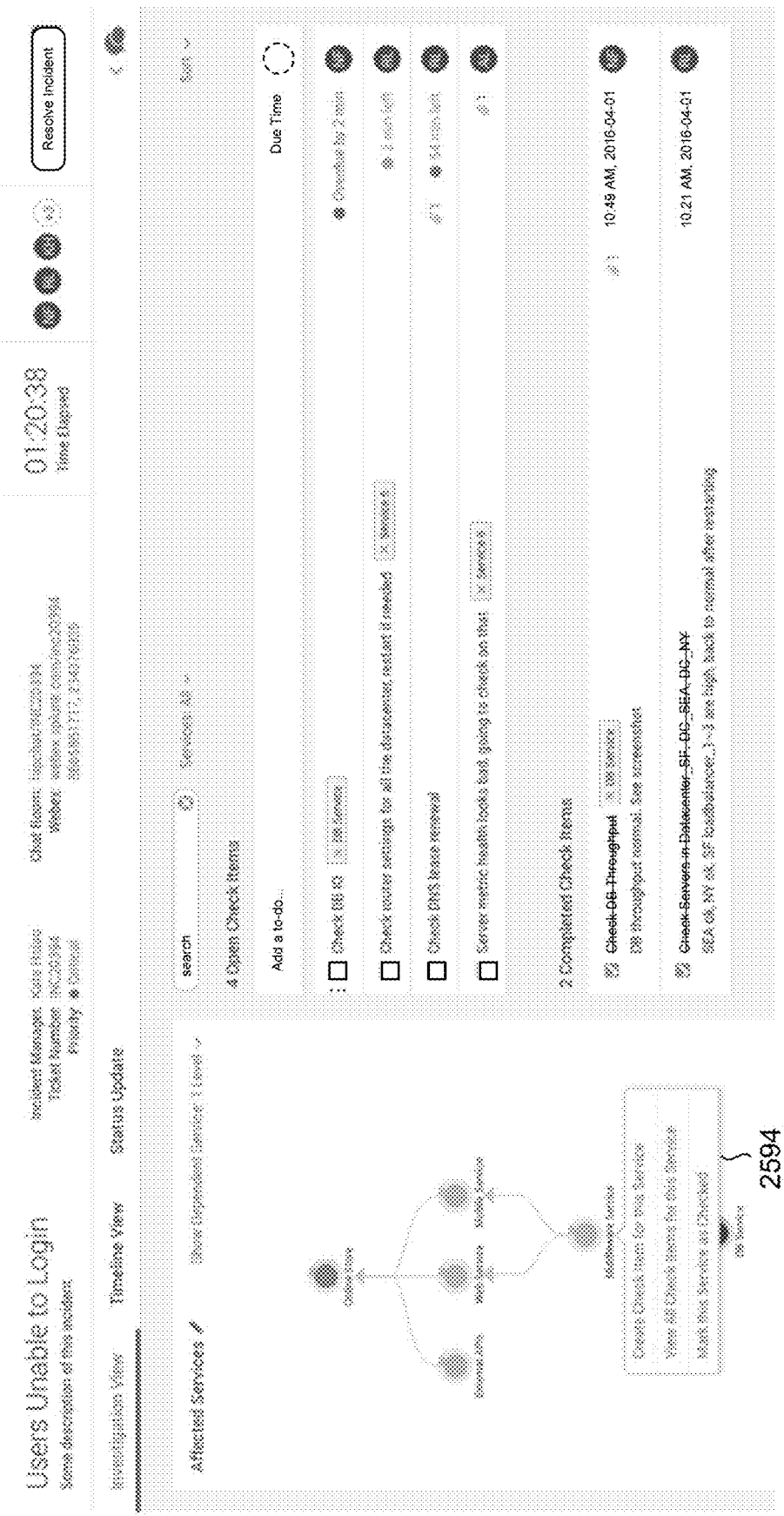

As shown in FIG. 25K, a pop-up menu 2594 is illustrated when any node in visualization 2590 is selected. The pop-up menu 2594 provides three options associated with the selected node. The first option is to create a check item for the service associated with the selected node. When this first option is selected, the health score column 2452 generates a new check item that appears in the open check item region, where the new check item is already associated with the associated service. The second option is to view all check items for the service associated with the selected node. When this second option is selected, the health score column 2452 filters the open check item region and the closed check item region to show only check items for the service associated with the selected node. The third option is to mark the service associated with the selected node as checked. When this third option is selected, the health score column 2452 sets or marks the status of all open check items for the service associated with the selected node to "closed" or "completed."

FIGS. 26A-26E illustrate an example of a user interface that may be generated by the collaborative incident management program 2330 of FIG. 23 for viewing timelines associated with a virtual incident management room in accordance with the disclosed embodiments. The user interfaces illustrated in FIGS. 26A-26E may include various graphical user interface elements as now described.

Figure 26A:
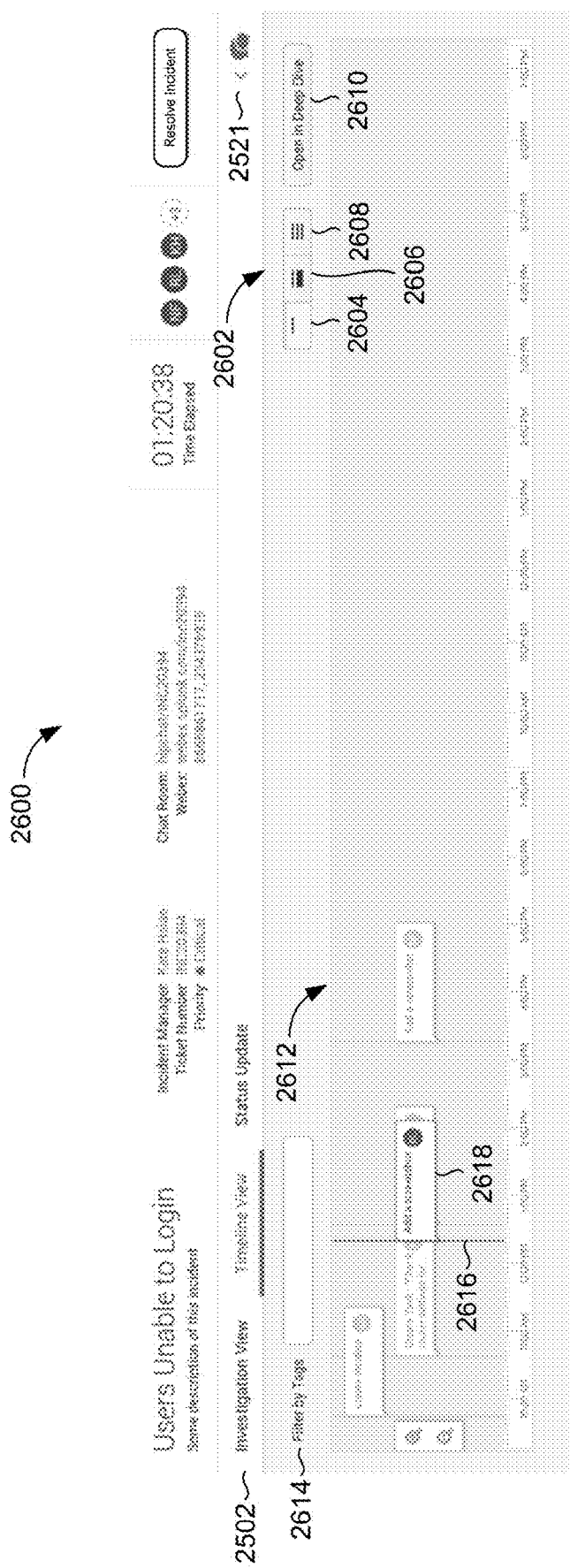
FIGS. 26A-26E illustrate an example of a user interface that may be generated by the collaborative incident management program of FIG. 23 for viewing timelines associated with a virtual incident management room in accordance with the disclosed embodiments.

As shown in FIG. 26A, a user interface 2600 may include a navigation bar 2502 that indicates that a timeline view is selected. The user interface 2600 may include a chat icon 2521. In some embodiments, selecting the chat icon 2521 indicates a request to effect processing to open a chat window (not shown in FIG. 26A) that may include a chat stream associated with the incident. The chat window may be opened or closed by selecting the chat icon 2521, in some embodiments. The chat window may include various text messages, screenshots, and other information entered into the chat window by members of the incident response team.

In some embodiments, user interface 2600 may include a view selector 2602 for selecting the level of detail displayed in the timeline view. When selected, a timeline only selector 2604 indicates a request to effect processing to display only the timeline 2612, in some embodiments. When selected, a timeline plus screenshot view selector 2606 indicates a request to effect processing to display the timeline 2612 plus a selected screenshot, such as a screenshot posted to the chat window at the time represented by the current time cursor 2616, in some embodiments. When selected, a timeline plus detail view selector 2608 indicates a request to effect processing to display the timeline 2612 plus the complete detailed history of the timeline, in some embodiments. In some embodiments, a deep dive button 2610, when selected, indicates a request to effect processing to display the timeline 2612 and a graph of key performance indicators over a period of time, as further described in section 2.15.

Figure 26B:
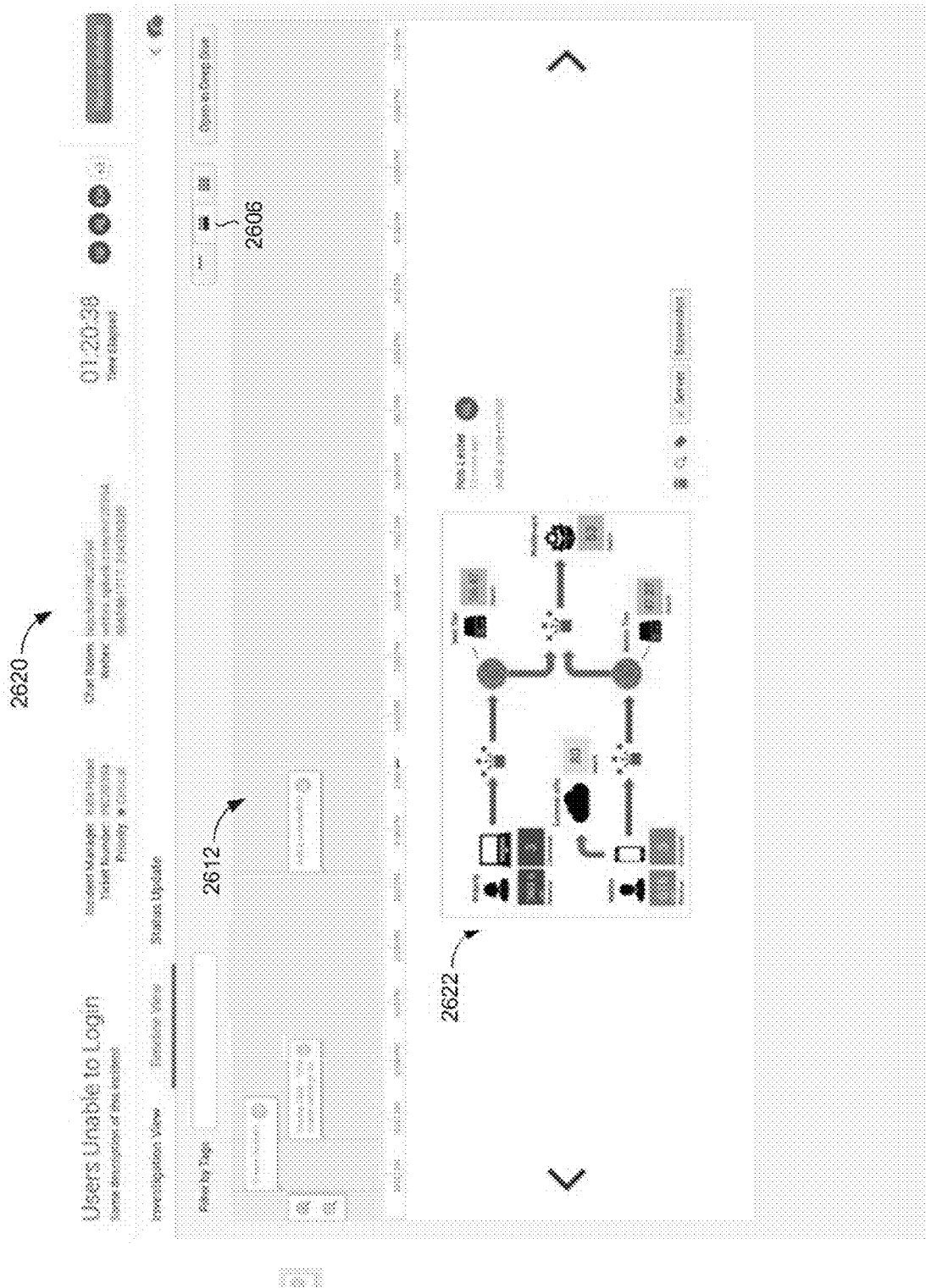
Figure 26C:
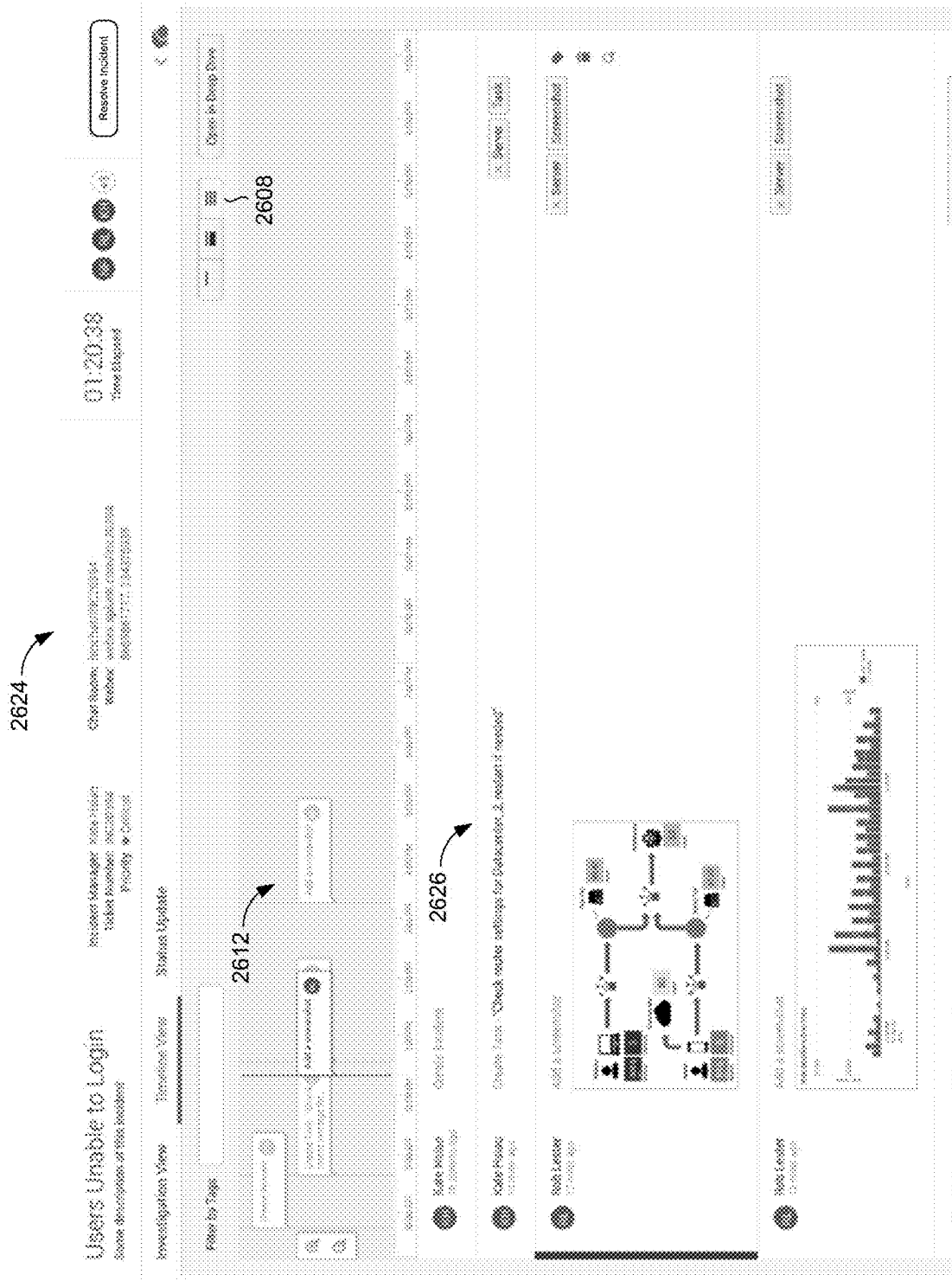

The timeline 2612 may display key events associated with the incident over a period of time. The collaborative incident management program 2330 filters the data associated with the timeline 2612 based on filter criteria entered into a filter field 2614. The collaborative incident management program 2330 may filter the data associated with the timeline 2612 according to any technically feasible criteria, including, without limitation, tags, affected services, and assignee. In response to entering filter criteria into the filter field 2614, the collaborative incident management program 2330 modifies timeline 2612 to display only those items that meet the filter criteria. The timeline 2612 may include a current time cursor 2616 which may be moved to the left or right to select a time of interest. Snapshot entry points, such as entry point 2618, provide a mechanism attaching a snapshot or other item of interest into the timeline 2612 at the point indicated by the current time cursor 2616. As shown in FIG. 26B, a user interface 2620 indicates that the timeline plus screenshot view selector 2606 is selected. In response, the collaborative incident management program 2330 may update user interface 2620 to display the timeline 2612 plus a selected screenshot 2622, such as a screenshot posted to the chat window at the time represented by the current time cursor 2616. As shown in FIG. 26C, the user interface 2624 indicates that the timeline plus detail view selector 2608 is selected. In response, the collaborative incident management program 2330 may update user interface 2624 to display the timeline 2612 plus the complete detailed history of the timeline.

Figure 26D:
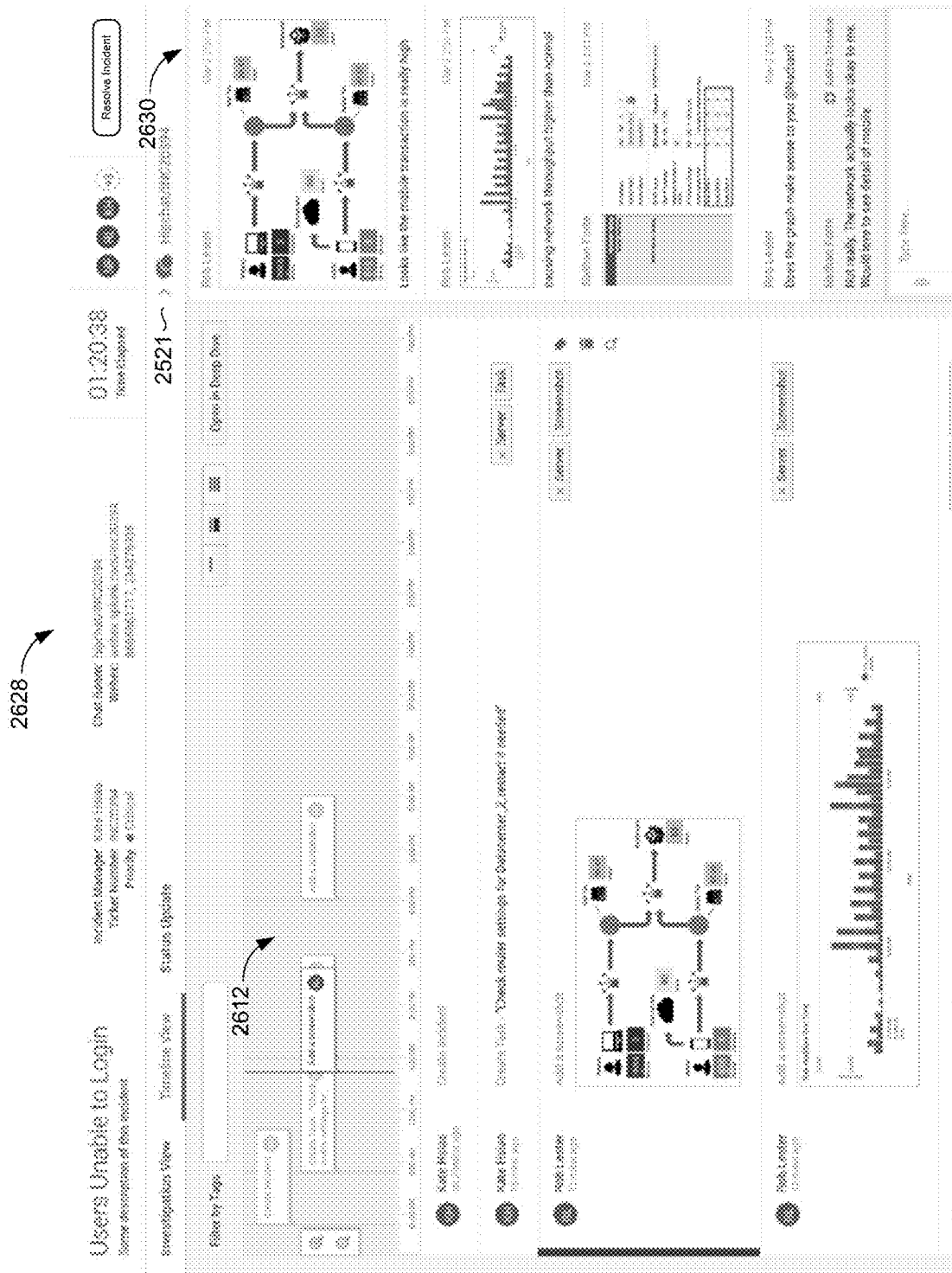

As further discussed herein, any user interface in the timeline view may be toggled between displaying the chat window and not displaying the chat window by selecting the chat icon 2521, in some embodiments. As shown in FIG. 26D, user interface 2628 may include a chat window 2630 that may include a chat stream associated with the incident. The chat window 2639 may be opened or closed by selecting the chat icon 2521, in some embodiments. The chat window may include various text messages, screenshots, and other information entered into the chat window 2630 by members of the incident response team.

Figure 26E:
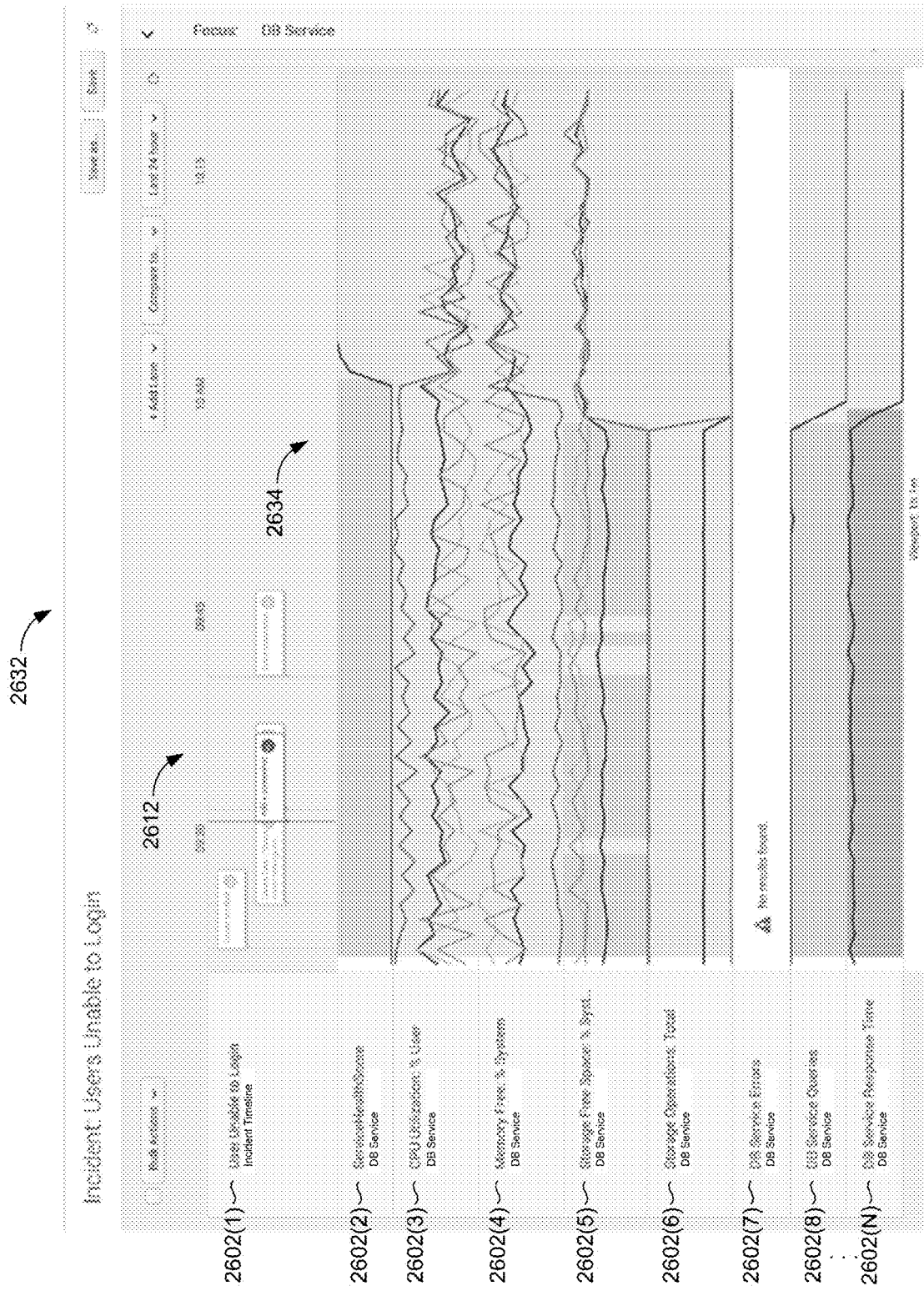

As shown in FIG. 26E, a user interface 2632 may be displayed in response to selecting the deep dive button 2610 illustrated in user interface 2600, in some embodiments. The user interface 2632 may include a display of the timeline 2612 and a graph 2634 of key performance indicators 2636(1), 2636(2), 2636(1), 2636(4), 2636(5), 2636(6), 2636(7), 2636(8), . . . 2636(N) over a period of time, as further described in section 2.15. To construct the timeline, the collaborative incident management program 2330 transmits a search query at different times within a range of time. The collaborative incident management program 2330 receives different values for a KPI or other measure of an affected service over the range of time. The collaborative incident management program 2330 generates a visualization based on the values of the KPI or other measure. Correspondingly, user interface 2632 provides a visualization showing detailed time-series information for multiple KPI's in parallel graph lanes. The length of each lane corresponds to the range of time displayed in timeline 2612, while the width of each lane may be automatically adjusted to fit the displayed KPI data. Data within each lane may be displayed in a user selectable style, such as a line, area, or bar chart.

Figure 27A:
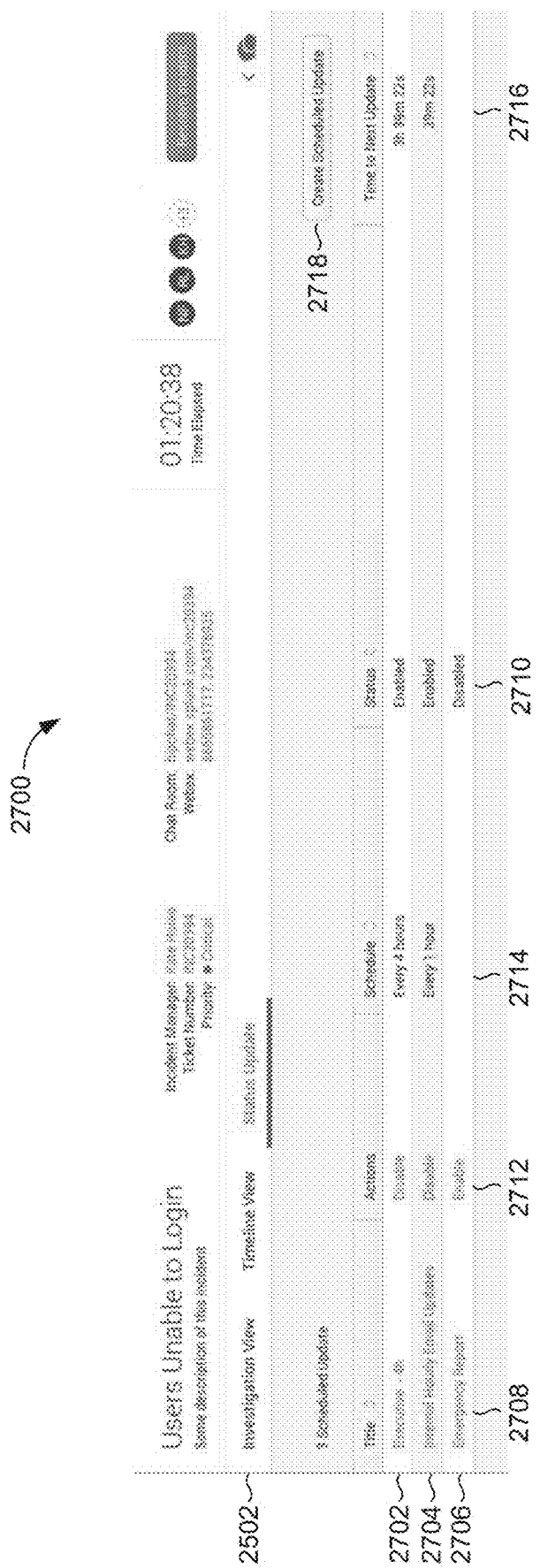
Figure 27B:
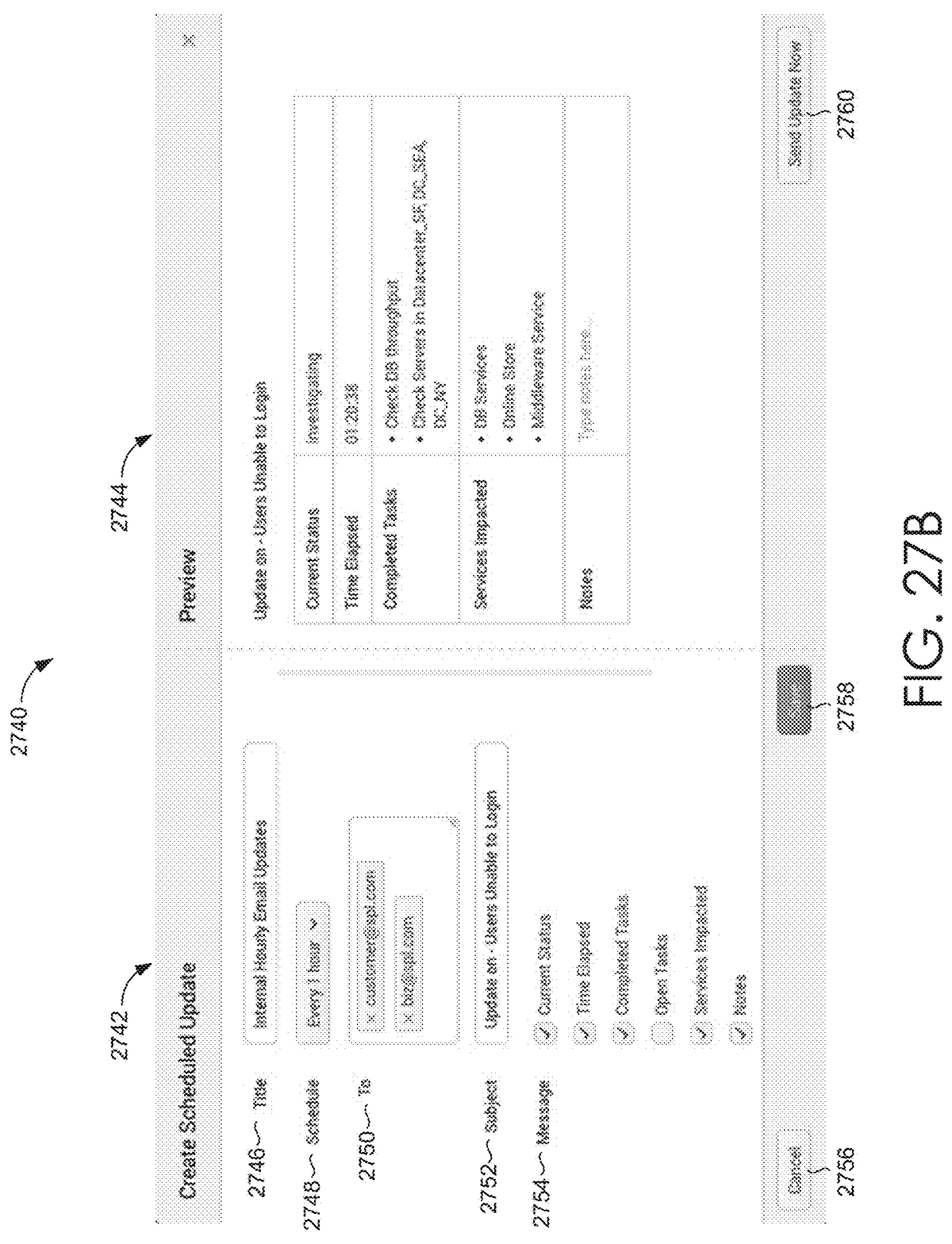

FIGS. 27A-27B illustrate an example of a user interface that may be generated by the collaborative incident management program 2330 of FIG. 23 for generating status updates associated with a virtual incident management room in accordance with the disclosed embodiments. The user interfaces illustrated in FIGS. 27A-27B may include various graphical user interface elements as now described.

As shown in FIG. 27A, a user interface 2700 may include a navigation bar 2502 that indicates that a status update view is selected. Three status updates 2702, 2704, and 2706 are illustrated in user interface 2700. A title column 2708 may include the title of each status update 2702, 2704, and 2706. A status column 2710 indicates the current status of each of the three status updates 2702, 2704, and 2706. As shown, status updates 2702 and 2704 are enabled while status update 2706 is disabled. An actions column 2712 indicates the actions that are available for each of the three status updates 2702, 2704, and 2706. Because status update 2702 is currently enabled, the actions column 2712 for status update 2702 may include a disable action that, when selected, indicates a request to effect processing to disable status update 2702, in some embodiments. Likewise, because status update 2704 is currently enabled, the actions column 2712 for status update 2704 may include a disable action that, when selected, indicates a request to effect processing to disable status update 2704, in some embodiments. Because status update 2706 is currently disenabled, the actions column 2712 for status update 2706 may include an enable action that, when selected, indicates a request to effect processing to enable status update 2706, in some embodiments. A schedule column 2714 may indicate the update schedule for each of the three status updates 2702, 2704, and 2706. As shown, status update 2702 is scheduled to be sent every four hours, status update 2704 is scheduled to be sent every hour, and status update 2706 is not scheduled. A time to next update column 2716 may indicate the time remaining for each of the three status updates 2702, 2704, and 2706 until the collaborative incident management program 2330 transmits the next status update message.

The parameters for each of the three status updates 2702, 2704, and 2706 may be revised by selecting the respective title for the status updates 2702, 2704, and 2706 in the title column 2708, in some embodiments. A new scheduled update can be created by selecting the create scheduled update button 2718, in some embodiments. In either case, a user interface 2740 appears to provide a mechanism for editing an existing scheduled update or creating a new scheduled update, as now described.

As shown in FIG. 27B, a user interface 2740 may include a create scheduled update window 2742 and a preview window 2744. The create scheduled update window 2742 may include a title field where a title for the scheduled update may be entered or modified. A schedule selector 2748 may provide a mechanism for selecting the frequency of the scheduled update, in some embodiments. The email addresses for the recipients of the scheduled update are entered into a recipient field 2750. The subject line of the email message sent with the scheduled update may be entered in a subject field 2752. A message content selector 2754 provides a mechanism for individually selecting which items may be included in each status update. As shown, the scheduled updates may include, without limitation, the current status of the incident, the time elapsed since the incident was created, a list of the completed tasks or check items, a list of the services impacted by the incident, and notes related to the incident. The scheduled update does not include a list of the open tasks or check items. The preview window 2744 illustrates an example status update message based on the information in the create scheduled update window 2742.

When selected, cancel button 2756 indicates a request to effect processing to discard any entries and modifications made to the scheduled update and close user interface 2740, in some embodiments. When selected, save button 2758 of some embodiments may engage processing that saves any entries and modifications made to the scheduled update and closes user interface 2740. In some embodiments, when selected, the send update now button 2760 indicates a request to effect processing to immediately send a scheduled update based on the information in the create scheduled update window 2742, regardless of whether the schedule selector 2748 specifies the frequency of the scheduled update.

Figure 28A:
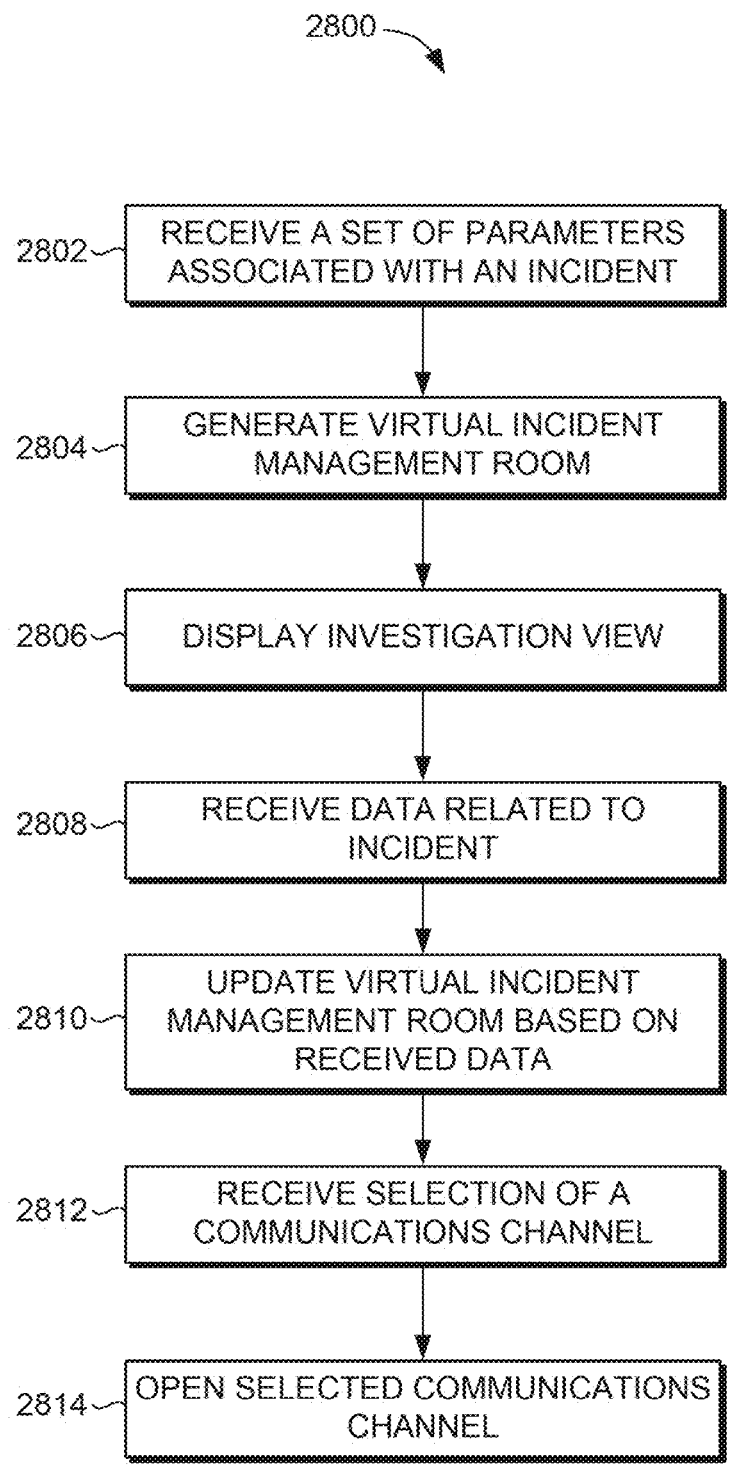
FIGS. 28A-28B set forth a flow diagram of method steps for generating a virtual incident management interface in accordance with the disclosed embodiments.
Figure 28B:
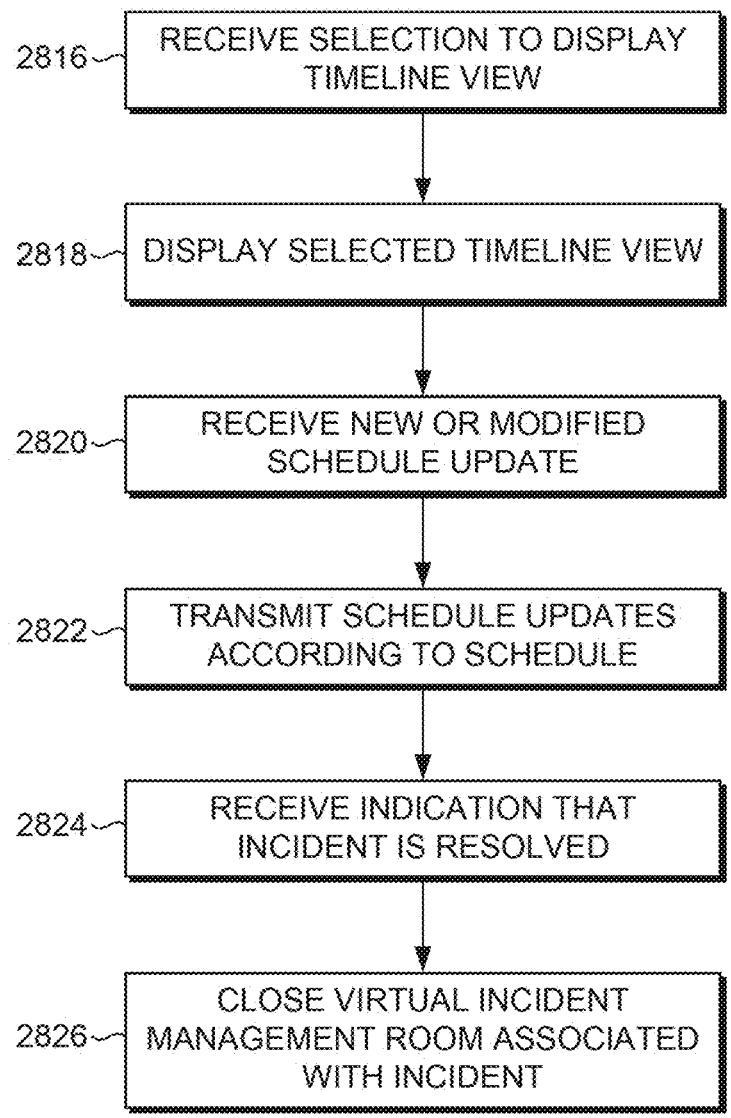

FIGS. 28A-28B set forth a flow diagram of a method for generating a virtual incident management interface in accordance with the disclosed embodiments. Although the processing described for the method are described in conjunction with the systems of FIGS. 1-2, 10-11, 18-19, and 22-23, persons of ordinary skill in the art will understand that any system configured to perform the method, in any order, is within the scope of the present invention.

As shown, a method 2800 begins at block 2802, where a collaborative incident management program 2330 executing on a collaborative incident management system 2210 receives a set of parameters associated with an incident occurring in a networked computing environment. Typically, the set of parameters are entered by an incident manager into one or more graphical control elements associated with the collaborative incident management program 2330. The set of parameters may include, without limitation, an incident title and description, a link to an external service ticket related to the incident, a start time associated with the incident, a priority, and a selection of one or more communications channels to employ to resolve the incident. The one or more communications channel may include, without limitation, a chat message application program, an online meeting application program, a software bug tracking application, and an email alias that may include the members of the incident response team. The set of parameters may further include a selection of services affected by the incident along with the names, email addresses, and titles of the members of the incident response team.

At block 2804, the collaborative incident management program 2330 may generate a virtual incident management room for the incident based on the set of parameters. The collaborative incident management program 2330 presents the virtual incident management room in the form of a graphical user interface that integrates data from the one or more communications channels, the selected services, and other data sources. The collaborative incident management program 2330 exchanges data with various communications channels including, without limitation, the chat message application program, the online meeting application program, and the software bug tracking application. Further, the collaborative incident management program 2330 generates email messages and transmits the email messages to individual email addresses and email aliases. In addition, the incident management program 2330 receives data from various SPLUNK® applications, such as by generating SPLUNK® search queries. As one example, the collaborative incident management program 2330 could receive data for the services monitored by a SPLUNK® IT SERVICE INTELLIGENCE™ system as well as interdependencies among the services. The collaborative incident management program 2330 could also receive health score values for various KPIs associated with the services, as monitored by the SPLUNK® IT SERVICE INTELLIGENCE™ system. As another example, the collaborative incident management program 2330 could receive data related to various security metrics monitored by a system executing the SPLUNK® APP FOR ENTERPRISE SECURITY. Further, the incident management program 2330 could receive data via any technically feasible data source. The collaborative incident management program 2330 may automatically execute search queries and retrieve data related to the incident on a prescheduled basis. The collaborative incident management program 2330 may update the data store for the incident with the resulting data. As a result, collaborative incident management program 2330 automatically updates the data store for the incident to a current state.

At block 2806, the collaborative incident management program 2330 may display the investigation view of the virtual incident management room. The investigation view of some embodiments may integrate and display data from various communications channels, services, and other data sources, and may display the data in an integrated graphical user interface. For example, the integrated graphical user interface could include interactive elements associated with one or more application programs accessible via communications channels, including, without limitation, the chat message application program, the online meeting application program, and the software bug tracking application. The interactive element may be any technically feasible interface element, including, without limitation, a link associated with the communications channel and a graphical icon associated with the communications channel. Selecting an interactive element associated with a particular communications channel indicates a request to effect processing to open a window within the integrated graphical user interface that may display data received from the communications channel, in some embodiments. The window could also receive data via the integrated graphical user interface and transmits the data to the communications channel. In this manner, the integrated graphical user interface can display a window to exchange data with any one or more of the chat message application program, the online meeting application program, and the software bug tracking application.

Further, the integrated graphical user interface may display one or more visualizations based on data received from various data sources. As one example, the integrated graphical user interface could display a visualization based on data received for the services and KPIs monitored by a SPLUNK® IT SERVICE INTELLIGENCE™ system as well as interdependencies among the services. The collaborative incident management program 2330 could also receive health score values for various KPIs associated with the services, as monitored by a SPLUNK® IT SERVICE INTELLIGENCE™ system. As another example, the collaborative incident management program 2330 could display a visualization based on data received data related to various security metrics monitored by a system executing the SPLUNK® APP FOR ENTERPRISE SECURITY.

At block 2808, the collaborative incident management program 2330 receives data related to the incident from one or more members of the incident response team. At block 2810, the collaborative incident management program 2330 updates the virtual incident management room based on the received data. The members of incident response team interact with the virtual incident management room via a set of graphical user interfaces. In particular, the members of the incident response team enter or modify status, attach screenshots, and submit notes via the graphical user interface. The collaborative incident management program 2330 may receive the status information, screenshots, notes, and other data, and may update the data store 2340 to reflect the changes to the virtual incident management room. Once the data store 2340 is updated to reflect the changes to the virtual incident management room, the members of the incident response team may view the updated information via the graphical user interface.

At block 2812, the collaborative incident management program 2330 receives a selection of a communications channel. For example, the collaborative incident management program 2330 could receive a selection of a link, icon, or other graphical element associated with an application program that is accessible via the communications channel. The application program may be a chat message application program, an online meeting application program, a software bug tracking application program, or an email services application program. At block 2814, the collaborative incident management program 2330 identifies and opens the selected communications channel. In some embodiments, the collaborative incident management program 2330 may update the graphical user interface to include a window with an interface to the opened communications channel. For example, the collaborative incident management program 2330 could update the graphical user interface to include a chat message window where chat messages may be viewed and posted to the chat message application program. By means of the window, the collaborative incident management program 2330 exchanges data with the application program via the communications channel.

At block 2816, the collaborative incident management program 2330 receives a selection to view the graphical user interface in timeline view. At block 2818, the collaborative incident management program 2330 may update the graphical user interface to display the selected timeline view. The collaborative incident management program 2330 may update the graphical user interface to display only the timeline. Alternatively or additionally, the collaborative incident management program 2330 may update the graphical user interface to display the timeline along with one or more other elements, including, without limitation, a screenshot, a detailed incident history, or a detailed view of one or more KPIs as measured over a range of time represented in the timeline.

More specifically, the timeline view of some embodiments may integrate and display data from various communications channels, services, and other data sources, and may display the data in an integrated graphical user interface. For example, the integrated graphical user interface could include interactive elements associated with one or more application programs accessible via communications channels, including, without limitation, the chat message application program, the online meeting application program, and the software bug tracking application. The interactive element may be any technically feasible interface element, including, without limitation, a link associated with the communications channel and a graphical icon associated with the communications channel. Selecting an interactive element associated with a particular communications channel indicates a request to effect processing to open a window within the integrated graphical user interface that may display data received from the communications channel, in some embodiments. The window could also receive data via the integrated graphical user interface and transmits the data to the communications channel. In this manner, the integrated graphical user interface can display a window to exchange data with any one or more of the chat message application program, the online meeting application program, and the software bug tracking application.

Further, the integrated graphical user interface may display one or more visualizations based on data received from various data sources. As one example, the integrated graphical user interface could display a visualization based on data received for the services and KPIs monitored by a SPLUNK® IT SERVICE INTELLIGENCE™ system as well as interdependencies among the services. The collaborative incident management program 2330 could also receive health score values for various KPIs associated with the services, as monitored by a SPLUNK® IT SERVICE INTELLIGENCE™ system. As another example, the collaborative incident management program 2330 could display a visualization based on data received data related to various security metrics monitored by a system executing the SPLUNK® APP FOR ENTERPRISE SECURITY.

At block 2820, the collaborative incident management program 2330 receives a new or modified schedule update. The new or modified schedule update may specify, without limitation, the title of the scheduled update, email addresses for one or more recipients of the scheduled update, a subject line to include with the scheduled update, and a selection of items related to the incident to include with the scheduled update. In addition, the scheduled update may include a frequency at which to send the scheduled updates to the specified recipients, such as once per hour or once every four hours. Alternatively, the scheduled update may not include a frequency, in which case the scheduled update is transmitted once. At block 2822, the collaborative incident management program 2330 transmits the scheduled updates according the schedule specified for each scheduled update.

At block 2824, the collaborative incident management program 2330 receives an indication that the incident is resolved. At block 2826, the collaborative incident management program 2330 stops the incident timer, closes the virtual incident management room associated with the incident, and marks the incident as resolved. The method 2800 then terminates.

In sum, a collaborative incident management system may generate a virtual incident management room, or virtual war room, where information and updates from multiple communications channels, data sources, and application programs related to resolving an incident are collected and presented. The collaborative incident management system presents the coordinated information and updates via a centralized graphical user interface. The collaborative incident management system initializes the virtual incident management room based on various attributes related to the incident, including a list of desired communications channels, a list of services affected by the incident, and a list of response team members. The collaborative incident management system may generate a graphical user interface that includes interactive elements for accessing the communications channels, a visualization of the affected services, and a mechanism for generating check items and assigning completion times and response team members to the check items. The collaborative incident management system may generate a graphical user interface with a timeline view that can be filtered by affected service, keyword, check item owner, and other criteria. The collaborative incident management system further provides a mechanism for automatically generating regular status update reports and transmitting email messages that may include the status update reports to specified recipients.

At least one advantage of the disclosed techniques is that members of an incident response team are able to access information and updates related to multiple communications channels, data sources, and application programs from a centralized user interface. Members of the incident response team can view the status of each team member and provide updates to assigned check items without having to access graphical user interfaces for different application programs. As a result, communication among response team members is less cumbersome and more efficient relative to prior approaches. Another advantage of the disclosed techniques is that status update reports are automatically generated and transmitted to key stakeholders. As a result, key stakeholders are able to stay informed about the incident without levying an undue burden on the incident manager to manually produce such status update reports.

1. In some embodiments, a computer-implemented method comprises: receiving one or more parameters associated with an incident occurring within a networked computing environment; identifying a communications channel specified by the one or more parameters; identifying at least one service affected by the incident; causing communications over a network via the communications channel specified by a parameter included in the one or more parameters; and causing display of a first interactive element associated with the communications channel and a visualization indicating the status of the at least one service; wherein the at least one service is represented by a stored service definition, the stored service definition referencing a key performance indicator (KPI) defined by a search query that produces a value indicating a measure of the at least one service from machine data.

2. The computer-implemented method of clause 1, further comprising: transmitting the search query via the network at a plurality of different times within a first range of time; for each time included in the plurality of different times, receiving a different value indicating the measure of the at least one service; and causing display of a second visualization of the KPI based on the different values indicating the measure of the at least one service at the plurality of different times.

3. The computer-implemented method of clause 1 or clause 2, further comprising: identifying one or more members of an incident response team specified by the one or more parameters; transmitting the search query via the network at a plurality of different times within a first range of time; for each time included in the plurality of different times, receiving a different value indicating the measure of the at least one service; determining that at least one value included in the different values exceeds a threshold; and transmitting, to the one or more members and via the communication channel, a notification indicating that the at least one value exceeded the threshold.

4. The computer-implemented method of any of clauses 1-3, further comprising: transmitting the search query via the network at a plurality of different times within a first range of time; for each time included in the plurality of different times, receiving a different value indicating the measure of the at least one service; determining that at least one value included in the different values exceeds a threshold; retrieving incident-related data associated with the at least one service represented by the stored service definition; and causing display of the at least one value and the incident-related data.

5. The computer-implemented method of any of clauses 1-4, wherein the at least one service includes a plurality of services, each service being represented by a different service definition, and further comprising: for each service included in the plurality of services, receiving a different value indicating the measure of the service; causing display of a plurality of graphical controls, wherein each graphical control included in the plurality of graphical controls corresponds to a different service included in the plurality of services; and causing display of a plurality of graphical indicators, wherein each graphical indicator included in the plurality of graphical indicators is displayed in conjunction with a corresponding graphical control included in the plurality of graphical controls, and each graphical indicator includes the value indicating the measure of a corresponding service included in the plurality of services.

6. The computer-implemented method of any of clauses 1-5, wherein the at least one service includes a plurality of services, each service being represented by a different service definition, and further comprising: for each service included in the plurality of services, receiving a different value indicating the measure of the service; causing display of a plurality of graphical controls, wherein each graphical control included in the plurality of graphical controls corresponds to a different service included in the plurality of services; and receiving a selection of the at least one service via one or more of the plurality of graphical controls.

7. The computer-implemented method of any of clauses 1-6, further comprising: identifying a check item for a task related to resolving the incident; receiving a drag-and-drop action between a graphical control that corresponds to the check item and the visualization indicating the status of the at least one service; in response to receiving the drag-and-drop action, associating the check item with the stored service definition representing the at least one service.

8. The computer-implemented method of any of clauses 1-7, further comprising: receiving, via a graphical control included in the visualization, a selection of a first service represented by a first stored service definition and included in the at least one service; in response to receiving the selection of the first service, generating a check item for a task related to resolving the incident; and associating the check item with the first service.

9. The computer-implemented method of any of clauses 1-8, further comprising: receiving, via a graphical control included in the visualization, a selection of a first service represented by a first stored service definition and included in the at least one service; in response to receiving the selection of the first service, identifying one or more check items for tasks related to resolving the incident that are associated with the first service; and marking the one or more check items as completed.

10. The computer-implemented method of any of clauses 1-9, further comprising: receiving, via a graphical control included in the visualization, a selection of a first service represented by a first stored service definition and included in the at least one service; and in response to receiving the selection of the first service, causing display of one or more check items for tasks related to resolving the incident that are associated with the first service.

11. The computer-implemented method of any of clauses 1-10, wherein the at least one service includes a plurality of services, each service being represented by a different service definition, and further comprising: receiving, via the network, information that identifies interdependencies among the services included in the plurality of services; and causing display of a second visualization indicating the interdependencies among the services included in the plurality of services.

12 The computer-implemented method of any of clauses 1-11, further comprising: receiving, via the network, a status condition for each KPI included in a plurality of KPIs that are related to the at least one service, wherein the status condition is included in a plurality of status conditions; calculating a number of KPIs having a first status condition included in the plurality of status conditions; and causing display of a second visualization indicating the number of KPIs having the first status condition.

13. The computer-implemented method of any of clauses 1-12, further comprising: receiving, via the network, a status condition for each KPI included in a plurality of KPIs that are related to the at least one service, wherein the status condition is included in a plurality of status conditions; for each status condition included in the plurality of status conditions, calculating a different number of KPIs having the status condition; and causing display of a second visualization having a circular form, the circular form including a plurality of sections, wherein each section corresponds to a different status condition included in the plurality of status conditions, and each different section represents the different number of KPIs having the corresponding status condition.

14. The computer-implemented method of any of clauses 1-13, wherein the communications channel is associated with an application program that includes at least one of a chat room application program, an online meeting application program, a software bug tracking application program, and an email services application program, and further comprising establishing communications with the application program via the communications channel.

15. The computer-implemented method of any of clauses 1-14, further comprising: receiving a selection of the first interactive element associated with the communications channel; receiving one or more data items from an application program via the communications channel; and causing display of a second visualization that illustrates the one or more data items received from the application program.

16. In some embodiments, a non-transitory computer-readable storage medium includes instructions that, when executed by a processor, cause the processor to perform the steps of: receiving one or more parameters associated with an incident occurring within a networked computing environment; identifying a communications channel specified by the one or more parameters; identifying at least one service affected by the incident; causing communications over a network via the communications channel specified by a parameter included in the one or more parameters; and causing display of a first interactive element associated with the communications channel and a visualization indicating the status of the at least one service; wherein the at least one service is represented by a stored service definition, the stored service definition referencing a key performance indicator (KPI) defined by a search query that produces a value indicating a measure of the service from machine data.

17. The non-transitory computer-readable storage medium of clause 16, further comprising: transmitting the search query via the network at a plurality of different times within a first range of time; for each time included in the plurality of different times, receiving a different value indicating the measure of the at least one service; and causing display of a second visualization of the KPI based on the different values indicating the measure of the at least one service at the plurality of different times.

18. The non-transitory computer-readable storage medium of clause 16 or clause 17, further comprising: identifying one or more members of an incident response team specified by the one or more parameters; transmitting the search query via the network at a plurality of different times within a first range of time; for each time included in the plurality of different times, receiving a different value indicating the measure of the at least one service; determining that at least one value included in the different values exceeds a threshold; and transmitting, to the one or more members and via the communication channel, a notification indicating that the at least one value exceeded the threshold.

19. The non-transitory computer-readable storage medium of any of clauses 16-18, further comprising: transmitting the search query via the network at a plurality of different times within a first range of time; for each time included in the plurality of different times, receiving a different value indicating the measure of the at least one service; determining that at least one value included in the different values exceeds a threshold; retrieving incident-related data associated with the at least one service represented by the stored service definition; and causing display of the at least one value and the incident-related data.

20. The non-transitory computer-readable storage medium of any of clauses 16-19, wherein the at least one service includes a plurality of services, each service being represented by a different service definition, and further comprising: for each service included in the plurality of services, receiving a different value indicating the measure of the service; causing display of a plurality of graphical controls, wherein each graphical control included in the plurality of graphical controls corresponds to a different service included in the plurality of services; and causing display of a plurality of graphical indicators, wherein each graphical indicator included in the plurality of graphical indicators is displayed in conjunction with a corresponding graphical control included in the plurality of graphical controls, and each graphical indicator includes the value indicating the measure of a corresponding service included in the plurality of services.

21. The non-transitory computer-readable storage medium of any of clauses 16-20, wherein the at least one service includes a plurality of services, each service being represented by a different service definition, and further comprising: for each service included in the plurality of services, receiving a different value indicating the measure of the service; causing display of a plurality of graphical controls, wherein each graphical control included in the plurality of graphical controls corresponds to a different service included in the plurality of services; and receiving a selection of the at least one service via one or more of the plurality of graphical controls.

22. The non-transitory computer-readable storage medium of any of clauses 16-21, further comprising: identifying a check item for a task related to resolving the incident; receiving a drag-and-drop action between a graphical control that corresponds to the check item and the visualization indicating the status of the at least one service; in response to receiving the drag-and-drop action, associating the check item with the stored service definition representing the at least one service.

23. The non-transitory computer-readable storage medium of any of clauses 16-22, further comprising: receiving, via a graphical control included in the visualization, a selection of a first service represented by a first stored service definition and included in the at least one service; in response to receiving the selection of the first service, generating a check item for a task related to resolving the incident; and associating the check item with the first service.

24. In some embodiments, a computing device, comprises: a memory that includes a collaborative incident management program; and a processor that is coupled to the memory and, when executing the collaborative incident management program, is configured to: receive one or more parameters associated with an incident occurring within a networked computing environment; identify a communications channel specified by the one or more parameters; identify at least one service affected by the incident; cause communications over a network via the communications channel specified by a parameter included in the one or more parameters; and cause display of a first interactive element associated with the communications channel and a visualization indicating the status of the at least one service; wherein the at least one service is represented by a stored service definition, the stored service definition referencing a key performance indicator (KPI) defined by a search query that produces a value indicating a measure of the service from machine data.

25. The computing device of clause 24, further comprising: transmitting the search query via the network at a plurality of different times within a first range of time; for each time included in the plurality of different times, receiving a different value indicating the measure of the at least one service; and causing display of a second visualization of the KPI based on the different values indicating the measure of the at least one service at the plurality of different times.

26. The computing device of clause 24 or clause 25, further comprising: identifying one or more members of an incident response team specified by the one or more parameters; transmitting the search query via the network at a plurality of different times within a first range of time; for each time included in the plurality of different times, receiving a different value indicating the measure of the at least one service; determining that at least one value included in the different values exceeds a threshold; and transmitting, to the one or more members and via the communication channel, a notification indicating that the at least one value exceeded the threshold.

27. The computing device of any of clauses 24-26, further comprising: transmitting the search query via the network at a plurality of different times within a first range of time;

for each time included in the plurality of different times, receiving a different value indicating the measure of the at least one service; determining that at least one value included in the different values exceeds a threshold; retrieving incident-related data associated with the at least one service represented by the stored service definition; and causing display of the at least one value and the incident-related data.

28. The computing device any of clauses 24-27, wherein the at least one service includes a plurality of services, each service being represented by a different service definition, and further comprising: for each service included in the plurality of services, receiving a different value indicating the measure of the service; causing display of a plurality of graphical controls, wherein each graphical control included in the plurality of graphical controls corresponds to a different service included in the plurality of services; and causing display of a plurality of graphical indicators, wherein each graphical indicator included in the plurality of graphical indicators is displayed in conjunction with a corresponding graphical control included in the plurality of graphical controls, and each graphical indicator includes the value indicating the measure of a corresponding service included in the plurality of services.

29. The computing device of any of clauses 24-28, wherein the at least one service includes a plurality of services, each service being represented by a different service definition, and further comprising: for each service included in the plurality of services, receiving a different value indicating the measure of the service; causing display of a plurality of graphical controls, wherein each graphical control included in the plurality of graphical controls corresponds to a different service included in the plurality of services; and receiving a selection of the at least one service via one or more of the plurality of graphical controls.

30. The computing device of any of clauses 24-29, further comprising: identifying a check item for a task related to resolving the incident; receiving a drag-and-drop action between a graphical control that corresponds to the check item and the visualization indicating the status of the at least one service; in response to receiving the drag-and-drop action, associating the check item with the stored service definition representing the at least one service.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent one or more modules, segments, or portions of code, which each comprise one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
receiving one or more parameters associated with an incident occurring within a networked computing environment, the one or more parameters specifying a communications application program for real-time messaging among two or more users associated with an incident response user group;
generating, based on the one or more parameters, a collaboration interface associated with the incident that is accessible by the two or more users the collaboration interface including:
a service interface including information associated with the incident, and
a communication interface that enables real-time messaging over a network using the specified communications application program;
identifying, based on the one or more parameters, a first service affected by the incident, wherein the first service is represented by a service definition referencing a plurality of key performance indicators (KPIs);
generating one or more visual indicators associated with a performance of the first service based on the plurality of KPIs; and
causing display of the one or more visual indicators within the service interface of the collaboration interface, wherein at least one of the one or more visual indicators is sharable in the communications interface.

2. The computer-implemented method of claim 1, wherein the one or more visual indicators includes a node graph including at least two nodes, each node indicating a service that is affected by the incident, wherein the node graph depicts interrelationships among two or more services affected by the incident.

3. The computer-implemented method of claim 2, wherein the service interface includes a menu of actions associated with a selected node of the node graph.

4. The computer-implemented method of claim 1, wherein the one or more visual indicators includes a visualization of one or more key performance indicators (KPIs) associated with the first service.

5. The computer-implemented method of claim 4, wherein the service interface includes a plurality of graphical lanes, each graphical lane depicting time series information for one KPI among two or more KPIs associated with the first service.

6. The computer-implemented method of claim 1, wherein the service interface includes one or more items that are associated with the first service.

7. The computer-implemented method of claim 6, wherein the collaboration interface further includes a search field, and wherein the display of the one or more items excludes items that do not match a search criterion of the search field.

8. The computer-implemented method of claim 6, wherein the display of the one or more items includes a first region displaying open items and a second region displaying closed items.

9. The computer-implemented method of claim 6, wherein the display includes one or more status updates associated with a first item, wherein each status update causes notifications including information about the first item to be provided.

10. The computer-implemented method of claim 1, wherein the collaboration interface further includes a detail view selector, wherein:
the display includes a number of services that are affected by the incident, and
the number of services displayed is based on a level of detail value of the detail view selector.

11. The computer-implemented method of claim 10, wherein, in response to the detail view selector receiving a higher level of detail value, the display includes an additional service that is affected by the incident.

12. The computer-implemented method of claim 1, wherein the display includes a timeline of one or more events associated with the incident, and wherein the timeline depicts each event of the one or more events at a location corresponding to a time of the event.

13. The computer-implemented method of claim 12, wherein:
the collaboration interface further includes a detail view selector,
the display includes a number of the one or more events included in the timeline, and
the number is based on a level of detail value of the detail view selector.

14. The computer-implemented method of claim 13, wherein, in response to the detail view selector receiving a higher level of detail value, the display includes an additional event that is associated with the incident.

15. The computer-implemented method of claim 12, wherein:
the collaboration interface further includes a filter field, and
the display of the one or more events included in the timeline is based on one or more filter criterion of the filter field.

16. The computer-implemented method of claim 1, wherein the real-time messaging over the network uses at least a software bug tracking application program.

17. One or more non-transitory computer-readable storage media including instructions that, when executed by one or more processors, cause the one or more processors to perform the steps of:
receiving one or more parameters associated with an incident occurring within a networked computing environment, the one or more parameters specifying a communications application program for real-time messaging among two or more users associated with an incident response user group;
generating, based on the one or more parameters, a collaboration interface associated with the incident that is accessible by the two or more users the collaboration interface including:
a service interface including information associated with the incident, and
a communication interface that enables real-time messaging over a network using the specified communications application program;
identifying, based on the one or more parameters, a first service affected by the incident, wherein the first service is represented by a service definition referencing a plurality of key performance indicators (KPIs);
generating one or more visual indicators associated with a performance of the first service based on the plurality of KPIs; and
causing display of the one or more visual indicators within the service interface of the collaboration interface, wherein at least one of the one or more visual indicators is sharable in the communications interface.

18. The one or more non-transitory computer-readable storage media of claim 17, wherein the display includes a timeline of one or more events associated with the incident, and wherein the timeline depicts each event of the one or more events at a location corresponding to a time of the event.

19. A computing device, comprising:
a memory that includes a collaborative incident management program; and
a processor that is coupled to the memory and that executes the collaborative incident management program by:
receiving one or more parameters associated with an incident occurring within a networked computing environment, the one or more parameters specifying a communications application program for real-time messaging among two or more users associated with an incident response user group;
generating, based on the one or more parameters, a collaboration interface associated with the incident, wherein:
the collaboration interface is accessible by one or more users associated with an incident response user group, and
the collaboration interface includes a communication interface that enables real-time messaging over a network among the one or more users associated with the incident response user group;
generating, based on the one or more parameters, a collaboration interface associated with the incident that is accessible by the two or more users the collaboration interface including:
a service interface including information associated with the incident, and
a communication interface that enables real-time messaging over a network using the specified communications application program;
identifying, based on the one or more parameters, a first service affected by the incident, wherein the first service is represented by a service definition referencing a plurality of key performance indicators (KPIs);
generating one or more visual indicators associated with a performance of the first service based on the plurality of KPIs; and causing display of the one or more visual indicators within the service interface of the collaboration interface, wherein at least one of the one or more visual indicators is sharable in the communications interface.

20. The computing device of claim 19, wherein the display includes a timeline of one or more events associated with the incident, and wherein the timeline depicts each event of the one or more events at a location corresponding to a time of the event.

* * * * *